US012590180B2

(12) United States Patent
Edgecombe et al.

(10) Patent No.: US 12,590,180 B2
(45) Date of Patent: Mar. 31, 2026

(54) OLEFINIC COMPOSITIONS COMPRISING HYDROCARBON RESINS

(71) Applicant: EXXONMOBIL PRODUCT SOLUTIONS COMPANY, Spring, TX (US)

(72) Inventors: Brian Edgecombe, Anaheim, CA (US); Ashley Zuzek, Pasadena, CA (US)

(73) Assignee: EXXONMOBIL PRODUCT SOLUTIONS COMPANY, Spring, TX (US)

( * ) Notice: Subject to any disclaimer, the term of this patent is extended or adjusted under 35 U.S.C. 154(b) by 286 days.

(21) Appl. No.: 18/041,484

(22) PCT Filed: Aug. 12, 2021

(86) PCT No.: PCT/US2021/045673

§ 371 (c)(1),
(2) Date: Feb. 13, 2023

(87) PCT Pub. No.: WO2022/036044

PCT Pub. Date: Feb. 17, 2022

(65) Prior Publication Data

US 2024/0018298 A1 Jan. 18, 2024

Related U.S. Application Data

(60) Provisional application No. 63/065,105, filed on Aug. 13, 2020.

(51) Int. Cl.

| | |
|---|---|
| ***C08G 61/08*** | (2006.01) |
| ***C09D 165/00*** | (2006.01) |
| ***C09J 165/00*** | (2006.01) |

(52) U.S. Cl.

CPC ........... *C08G 61/08* (2013.01); *C09D 165/00* (2013.01); *C09J 165/00* (2013.01); *C08G 2261/124* (2013.01); *C08G 2261/1424* (2013.01); *C08G 2261/1426* (2013.01); *C08G 2261/1432* (2013.01); *C08G 2261/144* (2013.01); *C08G 2261/3324* (2013.01); *C08G 2261/418* (2013.01)

(58) Field of Classification Search

CPC .............. C08G 61/08; C08G 2261/124; C08G 2261/1424; C08G 2261/1426; C08G 2261/1432; C08G 2261/144; C08G 2261/3324; C08G 2261/418; C08G 2261/11; C08G 2261/12; C08G 2261/3321; C08G 2261/45; C07F 7/0838; C07F 7/1804; C07F 15/0046; C08F 232/08; C08L 65/00; C09J 165/00; C09D 165/00

USPC .......................................................... 524/570

See application file for complete search history.

(56) References Cited

U.S. PATENT DOCUMENTS

| | | | | |
|---|---|---|---|---|
| 5,410,004 | A | 4/1995 | Williams | |
| 2013/0245194 | A1 | 9/2013 | Huang et al. | |
| 2014/0296436 | A1 | 10/2014 | Hwang et al. | |
| 2014/0329017 | A1* | 11/2014 | Wang | C08K 5/14 252/183.11 |
| 2016/0185885 | A1 | 6/2016 | Stephen et al. | |
| 2017/0166713 | A1* | 6/2017 | Benighaus | C08K 7/14 |
| 2017/0240694 | A1 | 8/2017 | Schrock et al. | |
| 2021/0221934 | A1* | 7/2021 | Takeuchi | C08F 279/00 |
| 2025/0136744 | A1* | 5/2025 | Pade | C09D 5/08 |

FOREIGN PATENT DOCUMENTS

| | | | |
|---|---|---|---|
| CN | 103732636 | A | 4/2014 |
| CN | 103857711 | A | 6/2014 |
| JP | H0848723 | A | 2/1996 |
| JP | 2001253934 | A | 9/2001 |
| JP | 2013100416 | A | 5/2013 |
| JP | 2013151596 | A | 8/2013 |
| JP | 2014083708 | A | 5/2014 |
| JP | 2014084344 | A | 5/2014 |
| JP | 2014097579 | A | 5/2014 |
| JP | 2014098058 | A | 5/2014 |
| WO | 2013/025284 | A1 | 2/2013 |
| WO | 2019235538 | A1 | 12/2019 |
| WO | 2020085299 | A1 | 4/2020 |
| WO | 2020123946 | A1 | 6/2020 |

OTHER PUBLICATIONS

International Search Report and Written Opinion in International Application No. PCT/US2021/045673 dated Oct. 22, 2021.

* cited by examiner

*Primary Examiner* — Hannah J Pak
(74) *Attorney, Agent, or Firm* — Raphael Bellum PLLC

(57) ABSTRACT

The invention relates to compositions comprising at least one cyclic olefin monomer, optionally at least one linear olefin monomer, at least one thermoplastic hydrocarbon resin, and at least one olefin metathesis catalyst. The invention also relates to articles of manufacture made from the compositions of the invention, and methods of making the articles. The invention also relates to coating compositions comprising the compositions of the invention, and to objects or substrates coated with the coating compositions of the invention, which may then be cured. The invention also relates to methods of coating the objects or substrates with the coating compositions of the invention. The invention further relates to the use of the compositions of the invention as adhesives.

27 Claims, 1 Drawing Sheet

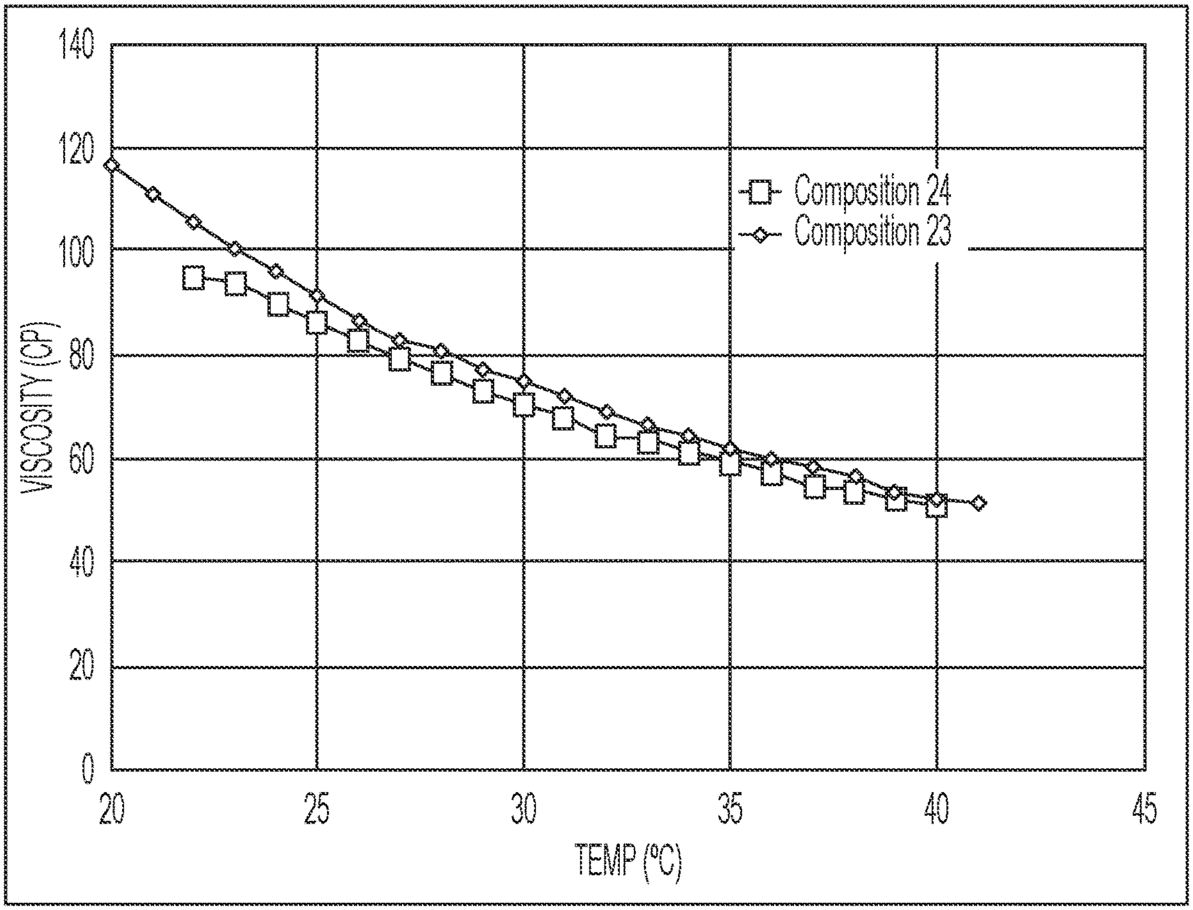
140
120
100
80
60
40
20
0
VISCOSITY (CP)
Composition 24
Composition 23
20
25
30
35
40
45
TEMP (°C)

OLEFINIC COMPOSITIONS COMPRISING HYDROCARBON RESINS

CROSS-REFERENCE TO RELATED APPLICATIONS

This application claims priority to U.S. Pat. App. 63/065,105, filed Aug. 13, 2020; the disclosure of which is incorporated herein by reference.

FIELD OF INVENTION

This invention relates to compositions comprising at least one cyclic olefin monomer, optionally at least one linear olefin monomer, at least one thermoplastic hydrocarbon resin, and at least one olefin metathesis catalyst. The invention also relates to methods of producing molded articles using the compositions of the invention via a ring-opening metathesis polymerization process. The invention further relates to the use of the compositions of the invention as coatings, such as anti-corrosion coatings and protective coatings, to the use of the compositions of the invention as adhesives, and methods of applying them. The invention also relates to the articles of manufacture made from and/or coated with the compositions of the invention.

The compositions of the invention may be utilized for a wide range of substrates. The invention has utility in the fields of polymers, materials, and manufacture.

BACKGROUND

The molding of thermoset polymers is a technologically and commercially important processing technique. In one known version of this technique, a liquid cyclic olefin monomer resin is combined with at least one metal carbene olefin metathesis catalyst to form a ring-opening metathesis polymerization (ROMP) composition, and the ROMP composition is added (e.g., via pouring, casting, vacuum-infusion, pressure-injection, etc.) into a mold. The ROMP composition is subjected to conditions effective to polymerize the ROMP composition and on completion the molded article is subjected to any optional post cure processing that may be required to achieve a high degree of curing and/or the desired properties. The liquid cyclic olefin monomer resin may optionally contain added modifiers, fillers, reinforcements, flame retardants, pigments, etc. Examples of such ROMP compositions are disclosed in U.S. Pat. Nos. 5,342,909; 6,310,121; 6,515,084; 6,525,125; 6,759,537; and 7,329,758.

Commercially important cyclic olefin monomer resins generally comprise readily available and inexpensive cyclic olefins such as norbornene monomers, particularly dicyclopentadiene (DCPD). Since high purity DCPD melts at 32° C.-34° C., other norbornene co-reactants, or monomers that are copolymerizable with DCPD such as trimer of cyclopentadiene (tricyclopentadiene (TCPD)) are often added to depress the melting point below room temperature. In fact, the addition of TCPD, and higher oligomers of cyclopentadiene such as tetramers and pentamers of cyclopentadiene (e.g., tetracyclopentadiene and pentacyclopentadiene) are also useful to modulate specific properties of the final cured thermoset polymer part, such as the glass transition temperature, tensile modulus, and tensile elongation at break.

The use of copolymerization of various monomers to achieve various properties is well known within the polymer art. However, the use of monomers is also known to have limitations in resin cost and material availability. Therefore, it is desirable to modify properties of thermoset properties by other means.

It was surprisingly discovered that the inclusion of certain thermoplastic hydrocarbon resin additives in compositions containing olefin monomers and olefin metathesis catalysts resulted in molded articles having a higher tensile modulus than comparable compositions not having such thermoplastic hydrocarbon resins.

SUMMARY OF THE INVENTION

The invention relates to compositions comprising, consisting essentially of, or consisting of a) at least one cyclic olefin monomer; b) optionally at least one linear olefin monomer; c) at least one thermoplastic hydrocarbon resin; and d) at least one olefin metathesis catalyst.

The invention also relates to articles of manufacture made from the compositions of the invention, and methods of making the articles.

The invention further relates to objects or substrates coated with the compositions of the invention, which may then be cured for a coating. The invention also relates to methods of coating the objects or substrates with the compositions of the invention.

The invention further relates to the use of the compositions of the invention as adhesives.

BRIEF DESCRIPTION OF THE FIGURES

FIG. 1 shows the resin viscosity values at variable temperatures for resin compositions 23 and 24.

DETAILED DESCRIPTION OF THE INVENTION

Terminology and Definitions

Unless otherwise indicated, the invention is not limited to specific reactants, substituents, catalysts, olefin metathesis catalysts, catalyst compositions, olefins, cyclic olefin compositions, coating compositions, reaction conditions, or the like, as such may vary. It is also to be understood that the terminology used herein is for the purpose of describing particular embodiments only and is not to be interpreted as being limiting.

In this specification and in the claims that follow, reference will be made to a number of terms, which shall be defined to have the meanings as described herein.

The term "alkyl" as used herein, refers to a linear, branched, saturated hydrocarbon group typically containing 1 to 24 carbon atoms, preferably 1 to 12 carbon atoms, more preferably 1 to 6 carbon atoms: such as methyl (Me), ethyl (Et), n-propyl (Pr or n-Pr), iso-propyl (i-Pr), n-butyl (Bu or n-Bu), iso-butyl (i-Bu), tert-butyl (t-Bu), octyl (Oct), decyl, and the like.

The term "cycloalkyl" refers to a cyclic alkyl group, can be monocyclic, bicyclic or polycyclic, typically having 3 to 10, preferably 5 to 7, carbon atoms, generally, cycloalkyl groups are cyclopentyl (Cp), cyclohexyl (Cy), adamantyl.

The term "substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkylene" as used herein refers to a difunctional linear, branched alkyl group, where "alkyl" is as defined above.

The term "alkenyl" as used herein refers to a linear and/or branched hydrocarbon group of 2 to 24 carbon atoms containing at least one double bond, such as ethenyl, n-propenyl, iso-propenyl, n-butenyl, iso-butenyl, octenyl, decenyl, tetradecenyl, hexadecenyl, and the like. Preferred alkenyl groups herein contain 2 to 12 carbon atoms, more preferred alkenyl groups herein contain 2 to 6 carbon atoms.

The term "substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "cycloalkenyl" refers to a cyclic alkenyl group, preferably having 3 to 12 carbon atoms.

The term "alkenylene" as used herein refers to a difunctional linear, branched, where "alkenyl" is as defined above.

The term "alkynyl" as used herein refers to a linear or branched hydrocarbon group of 2 to 24 carbon atoms containing at least one triple bond, such as ethynyl, n-propynyl, and the like. Preferred alkynyl groups herein contain 2 to 12 carbon atoms, more preferred alkynyl groups herein contain 2 to 6 carbon atoms.

The term "substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkynylene" as used herein refers to a difunctional alkynyl group, where "alkynyl" is as defined above.

The term "alkoxy" as used herein refers to an alkyl group bound through a single, terminal ether linkage; that is, an "alkoxy" group may be represented as —O-alkyl where "alkyl" is as defined above. Analogously, "alkenyloxy" refer to an alkenyl group bound through a single, terminal ether linkage, and "alkynyloxy" refers to an alkynyl group bound through a single, terminal ether linkage.

The term "aryl" as used herein, and unless otherwise specified, refers to an aromatic substituent containing a single aromatic ring or multiple aromatic rings that are fused together, directly linked, or indirectly linked (such that the different aromatic rings are bound to a common group such as a methylene or ethylene moiety). Preferred aryl groups contain 5 to 24 carbon atoms, and particularly preferred aryl groups contain 6 to 10 carbon atoms. Exemplary aryl groups contain one aromatic ring or two fused or linked aromatic rings, e.g., phenyl (Ph), naphthyl, biphenyl, diphenylether, diphenylamine, benzophenone, phenanthryl and the like.

"Substituted aryl" refers to an aryl moiety substituted with one or more substituent groups, and the terms "heteroatom containing aryl" and "heteroaryl" refer to aryl substituents in which at least one carbon atom is replaced with a heteroatom, as will be described in further detail herein.

The term "aryloxy" as used herein refers to an aryl group bound through a single, terminal ether linkage, wherein "aryl" is as defined above. An "aryloxy" group may be represented as —O-aryl where aryl is as defined above. Preferred aryloxy groups contain 5 to 24 carbon atoms, and particularly preferred aryloxy groups contain 6 to 10 carbon atoms. Examples of aryloxy groups include, without limitation, phenoxy, o-halo-phenoxy, m-halo-phenoxy, p-halo-phenoxy, o-methoxy-phenoxy, m-methoxy-phenoxy, p-methoxy-phenoxy, 2,4-dimethoxy-phenoxy, 3,4,5-trimethoxy-phenoxy, and the like.

The term "alkaryl" refers to an aryl group with an alkyl substituent, and the term "aralkyl" refers to an alkyl group with an aryl substituent, wherein "aryl" and "alkyl" are as defined above. Preferred alkaryl and aralkyl groups contain 6 to 24 carbon atoms, and particularly preferred alkaryl and aralkyl groups contain 6 to 16 carbon atoms. Alkaryl groups include, without limitation, p-methylphenyl, 2,4-dimethylphenyl, p-cyclohexylphenyl, 2,7-dimethylnaphthyl, 7-cyclooctylnaphthyl, 3-ethyl-cyclopenta-1,4-diene, and the like. Examples of aralkyl groups include, without limitation, benzyl, 2-phenyl-ethyl, 3-phenyl-propyl, 4-phenyl-butyl, 5-phenyl-pentyl, 4-phenylcyclohexyl, 4-benzylcyclohexyl, 4-phenylcyclohexylmethyl, 4-benzylcyclohexylmethyl, and the like.

The terms "alkaryloxy" and "aralkyloxy" refer to substituents of the formula —OR wherein R is alkaryl or aralkyl, respectively, as defined herein.

The term "acyl" refers to substituents having the formula —(CO)-alkyl, —(CO)-aryl, —(CO)-aralkyl, —(CO)-alkaryl, —(CO)-alkenyl, or —(CO)-alkynyl, and the term "acyloxy" refers to substituents having the formula —O(CO)-alkyl, —O(CO)-aryl, —O(CO)-aralkyl, —O(CO)-alkaryl, —O(CO)-alkenyl, or —(CO)-alkynyl wherein "alkyl," "aryl," "aralkyl," "alkaryl," "alkenyl," and "alkynyl" are as defined above. The acetoxy group (—O(CO)$CH_3$, often abbreviated as —OAc) is a common example of an acyloxy group.

The terms "cyclic" and "ring" refer to alicyclic or aromatic groups that may or may not be substituted and/or heteroatom containing, and that may be monocyclic, bicyclic, or polycyclic. The term "alicyclic" is used in the conventional sense to refer to an aliphatic cyclic moiety, as opposed to an aromatic cyclic moiety, and may be monocyclic, bicyclic or polycyclic.

The term "polycyclic ring" refers to alicyclic or aromatic groups that may or may not be substituted and/or heteroatom containing, and that have at least two closed rings tethered, fused, linked via a single bond or bridged. Polycyclic rings include without limitation naphthyl, biphenyl, phenanthryl and the like.

The term "spiro compound" refers to a chemical compound, that presents a twisted structure of two or more rings (a ring system), in which 2 or 3 rings are linked together by one common atom.

The terms "halo" and "halogen" and "halide" are used in the conventional sense to refer to a fluorine (F), chlorine (Cl), bromine (Br), or iodine (I) substituent.

"Hydrocarbyl" refers to univalent hydrocarbyl moieties containing 1 to 24 carbon atoms, preferably 1 to 12 carbon atoms, including linear, branched, cyclic, saturated and unsaturated species, such as alkyl groups, alkenyl groups, alkynyl groups, aryl groups, and the like. "Substituted hydrocarbyl" refers to hydrocarbyl substituted with one or more substituent groups.

"Hydrocarbylene" refers to divalent hydrocarbyl moieties containing 1 to 24 carbon atoms, preferably 1 to 12 carbon atoms, including linear, branched, cyclic, saturated and unsaturated species, formed by removal of two hydrogens from a hydrocarbon. "Substituted hydrocarbylene" refers to hydrocarbylene substituted with one or more substituent groups.

The term "heteroatom-containing" as in a "heteroatom-containing hydrocarbyl group" refers to a hydrocarbon molecule or a hydrocarbyl molecular fragment in which one or more carbon atoms is replaced with an atom other than carbon, e.g., nitrogen, oxygen, sulfur, phosphorus or silicon, typically nitrogen, oxygen or sulfur. The term "heteroatom-containing hydrocarbylene" and "heterohydrocarbylene" refer to hydrocarbylene in which at least one carbon atom is replaced with a heteroatom. Similarly, the term "heteroalkyl" refers to an alkyl substituent that is heteroatom-containing, the term "heterocyclic" refers to a cyclic substituent that is heteroatom-containing, the terms "heteroaryl" and "heteroaromatic" respectively refer to "aryl" and "aromatic" substituents that are heteroatom-containing, and the like. It should be noted that a "heterocyclic" group or compound may or may not be aromatic, and further that "heterocycles" may be monocyclic, bicyclic, or polycyclic as described above with respect to the term "aryl." Examples of heteroalkyl groups include without limitation alkoxyaryl, alkylsulfanyl-substituted alkyl, N-alkylated amino alkyl, and the like. Examples of heteroaryl substituents include without limitation pyrrolyl, pyrrolidinyl, pyridinyl, quinolinyl, indolyl, pyrimidinyl, imidazolyl, 1,2,4-triazolyl, tetrazolyl, etc., and examples of heteroatom-containing alicyclic groups include without limitation pyrrolidino, morpholino, piperazino, piperidino, etc.

In addition, the aforementioned substituent groups may, if a particular group permits, be further substituted with one or more additional substituent groups or with one or more hydrocarbyl moieties such as those specifically enumerated above. Analogously, the above mentioned hydrocarbyl moieties may be further substituted with one or more substituent groups or additional hydrocarbyl moieties such as those specifically mentioned above. Analogously, the above-mentioned hydrocarbylene moieties may be further substituted with one or more substituent groups or additional hydrocarbyl moieties as noted above.

By "substituted" as in "substituted hydrocarbyl," "substituted alkyl," "substituted aryl," and the like, as alluded to in some of the aforementioned definitions, is meant that in the hydrocarbyl, alkyl, aryl, or other moiety, at least one hydrogen atom bound to a carbon (or other) atom is replaced with one or more non-hydrogen substituents. Examples of such substituents include, without limitation groups such as halo, hydroxyl, sulfhydryl, $C_1$-$C_{24}$ alkoxy, $C_2$-$C_{24}$ alkenyloxy, $C_2$-$C_{24}$ alkynyloxy, $C_5$-$C_{24}$ aryloxy, $C_6$-$C_{24}$ aralkyloxy, $C_6$-$C_{24}$ alkaryloxy, acyl (including $C_2$-$C_{24}$ alkylcarbonyl (—CO-alkyl) and $C_6$-$C_{24}$ arylcarbonyl (—CO-aryl)), acyloxy (—O-acyl, including $C_2$-$C_{24}$ alkylcarbonyloxy (—O—CO-alkyl) and $C_6$-$C_{24}$ arylcarbonyloxy (—O—CO-aryl)), $C_2$-$C_{24}$ alkoxycarbonyl (—(CO)—O-alkyl), $C_6$-$C_{24}$ aryloxycarbonyl (—(CO)—O-aryl), halocarbonyl (—CO—X where X is halo), $C_2$-$C_{24}$ alkylcarbonato (—O—(CO)—O-alkyl), $C_6$-$C_{24}$ arylcarbonato (—O—(CO)—O-aryl), carboxylic acid (—COOH), carbamoyl (—(CO)—$NH_2$), mono-($C_1$-$C_{24}$ alkyl)-substituted carbamoyl (—(CO)—NH($C_1$-$C_{24}$ alkyl)), di-($C_1$-$C_{24}$ alkyl)-substituted carbamoyl (—(CO)—N($C_1$-$C_{24}$ alkyl)$_2$), mono-($C_1$-$C_{24}$ haloalkyl)-substituted carbamoyl (—(CO)—NH($C_1$-$C_{24}$ haloalkyl)), di-($C_1$-$C_{24}$ haloalkyl)-substituted carbamoyl (—(CO)—N($C_1$-$C_{24}$ haloalkyl)$_2$), mono-($C_5$-$C_{24}$ aryl)-substituted carbamoyl (—(CO)—NH-aryl), di-($C_5$-$C_{24}$ aryl)-substituted carbamoyl (—(CO)—N($C_5$-$C_{24}$ aryl)$_2$), N($C_1$-$C_{24}$ alkyl)($C_5$-$C_{24}$ aryl)-substituted carbamoyl (—(CO)—N($C_1$-$C_{24}$ alkyl)($C_5$-$C_{24}$ aryl), thiocarbamoyl (—(CS)—$NH_2$), mono-($C_1$-$C_{24}$ alkyl)-substituted thiocarbamoyl (—(CS)—NH($C_1$-$C_{24}$ alkyl)), di-($C_1$-$C_{24}$ alkyl)-substituted thiocarbamoyl (—(CS)—N($C_1$-$C_{24}$ alkyl)$_2$), mono-($C_5$-$C_{24}$ aryl)-substituted thiocarbamoyl (—(CS)—NH-aryl), di-($C_5$-$C_{24}$ aryl)-substituted thiocarbamoyl (—(CS)—N($C_5$-$C_{24}$ aryl)$_2$), N($C_1$-$C_{24}$ alkyl)($C_5$-$C_{24}$ aryl)-substituted thiocarbamoyl (—(CS)—N($C_1$-$C_{24}$ alkyl)($C_5$-$C_{24}$ aryl), —C(O)—NH(alkyl) optionally substituted with a silyl group, —C(O)—N(alkyl)$_2$ optionally substituted with a silyl group, carbamido (—NH—(CO)—$NH_2$), cyano (—C≡N), cyanato (—O—C≡N), thiocyanato (—S—C≡N), isocyanate (—NCO), thioisocyanate (—NCS), formyl (—(CO)—H), thioformyl (—(CS)—H), amino (—$NH_2$), mono-($C_1$-$C_{24}$ alkyl)-substituted amino (—NH($C_1$-$C_{24}$ alkyl), di-($C_1$-$C_{24}$ alkyl)-substituted amino ((—N($C_1$-$C_{24}$ alkyl)$_2$), mono-($C_5$-$C_{24}$ aryl)-substituted amino (—NH($C_5$-$C_{24}$ aryl), di-($C_5$-$C_{24}$ aryl)-substituted amino (—N($C_5$-$C_{24}$ aryl)$_2$), $C_2$-$C_{24}$ alkylamido (—NH—(CO)-alkyl), $C_6$-$C_{24}$ arylamido (—NH—(CO)-aryl), imino (—CRNH where, R includes without limitation H, $C_1$-$C_{24}$ alkyl, $C_5$-$C_{24}$ aryl, $C_6$-$C_{24}$ alkaryl, $C_6$-$C_{24}$ aralkyl, etc.), $C_2$-$C_{20}$ alkylimino (—CRN(alkyl), where R includes without limitation H, $C_1$-$C_{24}$ alkyl, $C_5$-$C_{24}$ aryl, $C_6$-$C_{24}$ alkaryl, $C_6$-$C_{24}$ aralkyl, etc.), arylimino (—CRN(aryl), where R includes without limitation H, $C_1$-$C_{20}$ alkyl, $C_5$-$C_{24}$ aryl, $C_6$-$C_{24}$ alkaryl, $C_6$-$C_{24}$ aralkyl, etc.), nitro (—$NO_2$), nitroso (—NO), sulfo (—S(O)$_2$OH), $C_1$-$C_{24}$ alkylsulfanyl (—S-alkyl; also termed "alkylthio"), $C_5$-$C_{24}$ arylsulfanyl (—S-aryl; also termed "arylthio"), $C_1$-$C_{24}$ alkylsulfinyl (—(SO)-alkyl), $C_5$-$C_{24}$ arylsulfinyl (—(SO)-aryl), $C_1$-$C_{24}$ alkylsulfonyl (—$SO_2$-alkyl), $C_1$-$C_{24}$ monoalkylaminosulfonyl (—$SO_2$—N(H) alkyl), $C_1$-$C_{24}$ dialkylaminosulfonyl (—$SO_2$—N(alkyl)$_2$), $C_5$-$C_{24}$ arylsulfonyl (—$SO_2$-aryl), boryl (—$BH_2$), borono (—B(OH)$_2$), boronato (—B(OR)$_2$ where R includes without limitation alkyl or other hydrocarbyl), phosphono (—P(O)(OH)$_2$), phospho (—$PO_2$), phosphino (—$PH_2$), silyl (—$SiR_3$ wherein R is H, hydrocarbyl, or $C_1$-$C_6$ alkoxy), and silyloxy (—O-silyl); hydrocarbyl moieties $C_1$-$C_{24}$ alkyl (preferably $C_1$-$C_{12}$ alkyl, more preferably $C_1$-$C_6$ alkyl), $C_2$-$C_{24}$ alkenyl (preferably $C_2$-$C_{12}$ alkenyl, more preferably $C_2$-$C_6$ alkenyl), $C_2$-$C_{24}$ alkynyl (preferably $C_2$-$C_{12}$ alkynyl, more preferably $C_2$-$C_6$ alkynyl), $C_5$-$C_{24}$ aryl (preferably $C_6$-$C_{10}$ aryl), $C_6$-$C_{24}$ alkaryl (preferably $C_6$-$C_{16}$ alkaryl), or $C_6$-$C_{24}$ aralkyl (preferably $C_6$-$C_{16}$ aralkyl). The hydrocarbyl, alkyl and aryl groups in the above moieties may themselves be substituted.

By "functionalized" as in "functionalized hydrocarbyl," "functionalized alkyl," "functionalized olefin," "functionalized cyclic olefin," and the like, is meant that in the hydrocarbyl, alkyl, olefin, cyclic olefin, or other moiety, at least one H atom bound to a carbon (or other) atom is replaced with one or more functional group(s) such as those described hereinabove. The term "functional group" is meant to include any functional species that is suitable for the uses described herein. In some cases, the terms "substituent" and "functional group" are used interchangeably.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and thus, the description includes structures wherein a non-hydrogen substituent is present and structures wherein a non-hydrogen substituent is not present.

The term "nil" as used herein, means absent or nonexistent.

The term "sulfhydryl" as used herein, represents a group of formula "—SH."

The term "hydroxyl" as used herein, represents a group of formula "—OH."

The term "carbonyl" as used herein, represents a group of formula "—C(O)—."

The term "ketone" as used herein, represents an organic compound having a carbonyl group linked to a carbon atom such as —C(O)$R^{x1}$, wherein $R^{x1}$ can be alkyl, aryl, cycloalkyl, cycloalkenyl, heterocycle as defined above.

Unless otherwise specified, the term "ester" as used herein, represents an organic compound having a carbonyl group linked to a carbon atom such as —C(O)O$R^{x1}$ wherein $R^{x1}$ can be alkyl, aryl, cycloalkyl, cycloalkenyl, heterocycle as defined above.

The term "amine" as used herein, represents a group of formula "—N$R^xR^y$," wherein $R^x$ and $R^y$ can be the same or independently H, alkyl, aryl, cycloalkyl, cycloalkenyl, heterocycle as defined above.

The term "carboxyl" as used herein, represents a group of formula "—C(O)O—."

The term "sulfonyl" as used herein, represents a group of formula "—$SO_2$—."

The term "sulfate" as used herein, represents a group of formula "—O—S$(O)_2$—O—."

The term "sulfonate" as used herein, represents a group of the formula "—S$(O)_2$—O—."

The term "amide" as used herein, represents a group of formula "—C(O)N$R^xR^y$," wherein $R^x$ and $R^y$ can be the same or independently H, alkyl, aryl, cycloalkyl, cycloalkenyl, heterocycle as defined above.

The term "sulfonamide" as used herein, represents a group of formula "—S$(O)_2$N$R^xR^y$" wherein $R^x$ and $R^y$ can be the same or independently H, alkyl, aryl, cycloalkyl, cycloalkenyl, heterocycle as defined above.

The term "sulfoxide" as used herein, represents a group of formula "—S(O)—."

The term "phosphonic acid" as used herein, represents a group of formula "—P(O)$(OH)_2$."

The term "phosphonate ester" as used herein, represents a group of formula "—P(O)$(OR^{x1})_2$," wherein $R^{x1}$ can be alkyl, aryl, cycloalkyl, cycloalkenyl, heterocycle as defined above.

The term "phosphoric acid" as used herein, represents a group of formula "—OP(O)$(OH)_2$."

The term "phosphate ester" as used herein, represents a group of formula "—OP(O)$(OR^{x1})_2$," wherein $R^{x1}$ can be alkyl, aryl, cycloalkyl, cycloalkenyl, heterocycle as defined above.

The term "sulphonic acid" as used herein, represents a group of formula "—S$(O)_2$OH."

The formula "H" as used herein, represents a hydrogen atom.

The formula "O" as used herein, represents an oxygen atom.

The formula "N" as used herein, represents a nitrogen atom.

The formula "S" as used herein, represents a sulfur atom.

Functional groups may be protected in cases where the functional group interferes with the olefin metathesis catalyst, and any of the protecting groups commonly used in the art may be employed. Acceptable protecting groups may be found, for example, in Greene et al., *Protective Groups in Organic Synthesis,* 5th Ed. (New York: Wiley, 2014). Examples of protecting groups include acetals, cyclic acetals, boronate esters (boronates), cyclic boronate esters (cyclic boronates), carbonates, or the like. Examples of protecting groups include cyclic acetals or cyclic boronate esters.

The terms "coating" as used herein, refers to a substance temporarily or permanently applied to a surface or substrate for decorative purpose, to impart a function on a surface or substrate such as electrical passivity or conductivity, or to protect the surface or substrate from deterioration or degradation as a result of its reaction with the environment or corrosive agents. In particular, the coatings in this invention are suitable for industrial coatings such as protective coatings and particularly anti-corrosion coatings. Coatings may be applied as liquids, gases (vapor deposition) or solids.

The term "substrate(s)" in the context of the invention refers to an object or a surface of an object upon which property deterioration or corrosion can occur, the surface of which can be protected by a coating. Substrates can be metals such as steel, stainless steel, aluminum, copper, alloys or nonmetals such as glass, concrete, ceramics, porcelain, brick, plastics, rubber, wood, cloth, fabrics, or composites such as reinforced plastics, electronic assemblies, etc.

The term "substrate material(s)" as used herein, refers to the material(s) of construction of a substrate.

The term "adhesive" or "adhesive composition" as used herein refers to a substance applied between two substrates to create a bond or joint.

Unless otherwise specified, the term "adhesion promoter" as used herein, refers to an additive or a primer which promotes adhesion of coatings to the substrate of interest. An adhesion promoter usually has an affinity for the substrate and the applied coating.

The term "dispersant" as used herein, refers to agents able to prevent settling or clump and is used interchangeably with "dispersing agent."

The term "antioxidant" is used herein interchangeably with the terms "antiozonant" and is one type of a "stabilizer."

Compositions of the Invention

The invention relates to compositions comprising, consisting essentially of, or consisting of: a) at least one cyclic olefin monomer; b) optionally at least one linear olefin monomer; c) at least one thermoplastic hydrocarbon resin; and d) at least one olefin metathesis catalyst.

Cyclic Olefin Monomers

In general, any cyclic olefin monomer suitable for the reactions disclosed herein may be used in the present invention. Such cyclic olefins may be optionally substituted, optionally heteroatom-containing, mono-unsaturated, di-unsaturated, or poly-unsaturated $C_5$ to $C_{24}$ hydrocarbons, that may be mono-, di-, or poly-cyclic. When the cyclic olefin comprises more than one ring, the rings may or may not be fused.

The cyclic olefin may generally be any strained or unstrained cyclic olefin, provided the cyclic olefin is able to participate in a polymerization reaction either individually or as part of a cyclic olefin composition.

The cyclic olefin may be represented by the structure of Formula (I):

Formula (I)

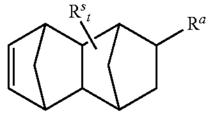

wherein:

$R^a$ is H, optionally substituted linear or branched $C_{1-24}$ alkyl, optionally substituted linear or branched $C_{2-24}$ alkenyl, halogen, —C(O)$R^f$, —$CH_2$—C(O)$R^f$, —O$R^g$, —$CH_2$—O$R^g$, —CN, —$NO_2$, —$CF_3$, —P(O)$(OR^h)_2$, —OP(O)$(OR^h)_2$, —S$(O)_2$O$R^h$, —OS$(O)_2R^h$, optionally substituted heterocycle, an optionally substituted spiro heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

each $R^s$ is independently optionally substituted linear or branched $C_{1-24}$ alkyl, optionally substituted linear or branched $C_{2-24}$ alkenyl, halogen, —$C(O)R^f$, —$CH_2$—$C(O)R^f$, —$OR^g$, —$CH_2$—$OR^g$, —CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

t is 0, 1, 2, 3, 4, 5, or 6;

$R^f$ is OH, $OR^k$, $NR^gR^h$, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$ cycloalkenyl;

$R^h$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^i$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^j$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^k$ is optionally substituted linear or branched $C_{1-24}$ alkyl, optionally substituted linear or branched $C_{2-24}$ alkenyl, optionally substituted $C_{3-10}$cycloalkyl, optionally substituted heterocycle, optionally substituted $C_{5-24}$ aryl, optionally substituted $C_{3-12}$ cycloalkenyl, —$CH_2$-(optionally substituted $C_{3-10}$ cycloalkyl), —$CH_2$-(optionally substituted $C_{5-24}$ aryl), or —$CH_2$-(optionally substituted $C_{3-12}$ cycloalkenyl);

$R^l$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^m$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^n$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^o$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl; and $R^p$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl.

The cyclic olefin may be represented by Formula (I) wherein:

$R^a$ is H, optionally substituted linear or branched $C_{1-12}$ alkyl, optionally substituted linear or branched $C_{2-12}$ alkenyl, halogen, —$C(O)R^f$, —$CH_2$—$C(O)R^f$, —$OR^g$, —$CH_2$—$OR^g$, CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, —$CH_2$-(optionally substituted heterocycle), an optionally substituted spiro heterocycle, optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, —$CH_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

each $R^s$ is independently optionally substituted linear or branched $C_{1-12}$ alkyl, optionally substituted linear or branched $C_{2-12}$ alkenyl, halogen, —$C(O)R^f$, —$CH_2$—$C(O)R^f$, —$OR^g$, —$CH_2$—$OR^g$, CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, —$CH_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

t is 0, 1, 2, 3, or 4;

$R^f$ is OH, $OR^k$, $NR^gR^h$, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^g$ is H, optionally substituted linear or branched $C_{1-12}$ alkyl, optionally substituted $C_{5-7}$ cycloalkyl, optionally substituted heterocycle, optionally substituted $C_{6-10}$ aryl, optionally substituted linear or branched $C_{2-12}$ alkenyl, —C(O)-(optionally substituted $C_{6-10}$ aryl), —C(O)-(optionally substituted linear or branched $C_{2-12}$ alkenyl), or optionally substituted $C_{5-12}$ cycloalkenyl;

$R^h$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^i$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^j$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^k$ is optionally substituted linear or branched $C_{1-12}$ alkyl, optionally substituted linear or branched $C_{1-12}$ alkenyl, optionally substituted $C_{5-7}$ cycloalkyl, optionally substituted heterocycle, optionally substituted $C_{6-10}$ aryl, optionally substituted $C_{3-12}$ cycloalkenyl, —$CH_2$-(optionally substituted $C_{3-10}$ cycloalkyl), —$CH_2$-(optionally substituted $C_{5-24}$ aryl), or —$CH_2$-(optionally substituted $C_{3-12}$ cycloalkenyl);

$R^l$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^m$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^n$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^o$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl; and $R^p$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl.

The cyclic olefin may also be represented by Formula (I) wherein:

$R^a$ is H, optionally substituted linear or branched $C_{1-6}$ alkyl, optionally substituted linear or branched $C_{2-6}$ alkenyl, halogen, —C(O)$R^f$, —$CH_2$—C(O)$R^f$, —O$R^g$, —$CH_2$—O$R^g$, CN, $NO_2$, —$CF_3$, —P(O)(O$R^h$)$_2$, —OP(O)(O$R^h$)$_2$, —S(O)$_2$O$R^h$, —OS(O)$_2$$R^h$, optionally substituted heterocycle, an optionally substituted spiro heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, or —$CH_2$-(optionally substituted $C_{5-7}$ cycloalkenyl);

t is 0;

$R^f$ is OH, O$R^k$, N$R^j$$R^h$, optionally substituted linear or branched $C_{1-6}$ alkyl, optionally substituted $C_{5-7}$cycloalkyl, optionally substituted heterocycle, optionally substituted $C_{6-10}$ aryl, or optionally substituted $C_{5-12}$ cycloalkenyl;

$R^g$ is H, optionally substituted linear or branched $C_{1-6}$ alkyl, optionally substituted $C_{5-7}$ cycloalkyl, optionally substituted heterocycle, optionally substituted $C_{6-10}$ aryl, optionally substituted linear or branched $C_{2-6}$ alkenyl, —C(O)-(optionally substituted $C_{6-10}$ aryl), —C(O)-(optionally substituted linear or branched $C_{2-6}$ alkenyl), or optionally substituted $C_{5-12}$ cycloalkenyl;

$R^h$ is H, optionally substituted linear or branched $C_{1-6}$ alkyl, optionally substituted $C_{5-7}$ cycloalkyl, optionally substituted heterocycle, optionally substituted $C_{6-10}$ aryl, or optionally substituted $C_{5-12}$ cycloalkenyl; and $R^k$ is optionally substituted linear or branched $C_{1-6}$ alkyl, optionally substituted $C_{5-7}$ cycloalkyl, optionally substituted heterocycle, optionally substituted $C_{6-10}$ aryl, or optionally substituted $C_{5-12}$ cycloalkenyl.

Depending on the position of $R^s$ on the tetracyclododeca-3-ene moiety, the cyclic olefin monomer of Formula (I), can be of structure

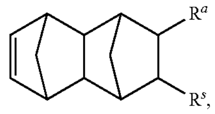

wherein: t is 1, $R^a$ and $R^s$ are as defined herein; and $R^a$ and $R^s$ can form an optionally substituted polycyclic ring with the rest of the molecule.

The cyclic olefin may further be represented by Formula (I) wherein: $R^a$ is

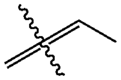, 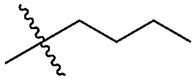,

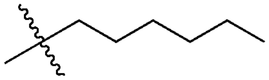, 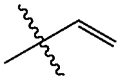,

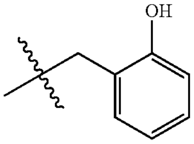, 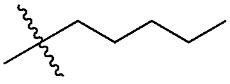,

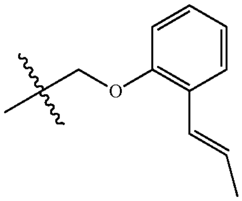, 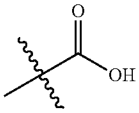,

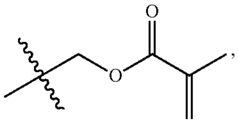, 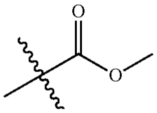,

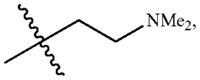 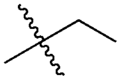, 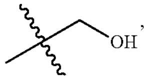,

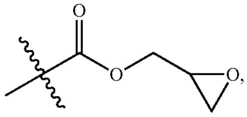 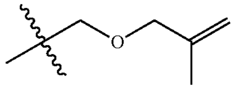,

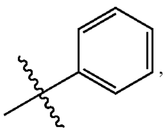, 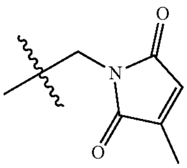, 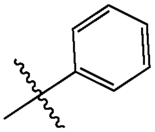,

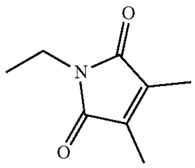 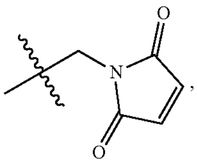,

-continued
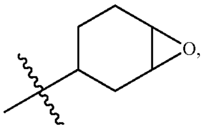
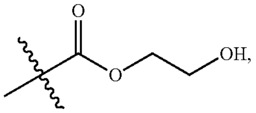
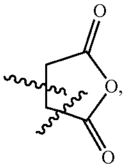
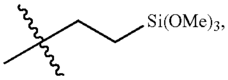
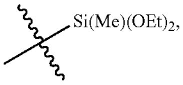
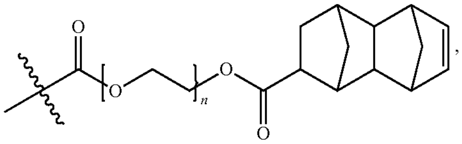
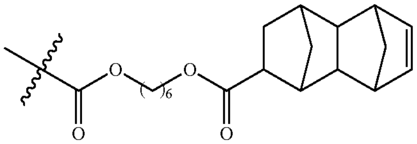
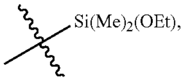
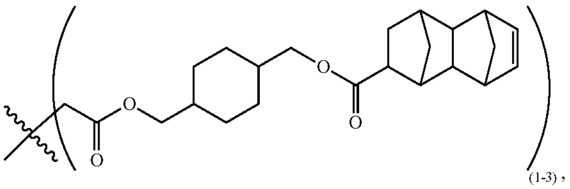
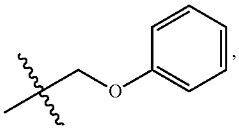
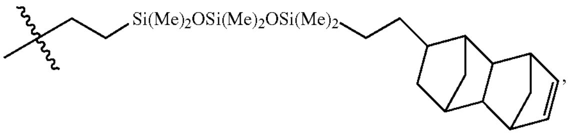
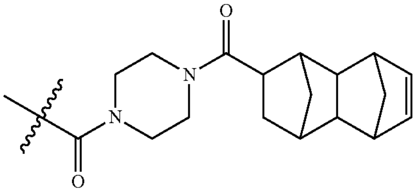
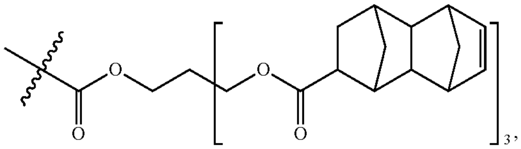
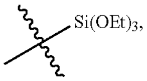
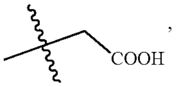
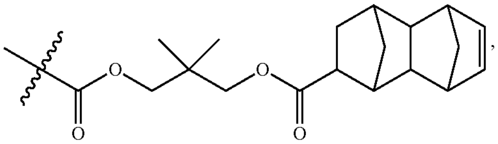
or
-continued
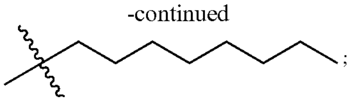
and t=0.
Non-limiting examples of monomers of Formula (I) can be represented by:
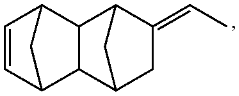
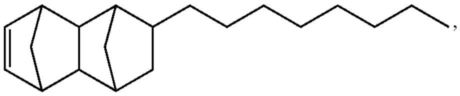
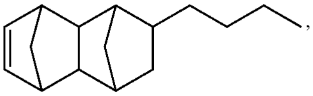
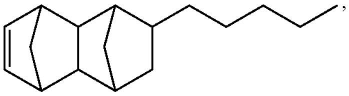
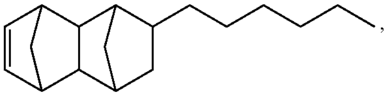
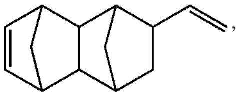
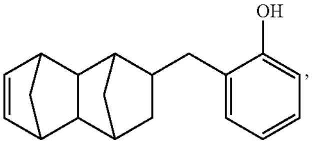
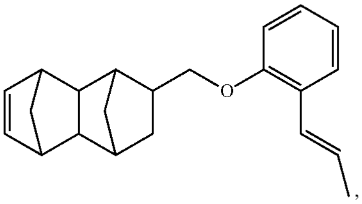
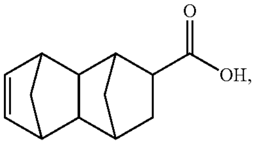
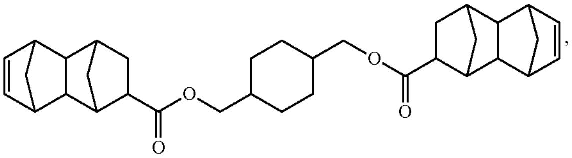
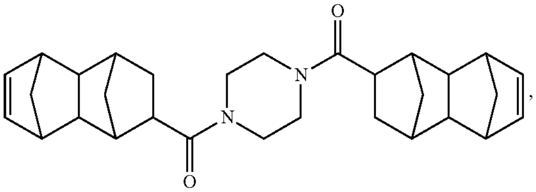
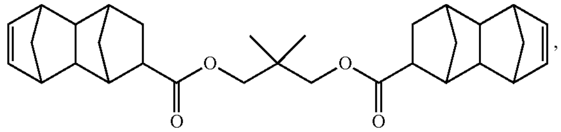

-continued
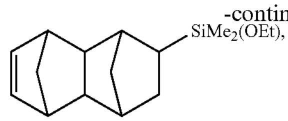
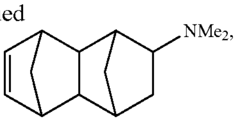
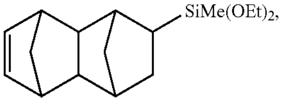
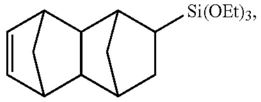
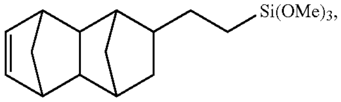
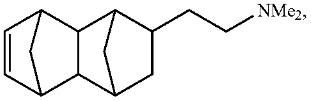
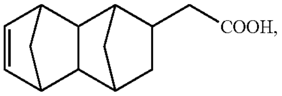
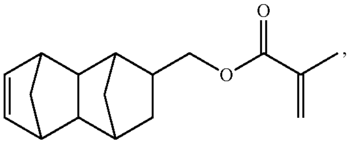
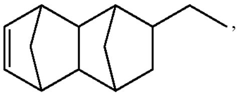
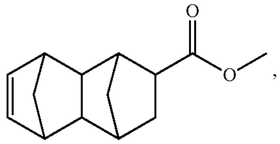
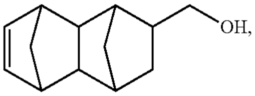
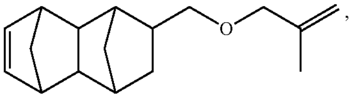
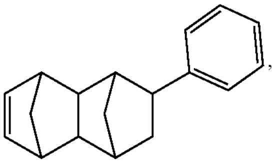
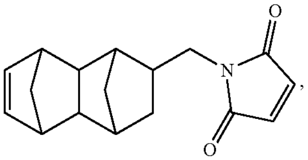
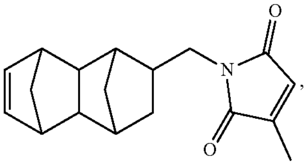
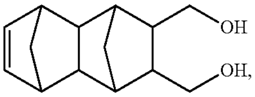
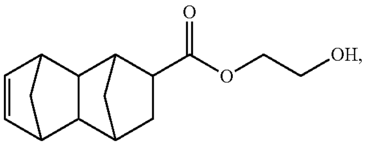
-continued
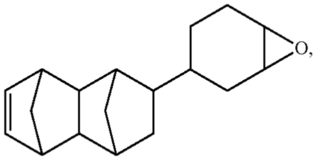
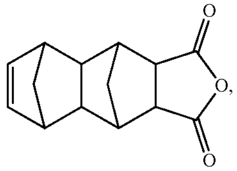
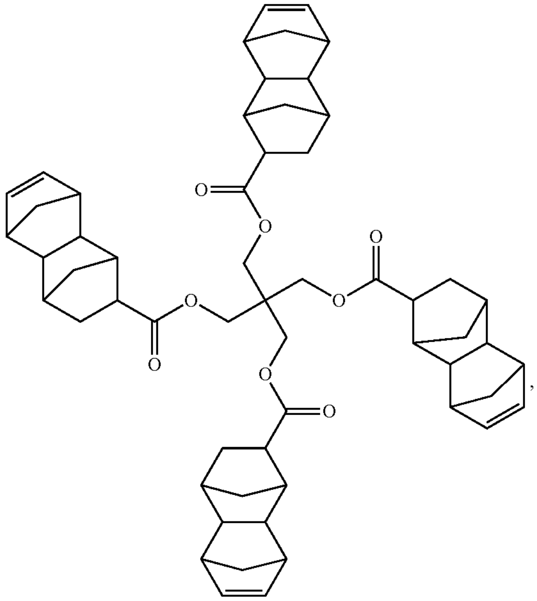
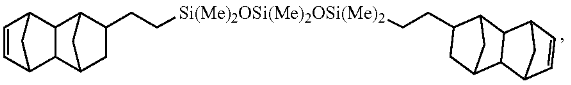
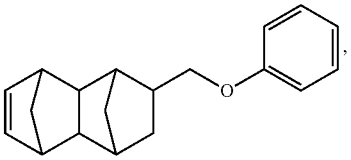
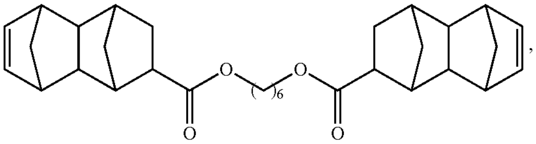
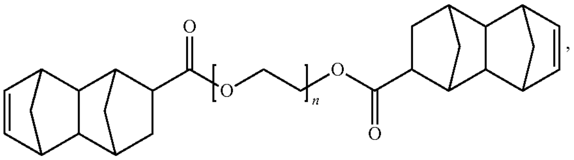
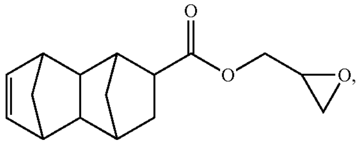
or -continued

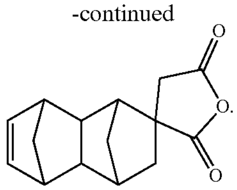

The cyclic olefin may also be represented by the structure of Formula (II):

Formula (II)

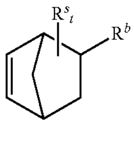

wherein:

$R^b$ is H, optionally substituted linear or branched $C_{1-24}$ alkyl, optionally substituted linear or branched $C_{2-24}$ alkenyl, halogen, —C(O)$R^f$, —$CH_2$—C(O)$R^f$, —$OR^g$, —$CH_2$—$OR^g$, CN, $NO_2$, —$CF_3$, —P(O)$(OR^h)_2$, —OP(O)$(OR^h)_2$, —Si$(OR^k)_3$, —S$(O)_2OR^h$, —OS$(O)_2R^h$, optionally substituted heterocycle, an optionally substituted spiro heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

each $R^s$ is independently optionally substituted linear or branched $C_{1-24}$ alkyl, optionally substituted linear or branched $C_{2-24}$ alkenyl, halogen, —C(O)$R^f$, —$CH_2$—C(O)$R^f$, —$OR^g$, —$CH_2$—$OR^g$, CN, $NO_2$, —$CF_3$, —P(O)$(OR^h)_2$, —OP(O)$(OR^h)_2$, —S$(O)_2OR^h$, —OS$(O)_2R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

t is 0, 1, 2, 3, 4, 5, or 6;

$R^f$ is OH, $OR^k$, $NR^gR^h$, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$ cycloalkenyl;

$R^h$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^i$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^j$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^k$ is optionally substituted linear or branched $C_{1-24}$ alkyl, optionally substituted linear or branched $C_{2-24}$ alkenyl, optionally substituted $C_{3-10}$cycloalkyl, optionally substituted heterocycle, optionally substituted $C_{5-24}$ aryl, optionally substituted $C_{3-12}$ cycloalkenyl, —$CH_2$-(optionally substituted $C_{3-10}$ cycloalkyl), —$CH_2$-(optionally substituted $C_{5-24}$ aryl), or —$CH_2$-(optionally substituted $C_{3-12}$ cycloalkenyl);

$R^l$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^m$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^n$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^o$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl; and $R^p$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl.

The cyclic olefin may be represented by the structure of Formula (II) wherein:

$R^b$ is H, optionally substituted linear or branched $C_{1-12}$ alkyl, optionally substituted linear or branched $C_{2-12}$ alkenyl, halogen, —C(O)$R^f$, —$CH_2$—C(O)$R^f$, —$OR^g$, —$CH_2$—$OR^g$, CN, $NO_2$, —$CF_3$, —P(O)$(OR^h)_2$, —OP(O)$(OR^h)_2$, —S$(O)_2OR^h$, —OS$(O)_2R^h$, optionally substituted heterocycle, an optionally substituted spiro heterocycle, —$CH_2$-(optionally substituted heterocycle), optionally substituted $C_{5-7}$ cycloalkyl, —$CH_2$-(optionally substituted $C_{5-7}$cycloalkyl), optionally substituted $C_{6-10}$ aryl, —$CH_2$-(optionally substituted $C_{6-10}$ aryl), optionally substituted $C_{5-12}$ cycloalkenyl, —$CH_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

each $R^s$ is independently optionally substituted linear or branched $C_{1-12}$ alkyl, optionally substituted linear or branched $C_{2-12}$ alkenyl, halogen, —C(O)$R^f$, —$CH_2$—C(O)$R^f$, —$OR^g$, —$CH_2$—$OR^g$, CN, $NO_2$, —$CF_3$, —P(O)$(OR^h)_2$, —OP(O)$(OR^h)_2$, —S$(O)_2OR^h$, —OS$(O)_2R^h$, optionally substituted heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-

(optionally substituted $C_{6-10}$ aryl), optionally substituted $C_{5-12}$ cycloalkenyl, —$CH_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

t is 0, 1, 2, 3, or 4;

$R^f$ is OH, $OR^k$, $NR^gR^h$, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^g$ is H, optionally substituted linear or branched $C_{1-12}$ alkyl, optionally substituted $C_{5-7}$ cycloalkyl, optionally substituted heterocycle, optionally substituted $C_{6-10}$ aryl, optionally substituted linear or branched $C_{2-12}$ alkenyl, —C(O)-(optionally substituted $C_{6-10}$ aryl), —C(O)-(optionally substituted linear or branched $C_{2-12}$ alkenyl), or optionally substituted $C_{5-12}$ cycloalkenyl;

$R^h$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$cycloalkenyl;

$R^i$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$cycloalkenyl;

$R^j$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$cycloalkenyl;

$R^k$ is optionally substituted linear or branched $C_{1-12}$ alkyl, optionally substituted linear or branched $C_{2-12}$ alkenyl, optionally substituted $C_{3-8}$cycloalkyl, optionally substituted heterocycle, optionally substituted $C_{6-10}$ aryl, optionally substituted $C_{3-12}$ cycloalkenyl, —$CH_2$-(optionally substituted $C_{3-10}$ cycloalkyl), —$CH_2$-(optionally substituted $C_{5-24}$ aryl), or —$CH_2$-(optionally substituted $C_{3-12}$ cycloalkenyl);

$R^l$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^m$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^n$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^o$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl; and $R^p$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl.

The cyclic olefin may also be represented by Formula (II) wherein:

$R^b$ is H, optionally substituted linear or branched $C_{1-6}$ alkyl, optionally substituted linear or branched $C_{2-6}$ alkenyl, halogen, —$C(O)R^f$, —$CH_2$—$C(O)R^f$, —$OR^g$, —$CH_2$—$OR^g$, CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, an optionally substituted spiro heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, or —$CH_2$-(optionally substituted $C_{5-12}$ cycloalkenyl);

t is 0;

$R^f$ is OH, $OR^k$, $NR^gR^h$, optionally substituted linear or branched $C_{1-6}$ alkyl, optionally substituted $C_{5-7}$cycloalkyl, optionally substituted heterocycle, optionally substituted $C_{6-10}$ aryl, or optionally substituted $C_{5-12}$ cycloalkenyl;

$R^g$ is H, optionally substituted linear or branched $C_{1-6}$ alkyl, optionally substituted $C_{5-7}$ cycloalkyl, optionally substituted heterocycle, optionally substituted $C_{6-10}$ aryl, optionally substituted linear or branched $C_{2-6}$ alkenyl, —C(O)-(optionally substituted $C_{6-10}$ aryl), —C(O)-(optionally substituted linear or branched $C_{2-6}$ alkenyl), or optionally substituted $C_{5-12}$ cycloalkenyl;

$R^h$ is H, optionally substituted linear or branched $C_{1-6}$ alkyl, optionally substituted $C_{5-7}$ cycloalkyl, optionally substituted heterocycle, optionally substituted $C_{6-10}$ aryl, or optionally substituted $C_{5-12}$ cycloalkenyl; and $R^k$ is optionally substituted linear or branched $C_{1-6}$ alkyl, optionally substituted $C_{5-7}$ cycloalkyl, optionally substituted heterocycle, optionally substituted $C_{6-10}$ aryl, or optionally substituted $C_{5-12}$ cycloalkenyl.

Depending on the position of $R^s$ on the 2-norbornene moiety, the cyclic olefin monomer of structure Formula (II), can be represented by

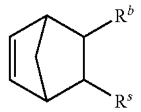

wherein: t=1, $R^s$ and $R^b$ are as defined herein; and $R^s$ and $R^b$ can form together an optionally substituted polycyclic structure with the rest of the molecule.

The cyclic olefin may also be represented by Formula (II) wherein:

$R^b$ is

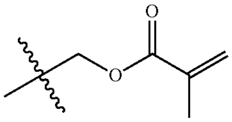, 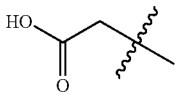, 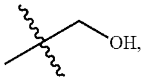, 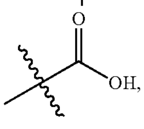, 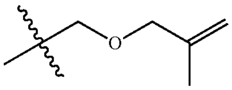, 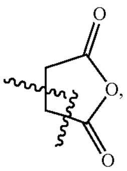, 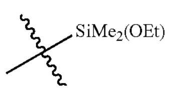, 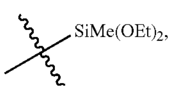, 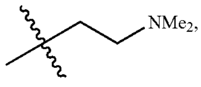, 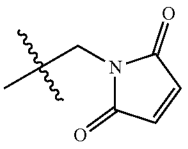, -continued
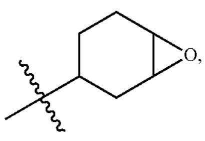
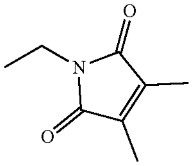,
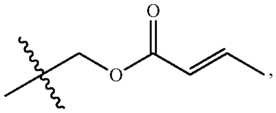,
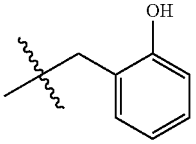,
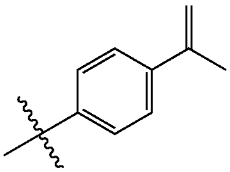,
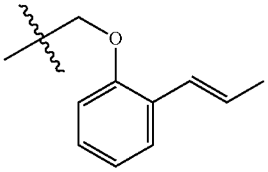,
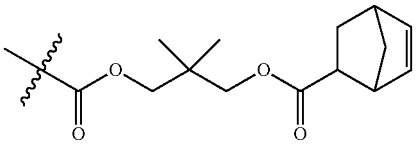,
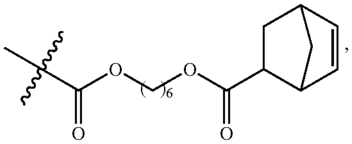,
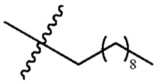,
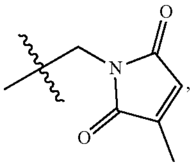,
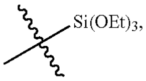
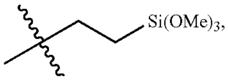
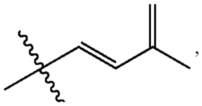,
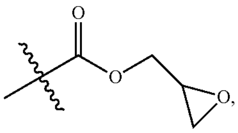
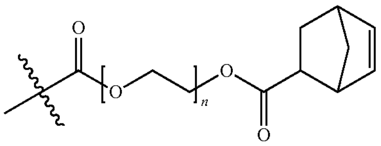,
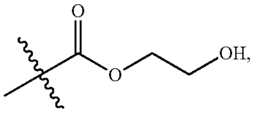
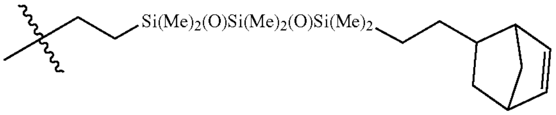,
-continued
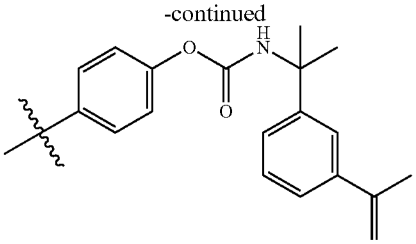,
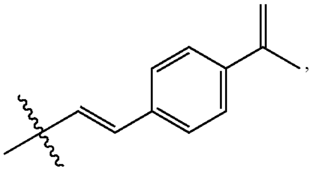,
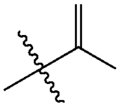,
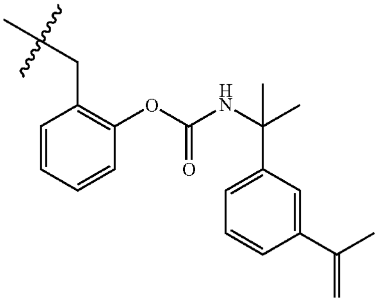,
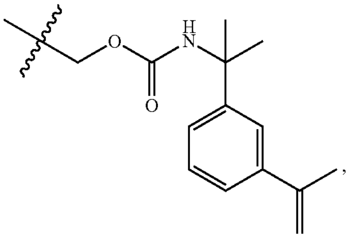, or
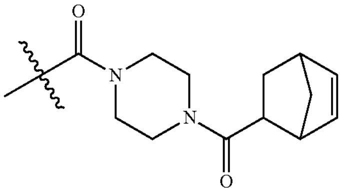;
and t=0.
Non-limiting examples of monomers of Formula (II) can be represented by
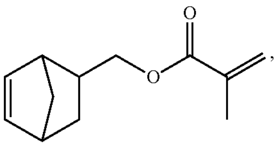,
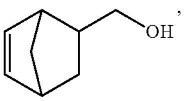,
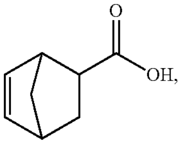
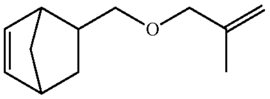,
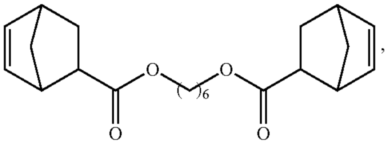, -continued
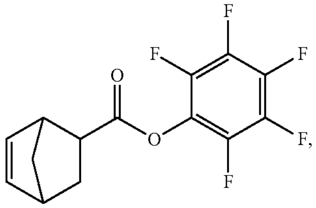
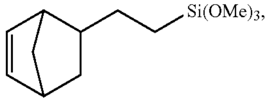
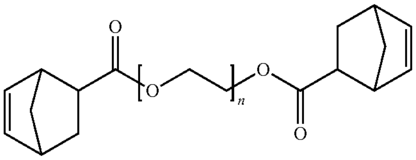
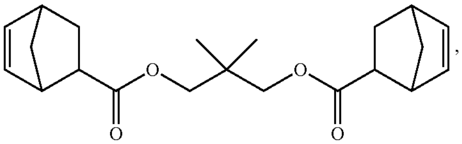
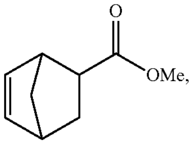
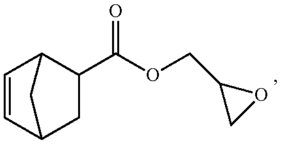
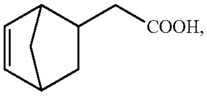
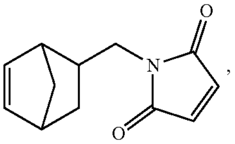
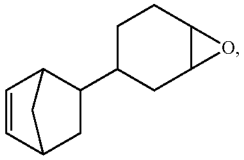
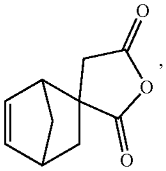
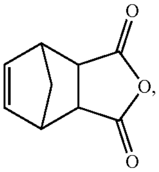
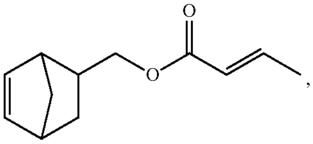
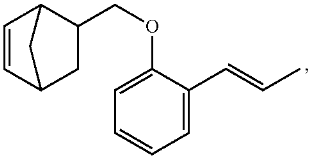
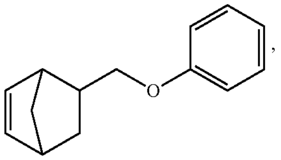
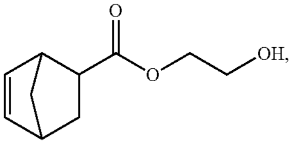
-continued
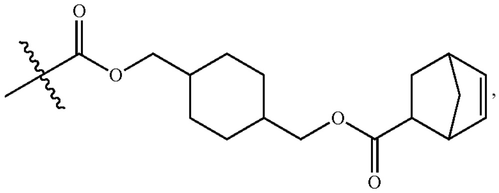
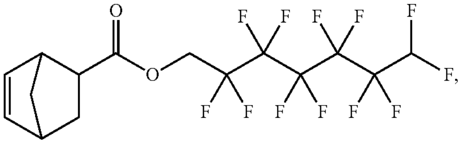
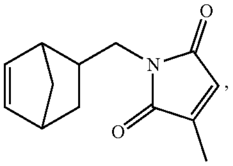
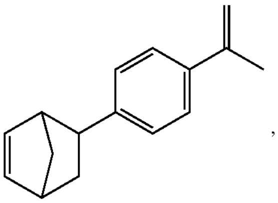
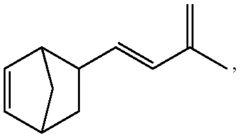
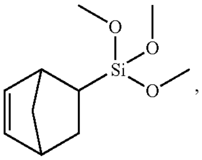
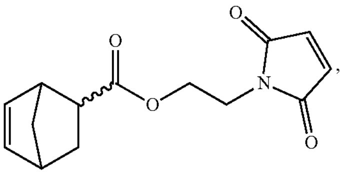
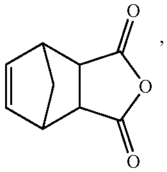
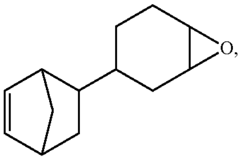
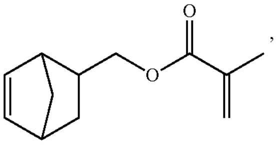
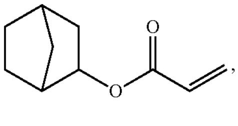
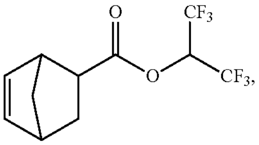
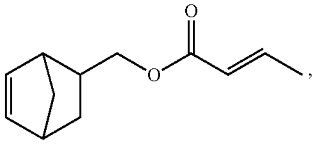
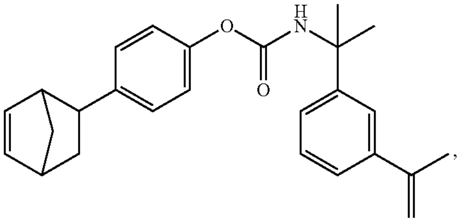

-continued
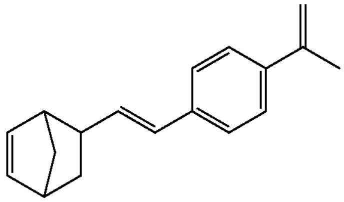,
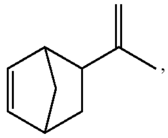,
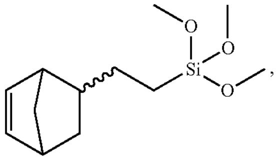,
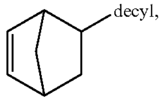
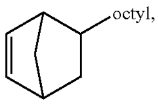
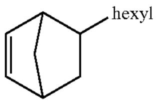
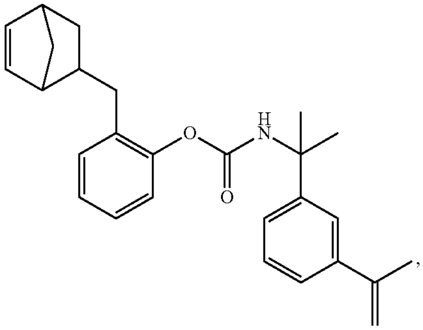,
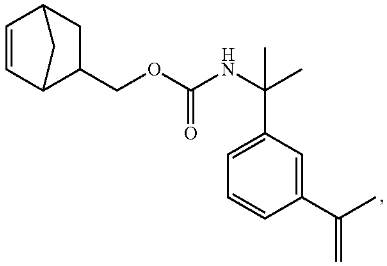,
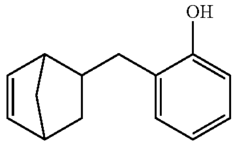,
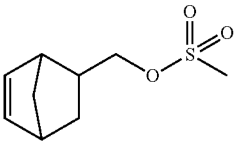,
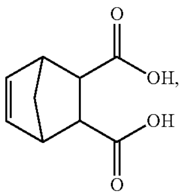
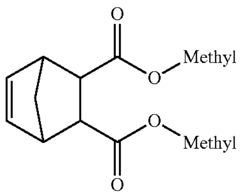,
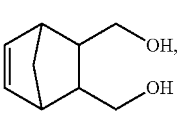
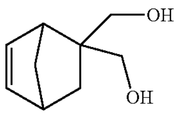,
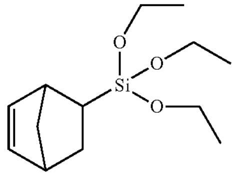,
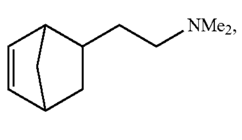
-continued
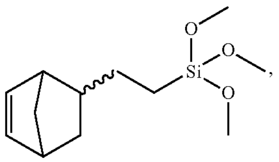
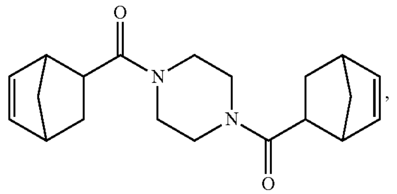
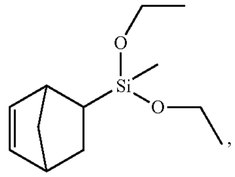
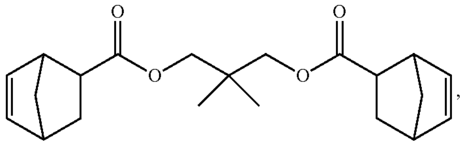
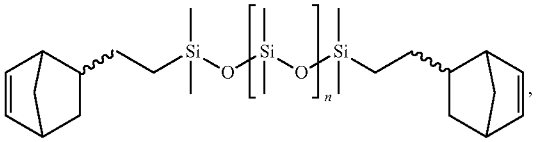
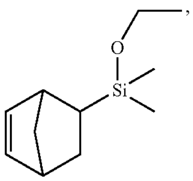
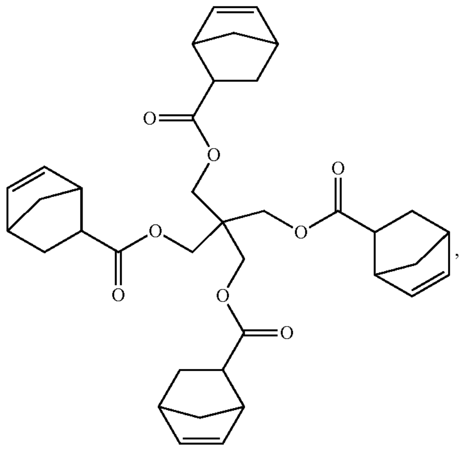
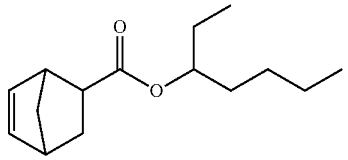

-continued

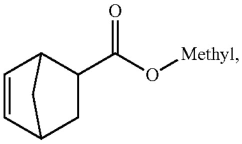,

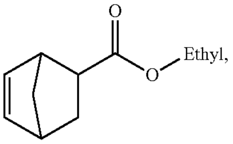,

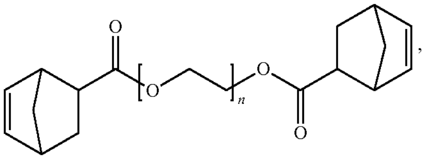,

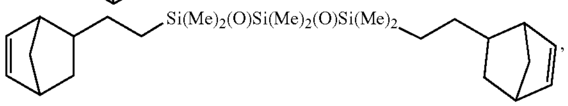,

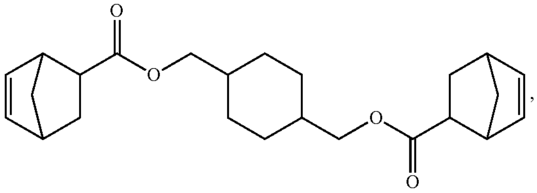, or

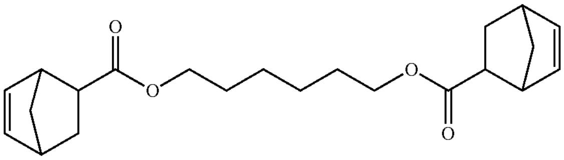.

The cyclic olefin may also be represented by the structure of Formula (III):

Formula (III)

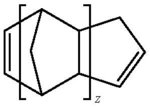

wherein z is 0, 1, 2, or 3.

The cyclic olefin may be represented by the structure of Formula (III), wherein z is 1 or 2.

The cyclic olefin may be represented by the structure of Formula (III), wherein z is 2.

Non-limiting examples of monomers of Formula (III) can be represented by

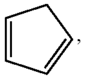,

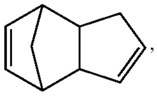,

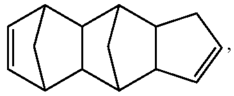,

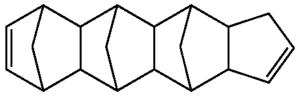, or

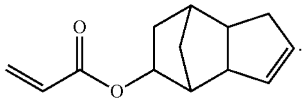.

The cyclic olefin may also be represented by the structure of Formula (V):

Formula (V)

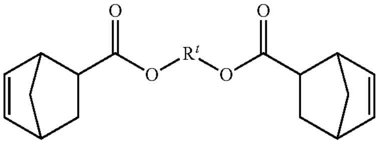

wherein:

- $R^t$ is an optionally substituted linear or branched $C_1$-$C_{12}$ alkyl, -(optionally substituted linear or branched $C_1$-$C_6$ alkyl)-$R^u$-(optionally substituted linear or branched $C_1$-$C_6$ alkyl)-, or —($R^v$)—($R^w$)—($R^x$)—;
- $R^u$ is O, an optionally substituted $C_3$-$C_{10}$-cycloalkyl, optionally substituted $C_3$-$C_{12}$ cycloalkenyl, optionally substituted heterocycle, or optionally substituted $C_5$-$C_{24}$ aryl;
- $R^v$ and $R^x$ are independently selected from -(optionally substituted linear or branched $C_1$-$C_{12}$ alkyl)-aryl-, wherein one or more of the carbon atoms in the $C_1$-$C_{12}$ alkyl may be replaced by O; and
- $R^w$ is optionally substituted linear or branched $C_1$-$C_6$ alkyl.

Non-limiting examples of monomers of Formula (V) can be represented by

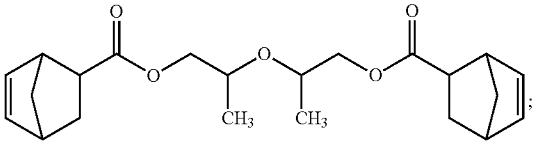;

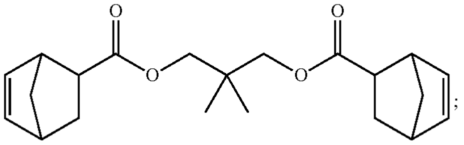;

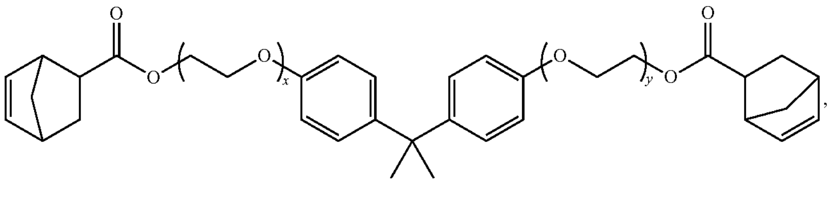, wherein x and y are independently 0, 1, 2, or 3 and the value of x+y is 3;

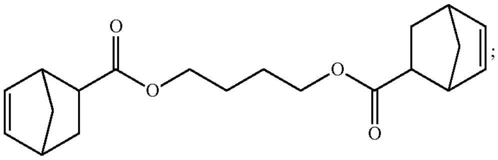

; and

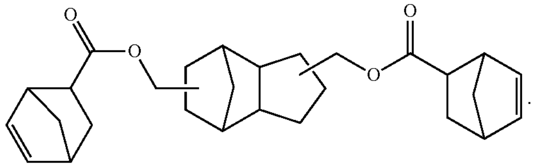

The cyclic olefin may also be represented by the structure of Formula (VI):

Formula (VI)

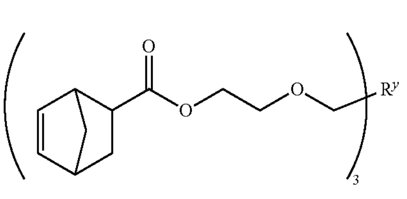

wherein $R^y$ is optionally substituted linear or branched $C_1$-$C_6$ alkyl.

A non-limiting example of a monomer of Formula (VI) can be represented by

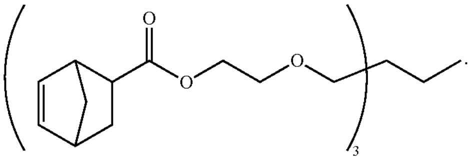

Examples of cyclic olefins thus include, without limitation, dicyclopentadiene; tricyclopentadiene, tetracyclopentadiene; norbornene; 5-isobutyl-2-norbornene; 5,6-dimethyl-2-norbornene; 5-phenyl-2-norbornene; 5-benzyl-2-norbornene; 5-acetyl-2-norbornene; 5-methoxycarbonyl-2-norbornene; 5-ethoxycarbonyl-2-norbornene; 5-methyl-5-methoxycarbonyl-2-norbornene; 5-cyano-2-norbornene; 5,5,6-trimethyl-2-norbornene; endo,exo-5,6-dimethoxy-2-norbornene; endo,endo-5,6-dimethoxy-2-norbornene; endo, exo-5-6-dimethoxycarbonyl-2-norbornene; endo,endo-5,6-dimethoxycarbonyl-2-norbornene; norbornadiene; tricycloundecene; tetracyclododecene; 8-methoxycarbonyltetracyclododecene; 8-cyanotetracyclododecene; $C_1$-$C_{12}$ hydrocarbyl substituted norbornenes such as 5-methyl-2-norbornene; 5-ethyl-2-norbornene; 5-butyl-2-norbornene; 5-hexyl-2-norbornene; 5-octyl-2-norbornene; 5-decyl-2-norbornene; 5-dodecyl-2-norbornene; 5-vinyl-2-norbornene; 5-ethylidene-2-norbornene; 5-isopropenyl-2-norbornene; 5-propenyl-2-norbornene; and 5-butenyl-2-norbornene, and the like; $C_2$-$C_{12}$ hydrocarbyl substituted tetracyclododecenes such as 8-methyl-tetracyclododeca-3-ene; 8-ethyl-tetracyclododeca-3-ene; 8-butyl-tetracyclododeca-3-ene; 8-hexyl-tetracyclododeca-3-ene; 8-octyl-2-tetracyclododeca-3-ene; 8-decyl-2-tetracyclododeca-3-ene; 8-dodecyl-2-tetracyclododeca-3-ene; 8-vinyl-tetracyclododeca-3-ene; 8-ethylidene-2-tetracyclododeca-3-ene; 8-isopropenyl-tetracyclododeca-3-ene; 5-propenyl-tetracyclododeca-3-ene; 5-butenyl-tetracyclododeca-3-ene.

Preferably, the cyclic olefin monomer is selected from the group consisting of the cyclic olefin monomer of formula (I) is tetracyclododecene (TCD), 2-ethylidene-1,2,3,4,4a,5,8,8a-octahydro-1,4:5,8-diethanonaphthalene (ENB-DDA), 2-hexyl-1,2,3,4,4a,5,8,8a-octahydro-1, 4:5,8-dimethanonaphthalene (HNB-DDA), and a mixture thereof; the cyclic olefin monomer of formula (II) is 5-ethylidene-2-norbornene (ENB), 5-octyl-2-norbornene (ONB), 2-hydroxyethyl bicyclo[2.2.1]hept-5-ene-2-carboxylate (HENB), 5-carboxylic acid-2-norbornene ethyl ester, carbamic acid, [3-(triethoxysilyl)propyl]-bicyclo[2.2.1]hept-5-en-2-ylmethyl ester (NBCbSi), 5-norbornene-2-methanol (NB-methanol), 5-norbornene-2-exo,3-exo-dimethanol (NB-dimethanol), 2-hydroxyethyl bicyclo[2.2.1]hept-5-ene-2-carboxylate (NB-epoxide), norbornene triethoxy silane (NB-triethoxysilane), 5-(perfluorobutyl)bicyclo[2.2.1]hept-2-ene (NB-Fluorocarbon (1)), bicyclo[2.2.1]hept-5-ene-2-carboxylic acid, 1,1,2,2,3,3,4,4,5,5,6,6-dodecafluorohexyl ester (NB-fluorocarbon (2)), bicyclo[2.2.1]hept-5-ene-2-carboxylic acid, 2,2,2-trifluoro-1-(trifluoromethyl)ethyl ester (NB-fluorocarbon (3)), and a mixture thereof; and the cyclic olefin monomer of formula (III) is dicyclopentadiene (DCPD), tricyclopentadiene (TCPD), tetracyclopentadene (TeCPD), or a mixture thereof.

Even more preferably, the cyclic olefin monomer is selected from the group consisting of the cyclic olefin monomer of Formula (II) is 5-ethylidene-2-norbornene (ENB), 5-octyl-2-norbornene (ONB), or a mixture thereof; and the cyclic olefin monomer of Formula (III) is dicyclopentadiene (DCPD), tricyclopentadiene (TCPD), tetracyclopentadene (TeCPD), or a mixture thereof. Preferably, the cyclic olefin monomer of Formula (III) is dicyclopentadiene (DCPD) and tricyclopentadiene (TCPD) and the ratio of DCPD:TCPD ranges from 30:70 to 70:30 (e.g., 35:65, 40:60, 43:57, 45:55, 50:50, 55:45, 57:43, 60:40, 65:35).

It is well understood by one of skill in the art that bicyclic and polycyclic olefins as disclosed herein may consist of a variety of structural isomers and/or stereoisomers, any and all of which are suitable for use in the present invention. Any reference herein to such bicyclic and polycyclic olefins unless specifically stated, includes mixtures of any and all such structural isomers and/or stereoisomers.

Linear Olefin Monomers

The linear olefin monomers, if present in the compositions of the invention, may be represented by the structure of Formula (IV) in which $R^c$ and $R^d$ may be in a cis or trans configuration:

Formula (IV)

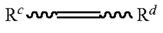

wherein:

$R^c$ is H, optionally substituted linear or branched $C_{1-24}$ alkyl, optionally substituted linear or branched $C_{2-24}$ alkenyl, halogen, —C(O)$R^f$, —$CH_2$—C(O)$R^f$, —$OR^g$, —$CH_2$—$OR^g$, CN, $NO_2$, —$CF_3$, —P(O)$(OR^h)_2$, —OP(O)$(OR^h)_2$, —$S(O)_2OR^h$, —$OS(O)_2R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

$R^d$ is H, optionally substituted linear or branched $C_{1-24}$ alkyl, optionally substituted linear or branched $C_{2-24}$ alkenyl, halogen, —$C(O)R^f$, —$CH_2$—$C(O)R^f$, —$OR^g$, —$CH_2$—$OR^g$, CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

$R^1$ is OH, $OR^k$, $NR^gR^h$, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$cycloalkenyl;

$R^h$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^i$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^j$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^k$ is optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^l$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^m$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^n$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^o$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl; and $R^p$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl.

The linear olefin monomers may also be represented by the structure of Formula (IV) wherein:

$R^c$ is H, optionally substituted linear or branched $C_{1-12}$ alkyl, optionally substituted linear or branched $C_{2-12}$ alkenyl, halogen, —$C(O)R^f$, —$CH_2$—$C(O)R^f$, —$OR^g$, —$CH_2$—$OR^g$, CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, —$CH_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

$R^d$ is H, optionally substituted linear or branched $C_{1-12}$ alkyl, optionally substituted linear or branched $C_{2-12}$ alkenyl, halogen, —$C(O)R^f$, —$CH_2$—$C(O)R^f$, —$OR^g$, —$CH_2$—$OR^g$, CN, $NO_2$, —$CF_3$, —$P(O)(OR^h)_2$, —$OP(O)(OR^h)_2$, —$S(O)_2OR^h$, —$OS(O)_2R^h$, optionally substituted heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$ cycloalkenyl, —$CH_2$-(optionally substituted $C_{5-12}$ cycloalkenyl), $C(R^h)(R^i)COOR^j$, —$C(R^h)(R^i)C(O)H$, —$C(R^h)(R^i)C(O)R^k$, —$C(R^h)(R^i)CR^l(OR^m)(OR^n)$, —$C(R^h)(R^i)C(O)NR^oR^p$, or —$C(R^h)(R^i)C(O)NR^oOR^n$;

$R^f$ is OH, $OR^k$, $NR^gR^h$, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^g$ is H, optionally substituted linear or branched $C_{1-12}$ alkyl, optionally substituted $C_{5-7}$ cycloalkyl, optionally substituted heterocycle, optionally substituted $C_{6-10}$ aryl, optionally substituted linear or branched $C_{2-12}$ alkenyl, —C(O)-(optionally substituted $C_{6-10}$ aryl), —C(O)-(optionally substituted linear or branched $C_{2-12}$ alkenyl), or optionally substituted $C_{5-12}$ cycloalkenyl;

$R^h$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^i$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^j$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^k$ is optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^l$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$cycloalkenyl;

$R^m$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$cycloalkenyl;

$R^n$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$cycloalkenyl;

$R^o$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$cycloalkenyl; and $R^p$ is H, optionally substituted linear or branched $C_{1-12}$ alkyl, optionally substituted $C_{5-7}$ cycloalkyl, optionally substituted heterocycle, optionally substituted $C_{6-10}$ aryl, or optionally substituted $C_{5-12}$cycloalkenyl.

The linear olefin monomers may further be represented by Formula (IV) wherein:

$R^c$ is H, optionally substituted linear or branched $C_{1-6}$ alkyl, optionally substituted linear or branched $C_{2-6}$ alkenyl, halogen, —C(O)$R^f$, —$CH_2$—C(O)$R^f$, —O$R^g$, —$CH_2$—O$R^g$, CN, $NO_2$, —$CF_3$, —P(O)(O$R^h$)$_2$, —OP(O)(O$R^h$)$_2$, —S(O)$_2$O$R^h$, —OS(O)$_2R^h$, optionally substituted heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$cycloalkenyl, or —$CH_2$-(optionally substituted $C_{5-12}$cycloalkenyl);

$R^d$ is H, optionally substituted linear or branched $C_{1-6}$ alkyl, optionally substituted linear or branched $C_{2-6}$ alkenyl, halogen, —C(O)$R^f$, —$CH_2$—C(O)$R^f$, —O$R^g$, —$CH_2$—O$R^g$, CN, $NO_2$, —$CF_3$, —P(O)(O$R^h$)$_2$, —OP(O)(O$R^h$)$_2$, —S(O)$_2$O$R^h$, —OS(O)$_2R^h$, optionally substituted heterocycle, —$CH_2$-(optionally substituted heterocycle), optionally substituted $C_{5-7}$ cycloalkyl, —$CH_2$-(optionally substituted $C_{5-7}$ cycloalkyl), optionally substituted $C_{6-10}$ aryl, —$CH_2$-(optionally substituted $C_{6-10}$ aryl), optionally substituted $C_{5-12}$cycloalkenyl, or —$CH_2$-(optionally substituted $C_{5-12}$cycloalkenyl);

$R^f$ is OH, O$R^k$, N$R^gR^h$, optionally substituted linear or branched $C_{1-6}$ alkyl, optionally substituted $C_{5-7}$ cycloalkyl, optionally substituted heterocycle, optionally substituted $C_{6-10}$ aryl, or optionally substituted $C_{5-12}$ cycloalkenyl;

$R^g$ is H, optionally substituted linear or branched $C_{1-6}$ alkyl, optionally substituted $C_{5-7}$ cycloalkyl, optionally substituted heterocycle, optionally substituted $C_{6-10}$ aryl, optionally substituted linear or branched $C_{2-6}$ alkenyl, —C(O)-(optionally substituted $C_{6-10}$ aryl), —C(O)-(optionally substituted linear or branched $C_{2-6}$ alkenyl), or optionally substituted $C_{5-7}$cycloalkenyl;

$R^h$ is H, optionally substituted linear or branched $C_{1-6}$ alkyl, optionally substituted $C_{5-7}$ cycloalkyl, optionally substituted heterocycle, optionally substituted $C_{6-10}$ aryl, or optionally substituted $C_{5-12}$ cycloalkenyl; and $R^k$ is optionally substituted linear or branched $C_{1-6}$ alkyl, optionally substituted $C_{5-7}$ cycloalkyl, optionally substituted heterocycle, optionally substituted $C_{6-10}$ aryl, or optionally substituted $C_{5-12}$ cycloalkenyl.

The linear olefin monomers may be represented by Formula (IV) wherein:

$R^c$ is H,

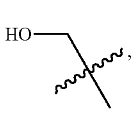
,
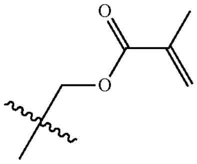
,
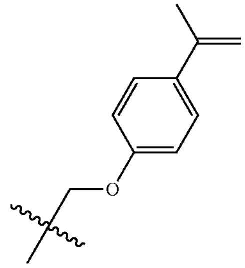
, and
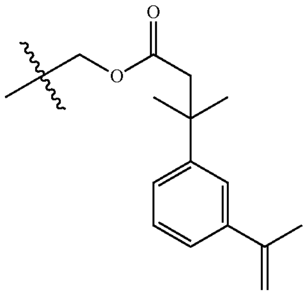
;

and $R^d$ is

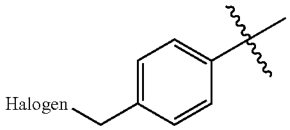
,
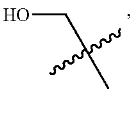
,
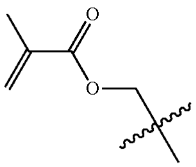
,
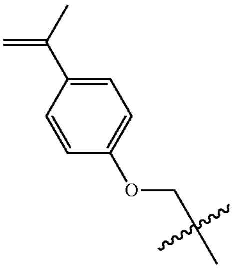
,
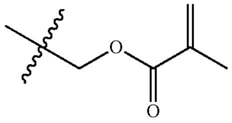
,
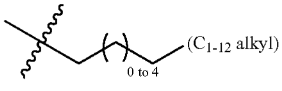
,
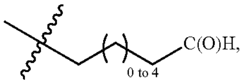
,
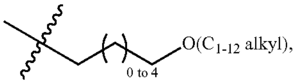
,
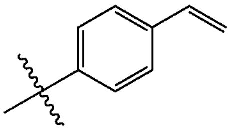
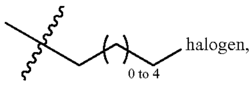
, -continued
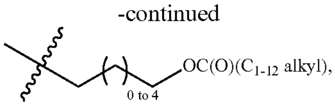
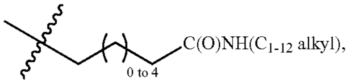
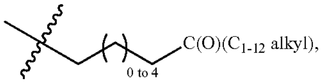
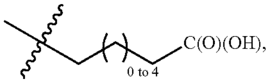
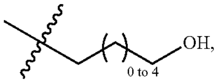
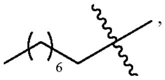
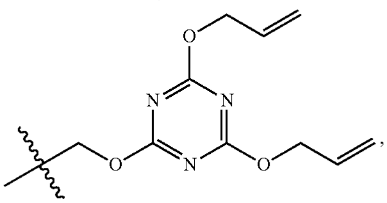
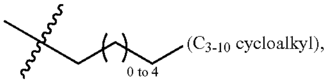
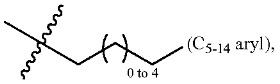
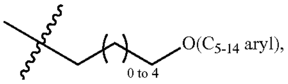
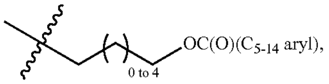
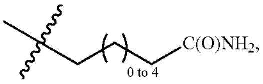
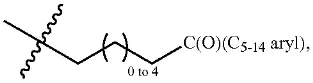
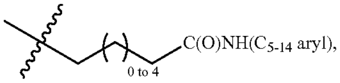
or
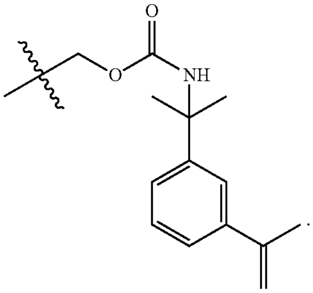
Non-limiting examples of Formula (IV) can be represented by
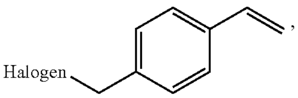
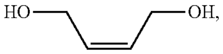
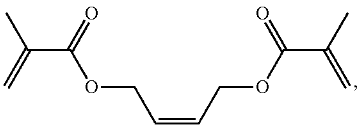
-continued
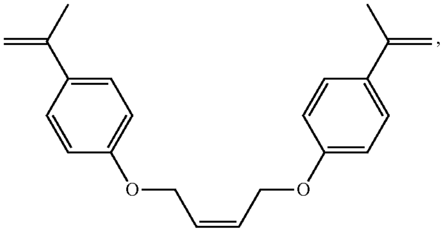
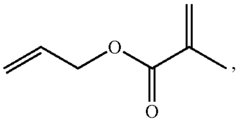
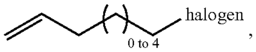
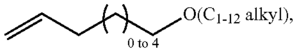
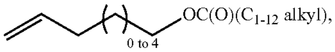
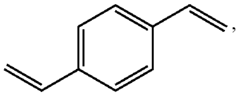
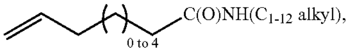
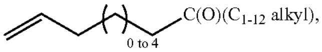
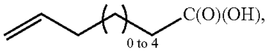
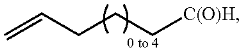
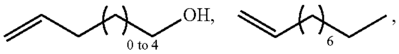
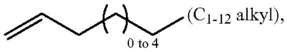
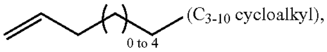
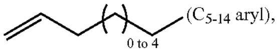
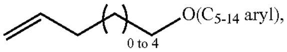
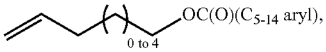
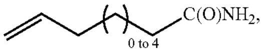
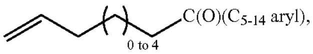
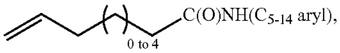
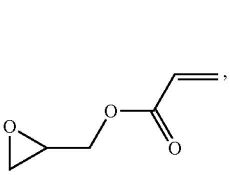
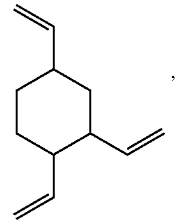
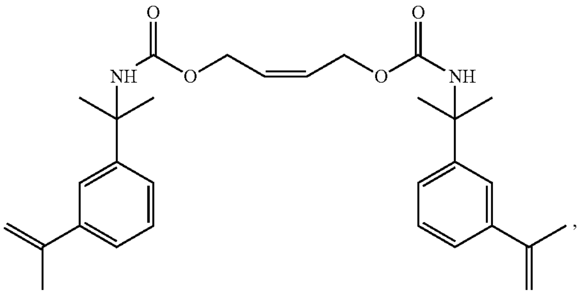

-continued

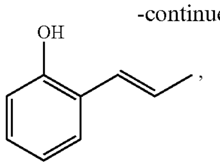,
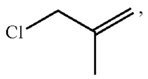,
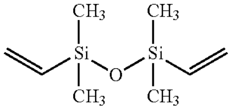,
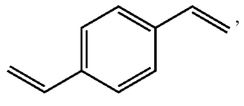,
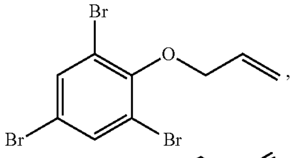, or
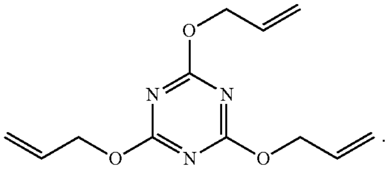.

The composition of the invention may as its olefinic component comprise, consist essentially or, or consist of at least one cyclic olefin monomer selected from the group consisting of at least one of Formulae (I), (II), (III), (V), (VI), and mixtures thereof. A composition of the invention may contain only cyclic olefin monomers of Formulae (I), (II), (III), (V), (VI), or mixtures thereof, or adjust mentioned, may contain at least one particular cyclic olefin monomer selected from one of Formula (I), (II), (Ill), (V), and (VI), but not contain a linear olefin monomer of Formula (IV). In a composition of the invention, the olefinic component may comprise, consist essentially or, or consist of, 0-100%, preferably 25-100%, most preferably 50-100% or 70-85% of at least one cyclic olefin monomer of Formula (I); 0-100%, preferably 20-80% or 15-50% of at least one cyclic olefin monomer of Formula (II); 0-100%, preferably 10-80% or 20-75% of at least one cyclic olefin monomer of Formula (III); 0-100%, preferably 10-80% or 20-75% of at least one cyclic olefin monomer of Formula (V); 0-100%, preferably 10-80% or 20-75% of at least one cyclic olefin monomer of Formula (VI); and 0-20%, preferably 0-10% or 1-5% of at least one linear olefin monomer of Formula (IV), such that the olefins making up the olefinic component add up to 100% of that component of a composition of the invention.

The linear olefin monomers may be optionally substituted, optionally heteroatom-containing, mono-unsaturated, or multi-unsaturated.

Thermoplastic Hydrocarbon Resins

Thermoplastic hydrocarbon resins that may be used in the compositions of the invention can be any that is known in the art. Thermoplastic hydrocarbon resins include, but are not limited to, PMR, DCPD, C5, C9, C5/C9, terpene, and IC thermoplastic resins, for example, as well as hydrogenated, partially-hydrogenated, and non-hydrogenated versions of these resins, and mixtures thereof.

The term "C5 thermoplastic resin" as used herein means aliphatic C5 hydrocarbon thermoplastic resins that are produced from the polymerization of monomers comprising C5 and/or C6 olefin species boiling in the range from about 20° C. to about 200° C. at atmospheric pressure. These monomers are typically generated from petroleum processing, e.g., cracking. The aliphatic C5 hydrocarbon thermoplastic resins of this invention can be produced by any method known in the art. The aliphatic C5 hydrocarbon thermoplastic resins may be prepared by cationic polymerization of a cracked petroleum feed containing C5 and C6 paraffins, olefins, and diolefins also referred to as "C5 monomers." These monomer streams are comprised of cationically polymerizable monomers such as 1,3-pentadiene which is the primary reactive component along with cyclopentene, pentene, 2-methyl-2-butene, 2-methyl-2-pentene, cyclopentadiene, and dicyclopentadiene. The polymerizations are catalyzed using Friedel-Crafts polymerization catalysts such as Lewis acids (e.g., boron trifluoride ($BF_3$), complexes of boron trifluoride, aluminum trichloride ($AlCl_3$), and alkyl aluminum chlorides). In addition to the reactive components, nonpolymerizable components in the feed include saturated hydrocarbons that are in some instances co-distilled with the unsaturated components such as pentane, cyclopentane, or 2-methylpentane. Solid acid catalysts can also be utilized to produce aliphatic C5 hydrocarbon thermoplastic resins. Aliphatic C5 hydrocarbon thermoplastic resins include non-hydrogenated, partially hydrogenated, or fully hydrogenated resins. Aliphatic C5 thermoplastic resins can be obtained as Piccotac® C5 and Eastotac® C5 $H_2$ thermoplastic resins from Eastman Chemical Company (Kingsport, Tenn., US).

The term "C5/C9 thermoplastic resin" as used herein means an aliphatic/aromatic hydrocarbon C5/C9 thermoplastic resin that is produced from the polymerization of monomers comprising at least one unsaturated aromatic C8, C9, and/or C10 species boiling in the range from about 100° C. to about 300° C. at atmospheric pressure and at least one monomer comprising C5 and/or C6 olefin species boiling in the range from about 20° C. to about 200° C. at atmospheric pressure. C5 and/or C6 species may include paraffins, olefins, and diolefins also referred to as "C5 monomers." These monomer streams are comprised of cationically polymerizable monomers such as 1,3-pentadiene which is the primary reactive component along with cyclopentene, pentene, 2-methyl-2-butene, 2-methyl-2-pentene, cyclopentadiene, and dicyclopentadiene. Unsaturated aromatic C8, C9, and/or C10 monomers may be derived from petroleum distillates resulting from naphtha cracking and are referred to as "C9 monomers." These monomer streams are comprised of cationically polymerizable monomers such as styrene, alpha methyl styrene, beta-methyl styrene, vinyl toluene, indene, dicyclopentadiene, divinylbenzene, and other alkyl substituted derivatives of these components. The cationic polymerization is in some instances catalyzed using Friedel-Crafts polymerization catalysts such as Lewis acids (e.g., boron trifluoride ($BF_3$), complexes of boron trifluoride, aluminum trichloride ($AlCl_3$), and alkyl aluminum chlorides). Solid acid catalysts are also utilized to produce aliphatic/aromatic C5/C9 hydrocarbon thermoplastic resins. In addition to the reactive components, non-polymerizable components include, aromatic hydrocarbons such as xylene, ethyl benzene, cumene, ethyl toluene, indane, methylindane, naphthalene and other similar specifies. The non-polymerizable components of the feed stream may be incorporated into the thermoplastic resins via alkylation reactions. Aliphatic/aromatic C5/C9 hydrocarbon thermoplastic resins include non-hydrogenated, partially hydrogenated resins, and hydrogenated resins. Aliphatic/aromatic C5/C9 thermoplastic resins can be obtained as Piccotac® thermoplastic resin from Eastman Chemical Company. The proportion of C5 to C9 is not limited. In other words, the amount of C5 monomer in the C5/C9 thermoplastic resin can be anywhere from 0.1 to 100% and vice versa the amount of C9 monomer in the C5/C9 thermoplastic resin can be from 0.1 to 100%.

The term "C9 thermoplastic resin" as used herein means an aromatic C9 hydrocarbon thermoplastic resin that is a thermoplastic resin produced from the polymerization of monomers comprising unsaturated aromatic C8, C9, and/or C10 species boiling in the range from about 100° C. to about 300° C. at atmospheric pressure. These monomers are typically generated from petroleum processing, e.g., cracking. The aromatic C9 hydrocarbon thermoplastic resins of this invention can be produced by any method known in the art. Aromatic C9 hydrocarbon thermoplastic resins may be prepared by cationic polymerization of aromatic C8, C9, and/or C10 unsaturated monomers derived from petroleum distillates resulting from naphtha cracking and are referred to as "C9 monomers." These monomer streams are comprised of cationically polymerizable monomers such as styrene, alpha methyl styrene (AMS), beta-methyl styrene, vinyl toluene, indene, dicyclopentadiene, divinylbenzene, and other alkyl substituted derivatives of these components. Aliphatic olefin monomers with four to six carbon atoms are also present during polymerization in some C9 resins. The polymerization is in some instances catalyzed using Friedel-Crafts polymerization catalysts such as Lewis acids (e.g., boron trifluoride ($BF_3$), complexes of boron trifluoride, aluminum trichloride ($AlCl_3$), and alkyl aluminum chlorides). In addition to the reactive components, nonpolymerizable components include, but are not limited to, aromatic hydrocarbons such as xylene, ethyl benzene, cumene, ethyl toluene, indane, methylindane, naphthalene, and other similar chemical species. The nonpolymerizable components of the feed stream may be incorporated into the thermoplastic resins via alkylation reactions. C9 hydrocarbon thermoplastic resins include non-hydrogenated, partially hydrogenated, or fully hydrogenated resins. Aromatic C9 hydrocarbon thermoplastic resins can be obtained as Picco®. C9 thermoplastic resin, and aliphatic hydrogenated and aliphatic/aromatic partially hydrogenated C9 $H_2$ hydrocarbon thermoplastic resins can be obtained as Regalite® thermoplastic resin from Eastman Chemical Company.

The term "DCPD thermoplastic resin" as used herein means dicyclopentadiene (DCPD) thermoplastic resin, most commonly formed through ring opening metathesis polymerization (ROMP) of dicyclopentadiene in the presence of a strong acid catalyst, such as maleic acid or aqueous sulphuric acid, or thermal polymerization. Dicyclopentadiene may also be formed by a Diels Alder reaction from two cyclopentadiene molecules and exists in two stereo-isomers: endo-DCPD and exo-DCPD. Typically, greater than 90% of the DCPD molecules present in commercial grades of DCPD are in the endo form. DCPD thermoplastic resins include aromatic-modified DCPD resins as well as hydrogenated, partially hydrogenated, and non-hydrogenated resins, though in most instances herein only $H_2$ DCPD is described since it is the most readily commercially available form of DCPD. Aromatic-modified DCPD is also contemplated as a DCPD thermoplastic resin. Aromatic modification is, for instance, by way of C9 resin oil, styrene, or alpha methyl styrene (AMS), and the like. Hydrogenated and partially hydrogenated DCPD and hydrogenated and partially hydrogenated aromatic-modified DCPD resin is commercially available as Escorez® 5000-series resin (ExxonMobil Chemical Company, TX, US).

The term "IC thermoplastic resin" or "IC resin" as used herein means indene-coumarone (IC) thermoplastic resin, i.e., a synthetic thermoplastic terpene resin formed using feedstocks of indene and coumarone made from heavy-solvent naphtha obtained from the distillation of coal tar, which is a by-product of coke production. Heavy-solvent naphtha is rich in coumarone and indene, but most especially indene, and can be modified with phenol. These feedstocks can be formed by polymerization in $BF_3$ or $BF_3$ etherates. Catalysts can be removed by an alkaline wash or lime after polymerization. The resin can be isolated by steam distilling off the unreacted naphtha. IC thermoplastic resins can be used as plasticizers, and secure stress-strain properties at high levels. Examples of such resins include Novares® C indene-coumarone and Novares® CA phenol-modified indene-coumarone thermoplastic resin, which are commercially available from Rutgers Germany GmbH, Duisburg, Germany.

The term "PMR" as used herein means pure monomer thermoplastic resins. Pure monomer thermoplastic resins are produced from the polymerization of styrene-based monomers, such as, styrene, alpha-methyl styrene, vinyl toluene, and other alkyl substituted styrenes. Pure monomer thermoplastic resins are produced by any method known in the art. Pure monomer feedstock for the production of pure monomer thermoplastic resins are in some cases synthetically generated or highly purified monomer species. For example, styrene can be generated from ethyl benzene or alpha methyl styrene from cumene. Pure monomer hydrocarbon thermoplastic resins may be prepared by cationic polymerization of styrene-based monomers such as styrene, alpha-methyl styrene, vinyl toluene, and other alkyl substituted styrenes using Friedel-Crafts polymerization catalysts such as Lewis acids (e.g., boron trifluoride ($BF_3$), complexes of boron trifluoride, aluminum trichloride ($AlCl_3$), and alkyl aluminum chlorides). Solid acid catalysts can also be utilized to produce pure monomer thermoplastic resins. The pure monomer thermoplastic resins disclosed herein are non-hydrogenated, partially hydrogenated, or fully hydrogenated resins.

The term "hydrogenated" as used herein is also indicated alternatively in the shorthand "$H_2$" and when $H_2$ is used preceding or following a resin type it is intended to indicate that resin type is hydrogenated or partially hydrogenated, such as "PMR $H_2$" and "C5 $H_2$" for example. When "$H_2$" is used herein," "$H_2$" is meant to encompass both fully hydrogenated resin samples and partially hydrogenated resin samples. Thus, "$H_2$" refers to the condition in which the resin is either fully hydrogenated or at least partially hydrogenated. Pure monomer thermoplastic resins are in some instances obtained as Piccolastic® styrenic hydrocarbon thermoplastic resins, Kristalex® styrenic/alkyl styrenic hydrocarbon thermoplastic resins, Piccotex® alkyl styrenic hydrocarbon thermoplastic resins, and Regalrez® hydrogenated or partially hydrogenated pure monomer thermoplastic resins from Eastman Chemical Company (Kingsport, Tenn., US).

The term "terpene thermoplastic resin" or "polyterpene resin" as used herein means thermoplastic resins produced from at least one terpene monomer. For example, α-pinene, β-pinene, d-limonene, and dipentene can be polymerized in the presence of aluminum chloride to provide polyterpene thermoplastic resins. Other examples of polyterpene thermoplastic resins include Sylvares® TR 1100 and Sylvatraxx® 4125 terpene thermoplastic resin (AZ Chem Holdings, LP, Jacksonville, Fla., US), and Piccolyte® A125 terpene thermoplastic resin (Pinova, Inc., Brunswick, Ga., US). Terpene thermoplastic resins can also be modified with aromatic compounds. Sylvares® ZT 105LT and Sylvares® ZT 115 LT terpene thermoplastic resins are aromatically modified (Az Chem Holdings, LP, Jacksonville, Fla., US).

Preferably, the thermoplastic hydrocarbon resin is selected from the group consisting of wherein the thermoplastic hydrocarbon resin is selected from the group consisting of PB-100, Nevchem® 100, LX®-2181, Nevchem® 140, Escorez™ 5600, and mixtures thereof.

It is to be understood that encompassed by the above definitions of certain types of thermoplastic hydrocarbon resins, such as DCPD, PMR, C5, C9, C5/C9, IC, terpene, and the like, including hydrogenated, partially-hydrogenated, and non-hydrogenated versions of these resins, that these thermoplastic hydrocarbon resins include resins of similar types generated by mixing or blending of dissimilar feedstocks to produce heterogeneous mixtures of the feedstocks used to generate the thermoplastic hydrocarbon resins. Furthermore, it is to be understood that at least with respect to the PMR and terpene thermoplastic hydrocarbon resins discussed herein these thermoplastic hydrocarbon resins encompass various known derivatives of such thermoplastic hydrocarbon resins such as phenol-modified and rosin-modified versions of the resins.

The thermoplastic hydrocarbon resin will be present in an amount that ranges from a low of about 0.1 weight percent, 1 weight percent, or 5 weight percent to a high of about 25 weight percent, 35 weight percent, or 45 weight percent relative to the amount of the total cyclic olefin monomer resin composition.

The at least one cyclic olefin monomer may be present in the composition in an amount ranging from about 0.1-99.9 wt. % (e.g., about 0.5-99.5 wt. %, 1-99 wt. %, 5-95 wt. %, 10-90 wt. %, 20-80 wt. %, 30-70 wt. %, 40-60 wt. %, 45-55 wt. %) or about 50 wt. %, based on the total weight of the composition, and the at least one thermoplastic hydrocarbon resin may be present in the composition in an amount ranging from about 99.9-0.1 wt. % (e.g., about 99.5-0.5 wt. %, 99-1 wt. %, 95-5 wt. %, 90-10 wt. %, 80-20 wt. %, 70-30 wt. %, 60-40 wt. %, 55-45 wt. %) or about 50 wt. %, based on the total weight of the composition.

Olefin Metathesis Catalysts

The olefin metathesis catalysts that may be present in the composition of the invention are represented by the general structure of Formula (1):

Formula (1)

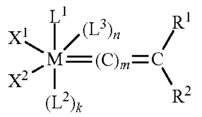

wherein:

M is a Group 8 transition metal; generally, M is ruthenium or osmium; typically, M is ruthenium;

$L^1$, $L^2$, and $L^3$ are independently neutral electron donor ligands;

n is 0 or 1; typically, n is 0;

m is 0, 1, or 2; typically, m is 0;

k is 0 or 1; typically, k is 1;

$X^1$ and $X^2$ are independently anionic ligands; generally, $X^1$ and $X^2$ are independently halogen, trifluoroacetate, per-fluorophenols or together they can form a nitrate; typically, $X^1$ and $X^2$ are independently Cl, Br, I, or F; and $R^1$ and $R^2$ are independently hydrogen, optionally substituted hydrocarbyl, optionally substituted heteroatom-containing hydrocarbyl; typically, $R^1$ is hydrogen and $R^2$ is optionally substituted phenyl, $C_1$-$C_6$ alkyl or substituted 1-propenyl; or $R^1$ and $R^2$ are linked together to form one or more cyclic groups, such as a substituted indenylidene, specifically 3-phenylindenylid-1-ene.

$L^1$ and $L^2$ may be independently selected from phosphine, sulfonated phosphine, phosphite, phosphinite, phosphonite, arsine, stibine, ether, (including cyclic ethers), amine, amide, imine, sulfoxide, carboxyl, nitrosyl, pyridine, substituted pyridine, imidazole, substituted imidazole, pyrazine, substituted pyrazine and thioether. Exemplary ligands are trisubstituted phosphines. Preferred trisubstituted phosphines are of the formula $PR^{H1}R^{H2}R^{H3}$, where $R^{H1}$, $R^{H2}$, and $R^{H3}$ are each independently optionally substituted: $C_{6-10}$ aryl or $C_1$-$C_{10}$ alkyl, or $C_{3-10}$ cycloalkyl. Preferably, $L^1$ and $L^2$ are independently selected from the group consisting of trimethylphosphine ($PMe_3$), triethylphosphine ($PEt_3$), tri-n-butylphosphine ($PBu_3$), tri(ortho-tolyl)phosphine (P-o-$tolyl_3$), tri-tert-butylphosphine (P-tert-$Bu_3$), tricyclopentylphosphine ($PCp_3$), tricyclohexylphosphine ($PCy_3$), triisopropylphosphine (P-i-$Pr_3$), trioctylphosphine ($POct_3$), triisobutylphosphine, (P-i-$Bu_3$), triphenylphosphine ($PPh_3$), tri(pentafluorophenyl)phosphine ($P(C_6F_5)_3$), methyldiphenylphosphine ($PMePh_2$), dimethylphenylphosphine ($PMe_2Ph$), and diethylphenylphosphine ($PEt_2Ph$).

$L^1$ and/or $L^2$ may be independently selected from

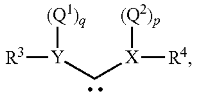

wherein X and Y are independently C, $CR^{3a}$, N, O, S, or P; only one of X or Y can be C or $CR^{3a}$; typically, X and Y are independently N; $Q^1$, $Q^2$, $R^3$, $R^{3a}$ and $R^4$ are independently hydrogen optionally substituted hydrocarbyl, optionally substituted heteroatom-containing hydrocarbyl; generally, $Q^1$, $Q^2$, $R^3$, $R^{3a}$ and $R^4$ are optionally linked to X or to Y via a linker such as optionally substituted hydrocarbylene, optionally substituted heteroatom-containing hydrocarbylene, or —(CO)—; typically $Q^1$, $Q^2$, $R^3$, $R^{3a}$ and $R^4$ are directly linked to X or to Y; and p is 0, when X is O or S, p is 1, when X is N, P or $CR^{3a}$, and p is 2, when X is C; q is 0, when Y is 0 or S, q is 1, when Y is N, P or $CR^{3a}$, and q is 2, when X is C.

$L^1$ and/or $L^2$ may also be independently selected from

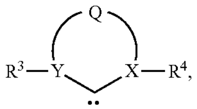

wherein Q is a two-atom linkage having the structure $-[CR^{11}R^{12}]_s-[CR^{13}R^{14}]_t-$ or $-[CR^{11}{=}CR^{13}]-$; typically Q is $-[CR^{11}R^{12}]_s-[CR^{13}R^{14}]_t-$, wherein $R^{11}$, $R^{12}$, $R^{13}$, and $R^{14}$ are independently hydrogen, optionally substituted hydrocarbyl, optionally substituted heteroatom-containing hydrocarbyl; typically $R^{11}$, $R^{12}$, $R^{13}$, and $R^{14}$ are independently hydrogen, optionally substituted $C_1$-$C_{12}$ alkyl, optionally substituted $C_1$-$C_{12}$ heteroalkyl, optionally substituted $C_5$-$C_{14}$ aryl; "s" and "t" are independently 1 or 2; typically, "s" and "t" are independently 1; or any two of $R^{11}$, $R^{12}$, $R^{13}$, and $R^{14}$ are optionally linked together and can form an optionally substituted, saturated or unsaturated polycyclic ring structure.

$L^1$ and/or $L^2$ can also be independently selected from

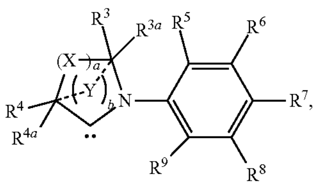

wherein:

X is —$CR^{1a}R^{2a}$—;

a is 1 or 2;

$R^{1a}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, or together with $R^{2a}$ forms an optionally substituted spiro monocyclic or spiro polycyclic $C_{3-10}$ cycloalkyl or spiro heterocyclic ring, with the carbon atom to which they are attached, or together with $R^3$ or together with $R^4$ forms an optionally substituted polycyclic ring;

$R^{2a}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, or together with $R^{1a}$ forms a spiro monocyclic or spiro polycyclic $C_{3-10}$ cycloalkyl or spiro heterocyclic ring, with the carbon atom to which they are attached, or together with $R^3$ or together with $R^4$ forms an optionally substituted polycyclic ring;

Y is —$CR^{1b}R^{2b}$—;

b is 0, 1, or 2;

$R^{1b}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, or together with $R^{2b}$ forms a five-, six-, or ten-membered cycloalkyl or heterocyclic ring, with the carbon atom to which they are attached;

$R^{2b}$ is H, optionally substituted $C_{1-24}$ alkyl, optionally substituted $C_{3-8}$ cycloalkyl, halogen, optionally substituted $C_5$-$C_{24}$ aryl, optionally substituted $C_6$-$C_{24}$ aralkyl, optionally substituted $C_1$-$C_{20}$ heteroalkyl, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, or together with $R^{1b}$ forms a five-, six-, or ten-membered cycloalkyl or heterocyclic ring, with the carbon atom to which they are attached;

$R^3$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^{33}$ can form an optionally substituted spiro monocyclic or spiro polycyclic $C_{3-10}$ cycloalkyl;

$R^{3a}$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^3$ can form an optionally substituted spiro monocyclic or spiro polycyclic $C_{3-10}$ cycloalkyl;

$R^4$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^{4a}$ can form an optionally substituted spiro monocyclic or spiro polycyclic $C_{3-10}$ cycloalkyl;

$R^{4a}$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^{1a}$ or together with $R^{2a}$ can form an optionally substituted polycyclic ring, or together with $R^4$ can form an optionally substituted spiro monocyclic or spiro polycyclic $C_{3-10}$ cycloalkyl;

$R^5$ is H, optionally substituted $C_{1-24}$ alkyl, halogen-C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^6$ can form an optionally substituted polycyclic ring;

$R^6$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl or together with $R^5$ or together with $R^7$ can form an optionally substituted polycyclic ring;

$R^7$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^6$ or together with $R^8$ can form an optionally substituted polycyclic ring;

$R^8$ is H, optionally substituted $C_{1-24}$ alkyl, halogen-C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^7$ or together with $R^9$ can form an optionally substituted polycyclic ring;

$R^9$ is H, optionally substituted $C_{1-24}$ alkyl, halogen, —C(O)$R^{21}$, —$OR^{22}$, CN, —$NR^{23}R^{24}$, $NO_2$, —$CF_3$, —$S(O)_xR^{25}$, —$P(O)(OH)_2$, —$OP(O)(OH)_2$, —$SR^{27}$, optionally substituted heterocycle, optionally substituted $C_{3-8}$ cycloalkyl, optionally substituted $C_{5-24}$ aryl, optionally substituted $C_{3-12}$ cycloalkenyl, or together with $R^8$ can form a polycyclic ring;

$R^{21}$ is OH, $OR^{26}$, $NR^{23}R^{24}$, optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{22}$ is H, optionally substituted $C_{1-24}$ alkyl, optionally substituted $C_{3-8}$cycloalkyl, optionally substituted heterocycle, optionally substituted $C_{5-24}$ aryl or optionally substituted $C_{3-12}$ cycloalkenyl;

$R^{23}$ is H, optionally substituted $C_{1-24}$ alkyl, optionally substituted $C_{3-8}$cycloalkyl, optionally substituted heterocycle, optionally substituted $C_{5-24}$ aryl or optionally substituted $C_{3-12}$ cycloalkenyl;

$R^{24}$ is H, optionally substituted $C_{1-24}$ alkyl, optionally substituted $C_{3-8}$cycloalkyl, optionally substituted heterocycle, optionally substituted $C_{5-24}$ aryl or optionally substituted $C_{3-12}$ cycloalkenyl;

$R^{25}$ is H, optionally substituted $C_{1-24}$ alkyl, $OR^{22}$, —$NR^{23}R^{24}$, optionally substituted heterocycle, optionally substituted $C_{3-8}$ cycloalkyl, optionally substituted $C_{5-24}$ aryl or optionally substituted $C_{3-12}$ cycloalkenyl;

$R^{26}$ is optionally substituted $C_{1-24}$ alkyl, optionally substituted $C_{3-8}$ cycloalkyl, optionally substituted heterocycle, optionally substituted $C_{5-24}$ aryl or optionally substituted $C_{3-12}$ cycloalkenyl;

$R^{27}$ is H, optionally substituted $C_{1-24}$ alkyl, optionally substituted $C_{3-8}$cycloalkyl, optionally substituted heterocycle, optionally substituted $C_{5-24}$ aryl or optionally substituted $C_{3-12}$ cycloalkenyl;

x is 1 or 2; and with the provisos a. when a is 2, then the "X-X" bond can be saturated or unsaturated;

b. when b is 2, the "Y—Y" bond can be saturated or unsaturated;

c. when a is 2, and the "X-X" bond is unsaturated, then $R^{2a}$ is nil;

d. when b is 1, then $R^{3a}$ and $R^{4a}$ are both nil;

e. when b is 2, then $R^{3a}$ and $R^{4a}$ are both nil;

f. when b is 2, and the "Y—Y" bond is unsaturated, then $R^{2b}$ is nil.

$L^1$ and/or $L^2$ may also be independently selected from

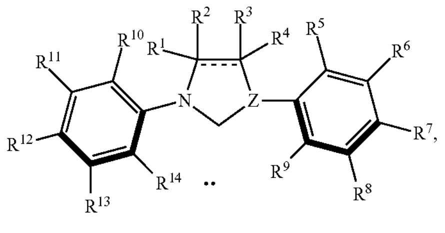

wherein:

Z is N or $CR^{32}$;

$R^1$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ can form a spiro compound or together with $R^3$ or together with $R^4$ can form a polycyclic ring;

$R^2$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^1$ can form a spiro compound or together with $R^3$ or together with $R^4$ can form a polycyclic ring;

$R^3$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl or optionally substituted $C_{3-8}$ cycloalkenyl or together with $R^2$ or together with $R^1$ can form a polycyclic ring or together with $R^4$ can form a spiro compound;

$R^4$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^3$ can form a spiro compound or together with $R^2$ or together with $R^1$ can form a polycyclic ring;

$R^5$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^6$ can form an optionally substituted polycyclic ring;

$R^6$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^5$ or together with $R^7$ can form an optionally substituted polycyclic ring;

$R^7$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl optionally substituted $C_{3-8}$ cycloalkenyl, or together with $R^6$ or together with $R^8$ can form an optionally substituted polycyclic ring;

$R^8$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^7$ or together with $R^9$ can form an optionally substituted polycyclic ring;

$R^9$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^8$ can form an optionally substituted polycyclic ring;

$R^{10}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ can form an optionally substituted polycyclic ring;

$R^{11}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{10}$ or together with $R^{12}$ can form an optionally substituted polycyclic ring;

$R^{12}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ or together with $R^{13}$ can form an optionally substituted polycyclic ring;

$R^{13}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{14}$ or together with $R^{12}$ can form an optionally substituted polycyclic ring;

$R^{14}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{13}$ can form a polycyclic ring;

$R^{32}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{25}$ is OH, O$R^{30}$, N$R^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, O$R^{26}$, —N$R^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl; and x is 1 or 2.

$L^1$ and/or $L^2$ may also be independently selected from

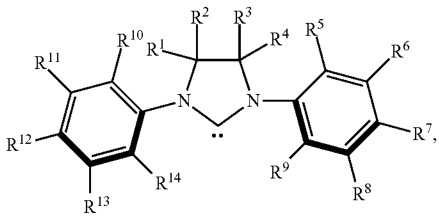

wherein:

$R^1$ is H, optionally substituted $C_{1-2}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^2$ can form a spiro compound or together with $R^3$ or together with $R^4$ can form a polycyclic ring;

$R^2$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^1$ can form a spiro compound or together with $R^3$ or together with $R^4$ can form a polycyclic ring;

$R^3$ is H, optionally substituted $C_{1-2}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{6-10}$ aryl or optionally substituted $C_{3-8}$ cycloalkenyl or together with $R^2$ or together with $R^1$ can form a polycyclic ring or together with $R^4$ can form a spiro compound;

$R^4$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{6-10}$ aryl, optionally substituted $C_{3-8}$ cycloalkenyl, or together with $R^3$ can form a spiro compound or together with $R^2$ or together with $R^1$ can form a polycyclic ring;

$R^5$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^6$ can form an optionally substituted polycyclic ring;

$R^6$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^5$ or together with $R^7$ can form an optionally substituted polycyclic ring;

$R^7$ is H, optionally substituted $C_{1-12}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{5-7}$ cycloalkyl, optionally substituted $C_{6-10}$ aryl optionally substituted $C_{3-8}$ cycloalkenyl, or together with $R^6$ or together with $R^8$ can form an optionally substituted polycyclic ring;

$R^8$ is H, optionally substituted $C_{1-24}$ alkyl, halogen, —C(O)$R^{25}$, —$OR^{26}$, CN, —$NR^{27}R^{28}$, $NO_2$, —$CF_3$, —$S(O)_xR^{29}$, —P(O)$(OH)_2$, —OP(O)$(OH)_2$, —$SR^{31}$, optionally substituted heterocycle, optionally substituted $C_{3-10}$ cycloalkyl, optionally substituted $C_{6-10}$ aryl, optionally substituted $C_{3-8}$ cycloalkenyl, or together with $R^7$ or together with $R^9$ can form an optionally substituted polycyclic ring;

$R^9$ is H, optionally substituted $C_{1-24}$ alkyl, halogen, —C(O)$R^{25}$, —$OR^{26}$, CN, —$NR^{27}R^{28}$, $NO_2$, —$CF_3$, —$S(O)_xR^{29}$, —P(O)$(OH)_2$, —OP(O)$(OH)_2$, —$SR^{31}$, optionally substituted heterocycle, optionally substituted $C_{3-10}$ cycloalkyl, optionally substituted $C_{6-10}$ aryl, optionally substituted $C_{5-7}$ cycloalkenyl, or together with $R^8$ can form an optionally substituted polycyclic ring;

$R^{10}$ is H, optionally substituted $C_{1-24}$ alkyl, halogen, —C(O)$R^{25}$, —$OR^{26}$, CN, —$NR^{27}R^{28}$, $NO_2$, —$CF_3$, —$S(O)_xR^{29}$, —P(O)$(OH)_2$, —OP(O)$(OH)_2$, —$SR^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^{11}$ can form an optionally substituted polycyclic ring;

$R^{11}$ is H, optionally substituted $C_{1-124}$ alkyl, halogen, —C(O)$R^{25}$, —$OR^{26}$, CN, —$NR^{27}R^{28}$, $NO_2$, —$CF_3$, —$S(O)_xR^{29}$, —P(O)$(OH)_2$, —OP(O)$(OH)_2$, —$SR^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{10}$ or together with $R^{12}$ can form an optionally substituted polycyclic ring;

$R^{12}$ is H, optionally substituted $C_{1-2}$ alkyl, halogen, —C(O)$R^{25}$, —$OR^{26}$, CN, —$NR^{27}R^{28}$, $NO_2$, —$CF_3$, —$S(O)_xR^{29}$, —P(O)$(OH)_2$, —OP(O)$(OH)_2$, —$SR^{31}$, optionally substituted heterocycle, optionally substituted $C_{3-10}$ cycloalkyl, optionally substituted $C_{6-10}$ aryl, optionally substituted $C_{3-8}$ cycloalkenyl, or together with $R^{11}$ or together with $R^{13}$ can form an optionally substituted polycyclic ring;

$R^{13}$ is H, optionally substituted $C_{1-12}$ alkyl, halogen, —C(O)$R^{25}$, —$OR^{26}$, CN, —$NR^{27}R^{28}$, $NO_2$, —$CF_3$, —$S(O)_xR^{29}$, —P(O)$(OH)_2$, —OP(O)$(OH)_2$, —$SR^{31}$, optionally substituted heterocycle, optionally substituted $C_{5-7}$ cycloalkyl, optionally substituted $C_{6-10}$ aryl, optionally substituted $C_{3-8}$ cycloalkenyl, or together with $R^{14}$ or together with $R^{12}$ can form an optionally substituted polycyclic ring;

$R^{14}$ is H, optionally substituted $C_{1-12}$ alkyl, halogen, —C(O)$R^{25}$, —$OR^{26}$, CN, —$NR^{27}R^{28}$, $NO_2$, —$CF_3$, —$S(O)_xR^{29}$, —P(O)$(OH)_2$, —OP(O)$(OH)_2$, —$SR^{31}$, optionally substituted heterocycle, optionally substituted $C_{5-7}$ cycloalkyl, optionally substituted $C_{5-24}$ aryl, optionally substituted $C_{3-8}$ cycloalkenyl, or together with $R^{13}$ can form a polycyclic ring;

$R^{25}$ is OH, $OR^{30}$, $NR^{27}R^{28}$, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{26}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{27}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{28}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{29}$ is H, optionally substituted $C_{1-12}$ alkyl, $OR^{26}$, —$NR^{27}R^{28}$, optionally substituted heterocycle, optionally substituted $C_{5-7}$ cycloalkyl, optionally substituted $C_{6-10}$ aryl or optionally substituted $C_{3-8}$ cycloalkenyl;

$R^{30}$ is optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{31}$ is H, optionally substituted $C_{1-12}$ alkyl, optionally substituted $C_{3-10}$ cycloalkyl, optionally substituted heterocycle, optionally substituted $C_{6-10}$ aryl or optionally substituted $C_{3-8}$ cycloalkenyl; and x is 1 or 2.

$L^1$ and/or $L^2$ may also be independently selected from

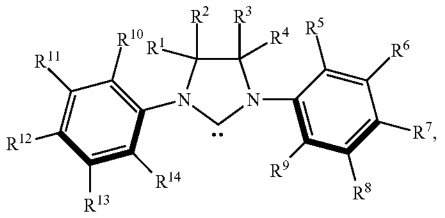

wherein:

$R^1$ is H, phenyl, methyl, ethyl, iso-propyl, n-propyl, n-butyl, tert-butyl, or sec-butyl;

$R^2$ is H, phenyl, methyl, ethyl, iso-propyl, n-propyl, n-butyl, tert-butyl, or sec-butyl;

$R^3$ is H, phenyl, methyl, ethyl, iso-propyl, n-propyl, n-butyl, tert-butyl, or sec-butyl;

$R^4$ is H, phenyl, methyl, ethyl, iso-propyl, n-propyl, n-butyl, tert-butyl, or sec-butyl;

$R^5$ is H, methyl, ethyl, iso-propyl, n-propyl, n-butyl, tert-butyl, sec-butyl, F, optionally substituted phenyl, or together with $R^6$ can form an optionally substituted polycyclic ring;

$R^6$ is H, methyl, ethyl, iso-propyl, n-propyl, n-butyl, tert-butyl, sec-butyl, F, optionally substituted phenyl, or together with $R^5$ or together with $R^7$ can form an optionally substituted polycyclic ring;

$R^7$ is H, methyl, ethyl, iso-propyl, n-propyl, n-butyl, tert-butyl, sec-butyl, optionally substituted phenyl, or together with $R^6$ or together with $R^8$ can form an optionally substituted polycyclic ring;

$R^8$ is H, methyl, ethyl, iso-propyl, n-propyl, n-butyl, tert-butyl, sec-butyl, optionally substituted phenyl, or together with $R^7$ or together with $R^9$ can form an optionally substituted polycyclic ring;

$R^9$ is H, methyl, ethyl, iso-propyl, n-propyl, n-butyl, tert-butyl, sec-butyl, F, optionally substituted phenyl, or together with $R^8$ can form a polycyclic ring;

$R^{10}$ is H, methyl, ethyl, iso-propyl, n-propyl, n-butyl, tert-butyl, sec-butyl, optionally substituted phenyl, or together with $R^{11}$ can form an optionally substituted polycyclic ring;

$R^{11}$ is H, methyl, ethyl, iso-propyl, n-propyl, n-butyl, tert-butyl, sec-butyl, optionally substituted phenyl, or together with $R^{10}$ or together with $R^2$ can form an optionally substituted polycyclic ring;

$R^{12}$ is H, methyl, ethyl, iso-propyl, n-propyl, n-butyl, tert-butyl, sec-butyl, F, optionally substituted phenyl, or together with $R^{11}$ or together with $R^{13}$ can form a polycyclic ring;

$R^{13}$ is H, methyl, ethyl, iso-propyl, n-propyl, n-butyl, tert-butyl, sec-butyl, F, optionally substituted phenyl, or together with $R^{12}$ or together with $R^{14}$ can form an optionally substituted polycyclic ring;

$R^{14}$ is H, methyl, ethyl, iso-propyl, n-propyl, n-butyl, tert-butyl, sec-butyl, optionally substituted phenyl, or together with $R^{13}$ can form an optionally substituted polycyclic ring.

$L^2$ may be

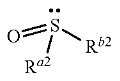

wherein: $R^{a2}$ is hydrogen, optionally substituted hydrocarbyl, optionally substituted heteroatom-containing hydrocarbyl; generally $R^{a2}$ is optionally substituted $C_1$-$C_{10}$ alkyl, optionally substituted $C_3$-$C_{10}$ cycloalkyl, optionally substituted $C_5$-$C_{24}$ aryl; typically $R^{a2}$ is methyl, ethyl, n-propyl, iso-propyl, n-butyl, tert-butyl, cyclohexyl or phenyl; and $R^{b2}$ is hydrogen, optionally substituted hydrocarbyl, optionally substituted heteroatom-containing hydrocarbyl; generally $R^{b2}$ is optionally substituted $C_1$-$C_{10}$ alkyl, optionally substituted $C_3$-$C_{10}$ cycloalkyl, optionally substituted $C_5$-$C_{24}$ aryl; typically $R^{b2}$ is methyl, ethyl, n-propyl, iso-propyl, n-butyl, tert-butyl, cyclohexyl or phenyl; or $R^{a2}$ and $R^{b2}$ are linked together to form a five or a six heterocyclic membered ring with the sulfoxide group [—S(O)—].

$L^2$ may also be

wherein: R is optionally substituted hydrocarbyl, optionally substituted heteroatom-containing hydrocarbyl; generally, R is optionally substituted $C_1$-$C_{10}$ alkyl, optionally substituted $C_3$-$C_{10}$ cycloalkyl, optionally substituted $C_5$-$C_{24}$ aryl; typically, R is methyl, ethyl, n-propyl, iso-propyl, n-butyl, tert-butyl, or phenyl.

$L^2$ may also be

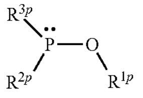

or,

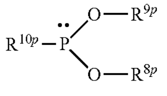

wherein: $R^{1p}$, $R^{2p}$, $R^{3p}$ are each independently optionally substituted $C_6$-$C_{10}$ aryl, or optionally substituted $C_1$-$C_{10}$ alkyl, or optionally substituted $C_3$-$C_{10}$ cycloalkyl. $R^{8p}$, $R^{9p}$, $R^{10p}$ are each independently optionally substituted $C_6$-$C_{10}$ aryl, or optionally substituted $C_1$-$C_{10}$ alkyl, or optionally substituted $C_3$-$C_{10}$ cycloalkyl.

$L^2$ may also be: $PR^{H1}R^{H2}R^{H3}$, wherein: $R^{H1}$, $R^{H2}$, and $R^{H3}$ are each independently optionally substituted $C_6$-$C_{10}$ aryl, or optionally substituted $C_1$-$C_{10}$ alkyl, or optionally substituted $C_3$-$C_{10}$ cycloalkyl. $R^{H1}$ may be methyl, ethyl, n-propyl, iso-propyl, n-butyl, tert-butyl, cyclohexyl, cyclopentyl or phenyl. $R^{H2}$ may be methyl, ethyl, n-propyl, iso-propyl, n-butyl, tert-butyl, cyclohexyl, cyclopentyl or phenyl. $R^{H3}$ may be methyl, ethyl, n-propyl, iso-propyl, n-butyl, tert-butyl, cyclohexyl, cyclopentyl or phenyl. $L^2$ may be :P(Cyclohexyl)$_3$, :P(Et)$_2$Ph, :P(Ph)$_3$.

$X^1$ and $X^2$ may be independently halogen, trifluoroacetate, per-fluorophenols or together they can form a nitrate; typically, $X^1$ and $X^2$ are independently Cl, Br, I or F. Preferably, $X^1$ and $X^2$ are both $C_1$.

$R^1$ may be hydrogen and $R^2$ may be optionally substituted phenyl, $C_1$-$C_6$ alkyl or substituted 1-propenyl; or $R^1$ and $R^2$ are linked together to form one or more cyclic groups, such as a substituted indenylidene, specifically 3-phenylindenylid-1-ene. $R^1$ may also be hydrogen and $R^2$ may be 2-methyl-1-propenyl. $R^1$ and $R^2$ may also form together a 3-phenylindenylid-1-ene. $R^1$ can also be hydrogen and $R^2$ can be phenyl.

$L^2$ may be

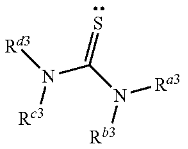

wherein: $R^{a3}$ is optionally substituted hydrocarbyl, optionally substituted heteroatom-containing hydrocarbyl; generally $R^{a3}$ is optionally substituted $C_1$-$C_{10}$ alkyl, optionally substituted $C_3$-$C_{10}$ cycloalkyl, optionally substituted $C_5$-$C_{24}$ aryl; typically $R^{a3}$ is methyl, ethyl, n-propyl, iso-propyl, n-butyl, tert-butyl, cyclohexyl, benzyl or phenyl; $R^{b3}$ is optionally substituted hydrocarbyl, optionally substituted heteroatom-containing hydrocarbyl; generally, $R^{b3}$ is optionally substituted $C_1$-$C_{10}$ alkyl, optionally substituted $C_3$-$C_{10}$ cycloalkyl, optionally substituted $C_5$-$C_{24}$ aryl; typically, $R^{b3}$ is methyl, ethyl, n-propyl, iso-propyl, n-butyl, tert-butyl, cyclohexyl, benzyl or phenyl; or $R^{a3}$ and $R^{b3}$ can be linked to form a five-, six- or seven-membered heterocycle ring with the nitrogen atom they are linked to; $R^{c3}$ is optionally substituted hydrocarbyl, optionally substituted heteroatom-containing hydrocarbyl; generally, $R^{c3}$ is optionally substituted $C_1$-$C_{10}$ alkyl, optionally substituted $C_3$-$C_{10}$ cycloalkyl, optionally substituted $C_5$-$C_{24}$ aryl; typically, $R^{c3}$ is methyl, ethyl, n-propyl, iso-propyl, n-butyl, tert-butyl, cyclohexyl, benzyl or phenyl; $R^{d3}$ is optionally substituted hydrocarbyl, optionally substituted heteroatom-containing hydrocarbyl; generally, $R^{d3}$ is optionally substituted $C_1$-$C_{10}$ alkyl, optionally substituted $C_3$-$C_{10}$ cycloalkyl, optionally substituted $C_5$-$C_{24}$ aryl; typically, $R^{d3}$ is methyl, ethyl, n-propyl, iso-propyl, n-butyl, tert-butyl, cyclohexyl, benzyl or phenyl; or $R^{c3}$ and $R^{d3}$ can be linked to form a five-, six- or seven-membered heterocycle ring with the nitrogen atom they are linked to; or $R^{b3}$ and $R^{c3}$ can be linked to form a five-, six- or seven-membered heterocycle ring with the nitrogen atoms they are linked to.

The moiety

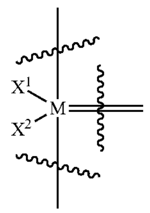

may be

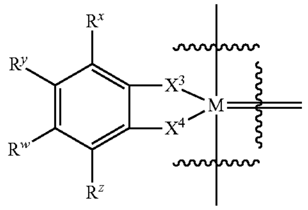

wherein: $X^3$ and $X^4$ are independently O or S; typically, $X^3$ and $X^4$ are independently S; and $R^x$, $R^y$, $R^w$, and $R^z$ are independently hydrogen, halogen, optionally substituted hydrocarbyl, optionally substituted heteroatom-containing hydrocarbyl; generally $R^x$, $R^y$, $R^w$, and $R^z$ are independently hydrogen, halogen, optionally substituted $C_1$-$C_{12}$ alkyl, optionally substituted $C_3$-$C_{10}$ cycloalkyl, optionally substituted $C_5$-$C_{24}$ aryl; typically, $R^{x1}$, $R^y$, $R^w$, and $R^z$ are independently $C_1$-$C_6$ alkyl, hydrogen, optionally substituted phenyl, or halogen; or $R^{x1}$ and $R^y$ are linked together to form an optionally substituted bicyclic or polycyclic aryl; or $R^w$ and $R^z$ are linked together to form an optionally substituted bicyclic or polycyclic aryl; or $R^y$ and $R^w$ are linked together to form an optionally substituted bicyclic or polycyclic aryl.

The olefin metathesis catalyst used in the composition of the invention may also be represented by the general structure of Formula (2):

Formula (2)

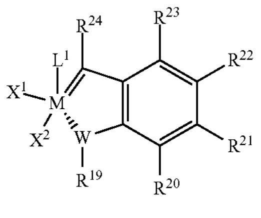

wherein:

M is ruthenium;

$L^1$, $X^1$, and $X^2$ are as defined herein;

W is O, halogen, $NR^{33}$ or S;

$R^{19}$ is H, optionally substituted $C_{1-24}$ alkyl, —$C(R^{34})(R^{35})COOR^{36}$, —$C(R^{34})(R^{35})C(O)H$, —$C(R^{34})(R^{35})C(O)R^{37}$, —$C(R^{34})(R^{35})CR^{38}(OR^{39})(OR^{40})$, —$C(R^{34})(R^{35})C(O)NR^{41}R^{42}$, —$C(R^{34})(R^{35})C(O)NR^{41}OR^{40}$, —$C(O)R^{25}$, optionally substituted heterocycle, optionally substituted $C_{3-10}$ cycloalkyl, optionally substituted $C_{5-24}$ aryl, optionally substituted $C_{3-8}$ cycloalkenyl, or when W is $NR^{33}$, then $R^{19}$ together with $R^{33}$ can form an optionally substituted heterocyclic ring or when W is halogen then $R^{19}$ is nil;

$R^{20}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ can form a polycyclic ring;

$R^{21}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{21}$ or together with $R^{23}$ can form a polycyclic ring;

$R^{23}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{22}$ can form a polycyclic ring;

$R^{24}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl or optionally substituted $C_{3-8}$ cycloalkenyl;

$R^{25}$ is OH, $OR^{30}$, $NR^{27}R^{28}$, optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{26}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{27}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{28}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{29}$ is H, optionally substituted $C_{1-24}$ alkyl, $OR^{26}$, —$NR^{27}R^{28}$, optionally substituted heterocycle, optionally substituted $C_{3-10}$ cycloalkyl, optionally substituted $C_{5-24}$ aryl or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{31}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{33}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{34}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{35}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{36}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{37}$ is optionally substituted $C_{1-24}$ alkyl, optionally substituted $C_{3-10}$ cycloalkyl, optionally substituted heterocycle, optionally substituted $C_{5-24}$ aryl or optionally substituted $C_{3-8}$ cycloalkenyl;

$R^{38}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{39}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{40}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{41}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl;

$R^{42}$ is H, optionally substituted $C_{1-24}$ alkyl, optionally substituted $C_{3-10}$cycloalkyl, optionally substituted heterocycle, optionally substituted $C_{5-24}$ aryl or optionally substituted $C_{3-8}$ cycloalkenyl; and x is 1 or 2.

The olefin metathesis catalyst used in the composition of the invention may also be represented by the general structure of Formula (2):

Formula (2)

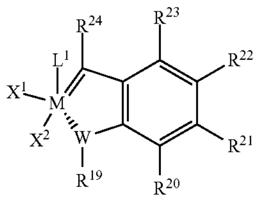

wherein:

M is ruthenium;

$L^1$, $X^1$, and $X^2$ are as defined herein;

W is O, halogen, $NR^{33}$, or S;

$R^{19}$ is H, optionally substituted $C_{1-12}$ alkyl, —$C(R^{34})(R^{35})COOR^{36}$, —$C(R^{34})(R^{35})C(O)H$, —$C(R^{34})(R^{35})C(O)R^{37}$, —$C(R^{34})(R^{35})CR^{38}(OR^{39})(OR^{40})$, —$C(R^{34})(R^{35})C(O)NR^{41}R^{42}$, —$C(R^{34})(R^{35})C(O)NR^{41}OR^{40}$, —$C(O)R^{25}$, optionally substituted heterocycle, optionally substituted $C_{5-7}$ cycloalkyl, optionally substituted $C_{6-10}$ aryl, optionally substituted $C_{3-8}$ cycloalkenyl, or when W is $NR^{33}$, then $R^{19}$ together with $R^{33}$ can form an optionally substituted heterocyclic ring or when W is halogen then $R^{19}$ is nil;

$R^{20}$ is H, optionally substituted $C_{1-12}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{21}$ can form a polycyclic ring;

$R^{21}$ is H, optionally substituted $C_{1-12}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{20}$ or together with $R^{22}$ can form a polycyclic ring;

$R^{22}$ is H, optionally substituted $C_{1-12}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{21}$ or together with $R^{23}$ can form a polycyclic ring;

$R^{23}$ is H, optionally substituted $C_{1-12}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{5-7}$ cycloalkyl, optionally substituted $C_{6-10}$ aryl, optionally substituted $C_{3-8}$ cycloalkenyl or together with $R^{22}$ can form a polycyclic ring;

$R^{24}$ is H, optionally substituted $C_{1-12}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{5-7}$ cycloalkyl, optionally substituted $C_{6-10}$ aryl or optionally substituted $C_{3-8}$ cycloalkenyl;

$R^{25}$ is OH, $OR^{30}$, $NR^{27}R^{28}$, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{26}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{27}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{28}$ is H, optionally substituted $C_{1-12}$ alkyl, optionally substituted $C_{5-7}$ cycloalkyl, optionally substituted heterocycle, optionally substituted $C_{5-24}$ aryl or optionally substituted $C_{3-8}$ cycloalkenyl;

$R^{29}$ is H, optionally substituted $C_{1-12}$ alkyl, $OR^{26}$, —$NR^{27}R^{28}$, optionally substituted heterocycle, optionally substituted $C_{5-7}$ cycloalkyl, optionally substituted $C_{6-10}$ aryl or optionally substituted $C_{3-8}$ cycloalkenyl;

$R^{30}$ is optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{31}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{33}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{34}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{35}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{36}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{37}$ is optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{38}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{39}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{40}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{41}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl;

$R^{42}$ is H, optionally substituted $C_{1-12}$ alkyl, optionally substituted $C_{5-7}$ cycloalkyl, optionally substituted heterocycle, optionally substituted $C_{6-10}$ aryl or optionally substituted $C_{3-8}$ cycloalkenyl; and x is 1 or 2.

The olefin metathesis catalyst used in the composition of the invention may also be represented by the structure of Formula (2):

Formula (2)

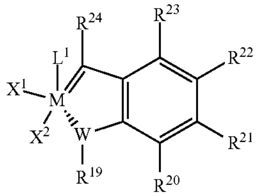

wherein:

M is ruthenium;

$L^1$, $X^1$, and $X^2$ are as defined herein;

W is O;

$R^{19}$ is H, methyl, ethyl, n-propyl, iso-propyl, n-butyl, tert-butyl, cyclohexyl, cyclopentyl or phenyl;

$R^{20}$ is H, methyl, ethyl, n-propyl, iso-propyl, n-butyl, tert-butyl, cyclohexyl, cyclopentyl or phenyl;

$R^{21}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, methyl, ethyl, n-propyl, iso-propyl, n-butyl, tert-butyl, cyclohexyl, cyclopentyl or phenyl;

$R^{23}$ is H, methyl, ethyl, n-propyl, iso-propyl, n-butyl, tert-butyl, cyclohexyl, cyclopentyl or phenyl;

$R^{24}$ is H, methyl, ethyl, n-propyl, iso-propyl, n-butyl, tert-butyl, cyclohexyl, cyclopentyl or phenyl;

$R^{25}$ is OH, O$R^{30}$, N$R^{27}R^{28}$, methyl, ethyl, n-propyl, iso-propyl, n-butyl, tert-butyl, cyclohexyl, cyclopentyl or phenyl;

$R^{26}$ is H, methyl, ethyl, n-propyl, iso-propyl, n-butyl, tert-butyl, cyclohexyl, cyclopentyl or phenyl;

$R^{27}$ is H, methyl, ethyl, n-propyl, iso-propyl, n-butyl, tert-butyl, cyclohexyl, cyclopentyl or phenyl;

$R^{28}$ is H, methyl, ethyl, n-propyl, iso-propyl, n-butyl, tert-butyl, cyclohexyl, cyclopentyl or phenyl;

$R^{29}$ is H, methyl, ethyl, n-propyl, iso-propyl, n-butyl, tert-butyl, O$R^{26}$, —N$R^{27}R^{28}$, cyclohexyl, cyclopentyl or phenyl;

$R^{30}$ is methyl, ethyl, n-propyl, iso-propyl, n-butyl, tert-butyl, cyclohexyl, cyclopentyl or phenyl;

$R^{31}$ is H, methyl, ethyl, n-propyl, iso-propyl, n-butyl, tert-butyl, cyclohexyl, cyclopentyl or phenyl;

x is 1 or 2.

The olefin metathesis catalyst used in the composition of the invention may also be represented by the structure of Formula (2):

Formula (2)

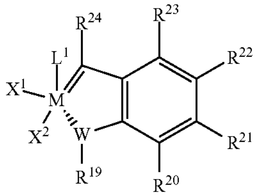

wherein:

$L^1$ is

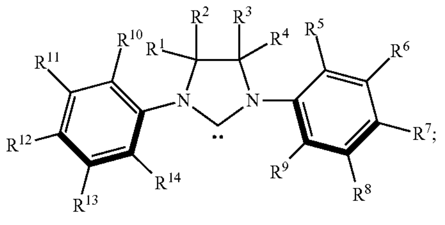

$R^1$ is H, phenyl, methyl, ethyl, iso-propyl, n-propyl, n-butyl, tert-butyl, or sec-butyl;

$R^2$ is H, phenyl, methyl, ethyl, iso-propyl, n-propyl, n-butyl, tert-butyl, or sec-butyl;

$R^3$ is H, phenyl, methyl, ethyl, iso-propyl, n-propyl, n-butyl, tert-butyl, or sec-butyl;

$R^4$ is H, phenyl, methyl, ethyl, iso-propyl, n-propyl, n-butyl, tert-butyl, or sec-butyl;

$R^5$ is H, methyl, ethyl, iso-propyl, n-propyl, n-butyl, tert-butyl, sec-butyl, F, optionally substituted phenyl, or together with $R^6$ can form an optionally substituted polycyclic ring;

$R^6$ is H, methyl, ethyl, iso-propyl, n-propyl, n-butyl, tert-butyl, sec-butyl, F, optionally substituted phenyl, or together with $R^5$ or together with $R^7$ can form an optionally substituted polycyclic ring;

$R^7$ is H, methyl, ethyl, iso-propyl, n-propyl, n-butyl, tert-butyl, sec-butyl, optionally substituted phenyl, or together with $R^6$ or together with $R^8$ can form an optionally substituted polycyclic ring;

$R^8$ is H, methyl, ethyl, iso-propyl, n-propyl, n-butyl, tert-butyl, sec-butyl, optionally substituted phenyl, or together with $R^7$ or together with $R^9$ can form an optionally substituted polycyclic ring;

$R^9$ is H, methyl, ethyl, iso-propyl, n-propyl, n-butyl, tert-butyl, sec-butyl, F, optionally substituted phenyl, or together with $R^8$ can form a polycyclic ring;

$R^{10}$ is H, methyl, ethyl, iso-propyl, n-propyl, n-butyl, tert-butyl, sec-butyl, optionally substituted phenyl, or together with $R^{11}$ can form an optionally substituted polycyclic ring;

$R^{11}$ is H, methyl, ethyl, iso-propyl, n-propyl, n-butyl, tert-butyl, sec-butyl, optionally substituted phenyl, or together with $R^{10}$ or together with $R^2$ can form an optionally substituted polycyclic ring;

$R^{12}$ is H, methyl, ethyl, iso-propyl, n-propyl, n-butyl, tert-butyl, sec-butyl, F, optionally substituted phenyl, or together with $R^{11}$ or together with $R^{13}$ can form a polycyclic ring;

$R^{13}$ is H, methyl, ethyl, iso-propyl, n-propyl, n-butyl, tert-butyl, sec-butyl, F, optionally substituted phenyl, or together with $R^{12}$ or together with $R^{14}$ can form an optionally substituted polycyclic ring;

$R^{14}$ is H, methyl, ethyl, iso-propyl, n-propyl, n-butyl, tert-butyl, sec-butyl, optionally substituted phenyl, or together with $R^{13}$ can form an optionally substituted polycyclic ring.

$R^{19}$ is H, methyl, ethyl, n-propyl, iso-propyl, n-butyl, tert-butyl, cyclohexyl, cyclopentyl or phenyl;

$R^{20}$ is H, methyl, ethyl, n-propyl, iso-propyl, n-butyl, tert-butyl, cyclohexyl, cyclopentyl or phenyl;

$R^{21}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^{20}$ or together with $R^{22}$ can form a polycyclic ring;

$R^{22}$ is H, methyl, ethyl, n-propyl, iso-propyl, n-butyl, tert-butyl, cyclohexyl, cyclopentyl or phenyl;

$R^{23}$ is H, methyl, ethyl, n-propyl, iso-propyl, n-butyl, tert-butyl, cyclohexyl, cyclopentyl or phenyl;

$R^{24}$ is H, methyl, ethyl, n-propyl, iso-propyl, n-butyl, tert-butyl, cyclohexyl, cyclopentyl or phenyl;

$R^{25}$ is OH, O$R^{30}$, N$R^{27}R^{28}$, methyl, ethyl, n-propyl, iso-propyl, n-butyl, tert-butyl, cyclohexyl, cyclopentyl or phenyl;

$R^{26}$ is H, methyl, ethyl, n-propyl, iso-propyl, n-butyl, tert-butyl, cyclohexyl, cyclopentyl or phenyl;

$R^{27}$ is H, methyl, ethyl, n-propyl, iso-propyl, n-butyl, tert-butyl, cyclohexyl, cyclopentyl or phenyl;

$R^{28}$ is H, methyl, ethyl, n-propyl, iso-propyl, n-butyl, tert-butyl, cyclohexyl, cyclopentyl or phenyl;

$R^{29}$ is H, methyl, ethyl, n-propyl, iso-propyl, n-butyl, tert-butyl, O$R^{26}$, —N$R^{27}R^{28}$, cyclohexyl, cyclopentyl or phenyl;

$R^{30}$ is methyl, ethyl, n-propyl, iso-propyl, n-butyl, tert-butyl, cyclohexyl, cyclopentyl or phenyl;

$R^{31}$ is H, methyl, ethyl, n-propyl, iso-propyl, n-butyl, tert-butyl, cyclohexyl, cyclopentyl or phenyl;

x is 1 or 2.

The olefin metathesis catalyst used in the composition of the invention may also be represented by the structure of Formula (2):

Formula (2)

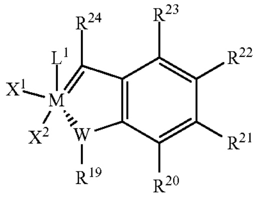

wherein:

$L^1$ is

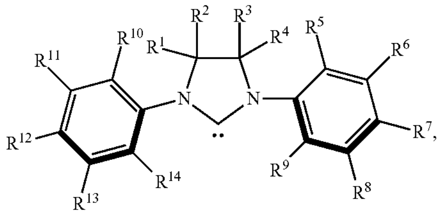

wherein:

$R^1$ is H;

$R^2$ is H;

$R^3$ is H;

$R^4$ is H;

$R^5$ is H, methyl, or iso-propyl;

$R^6$ is H;

$R^7$ is H, methyl;

$R^8$ is H;

$R^9$ is H, methyl, or iso-propyl;

$R^{10}$ is H, methyl, or iso-propyl;

$R^{11}$ is H;

$R^{12}$ is H or methyl;

$R^{13}$ is H;

$R^{14}$ is H, methyl, or iso-propyl;

$X^1$ and $X^2$ are Cl;

W is O;

$R^{19}$ is iso-propyl;

$R^{20}$ is H;

$R^{21}$ is H;

$R^{22}$ is H;

$R^{23}$ is H; and $R^{24}$ is H.

The olefin metathesis catalysts used in the compositions of the invention can be represented by general structures:

Formula (3)

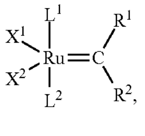

-continued
Formula (4)
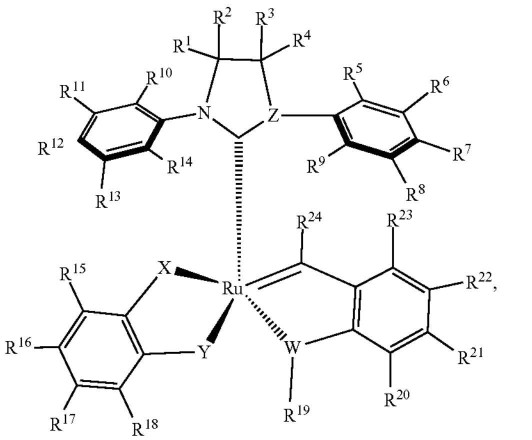
Formula (6)
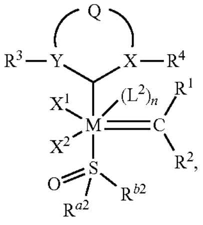
Formula (7)
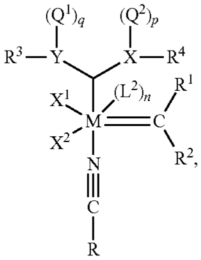
Formula (5)
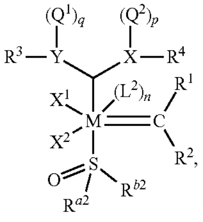
Formula (9)
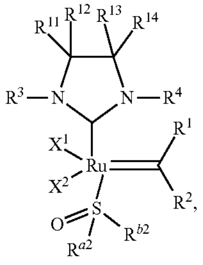
-continued
Formula (8)
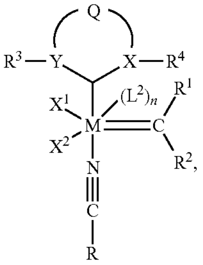
Formula (10)
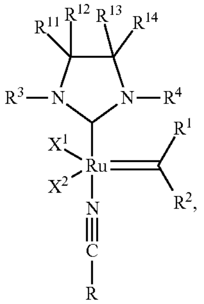
Formula (11)
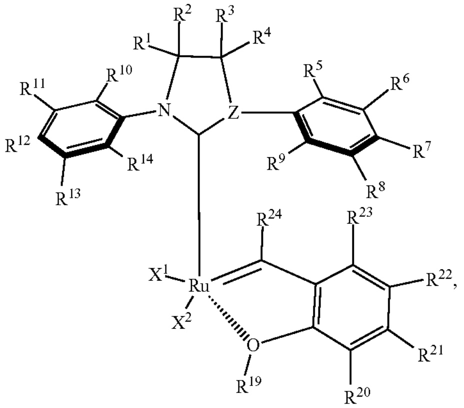
Formula (12)
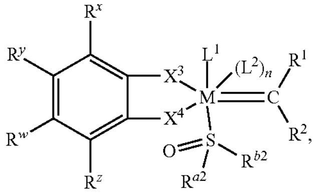
Formula (13)
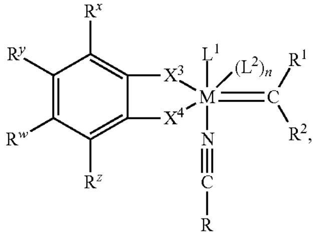

-continued
Formula (14)
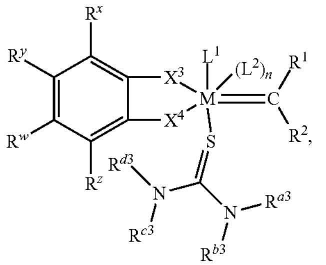
Formula (15)
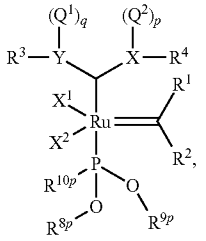
Formula (16)
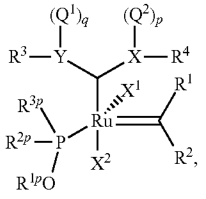
Formula (17)
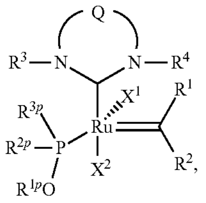
Formula (18)
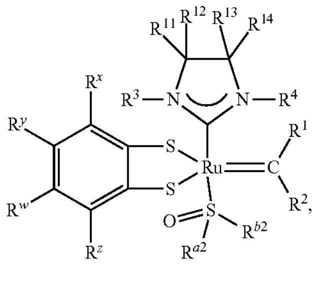
Formula (19)
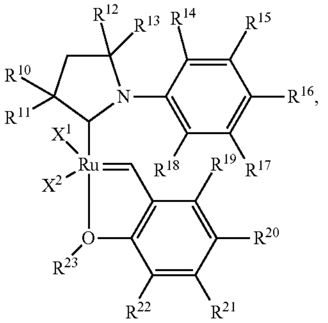
-continued
Formula (20)
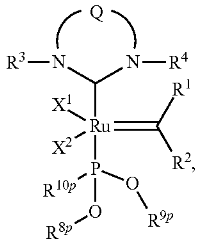
Formula (21)
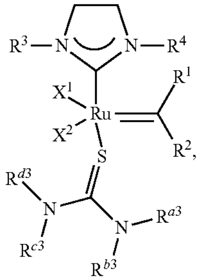
Formula (22)
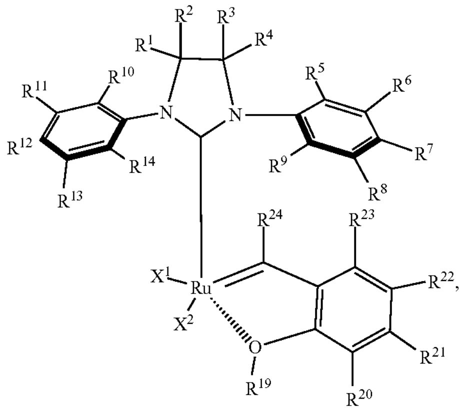
Formula (23)
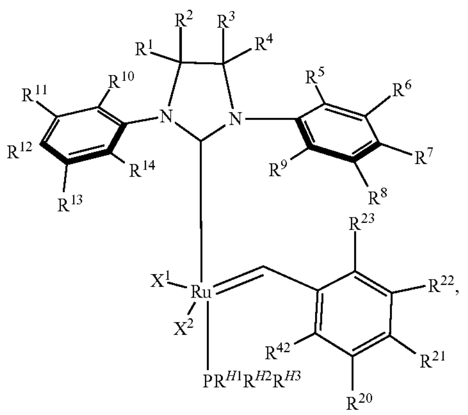

-continued

Formula (24)

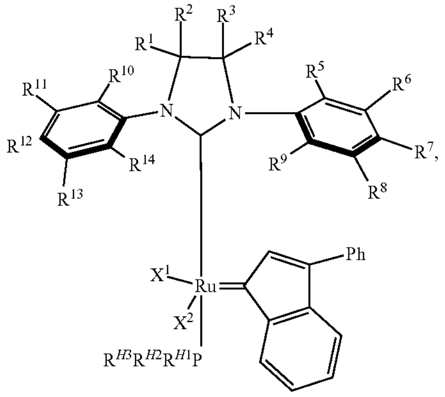

Formula (25)

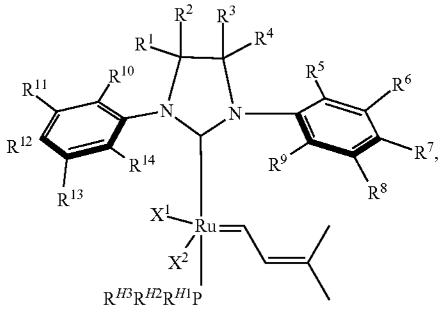

Formula (26)

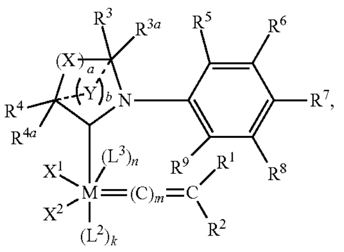

wherein Q, $Q^1$, $Q^2$, p q, $X^1$, $X^2$, $X^3$, $X^4$, R, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{20}$, $R^{21}$, $R^{22}$, $R^{23}$, $R^{24}$, $R^{a2}$, $R^{b2}$, $R^{a3}$, $R^{b3}$, $R^{c3}$, $R^{d3}$, $R^{1p}$, $R^{2p}$, $R^{3p}$, $R^{H1}$, $R^{H2}$, $R^{H3}$, $-(L^2)_n-$ and $R^{42}$ are as defined herein.

Preferred olefin metathesis catalysts used in the compositions of the invention are encompassed by Formulae:

Formula (22)

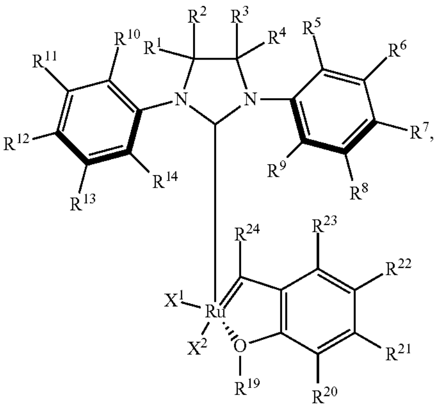

-continued

Formula (23)

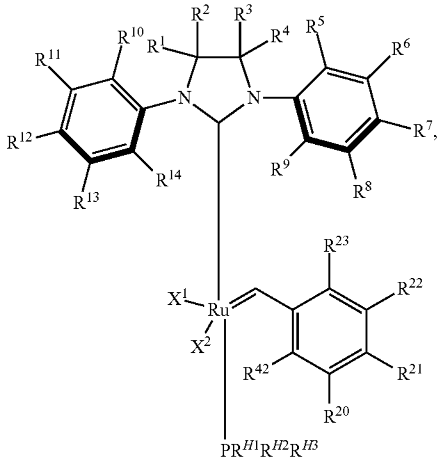

Formula (24)

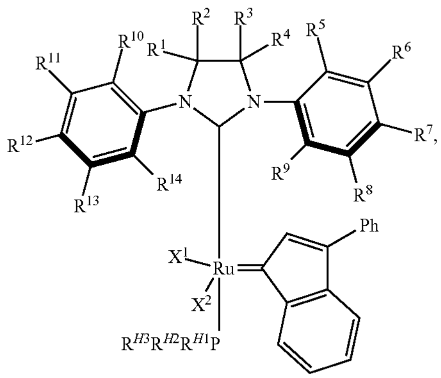

or

Formula (25)

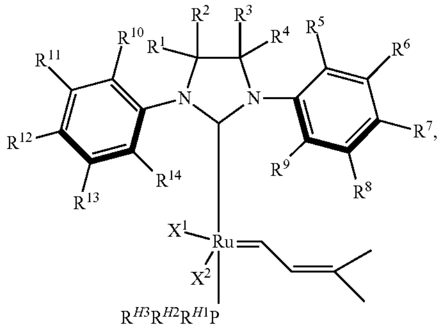

wherein $X^1$, $X^2$, $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{19}$, $R^{20}$, $R^{21}$, $R^{22}$, $R^{23}$, $R^{24}$, $R^{H1}$, $R^{H2}$, $R^{H3}$ and $R^{42}$ are as defined herein.

Most preferred olefin metathesis catalysts used in the compositions of the invention are encompassed by Formulae:
Formula (22)
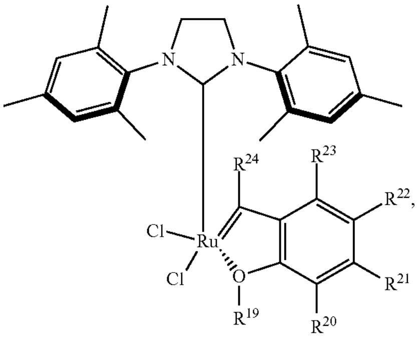
Formula (22)
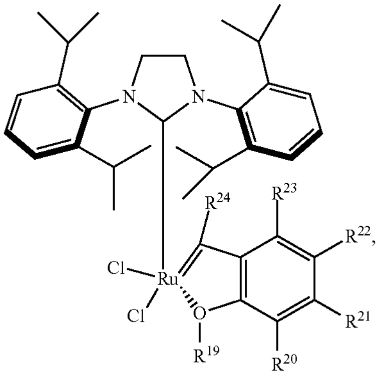
C627
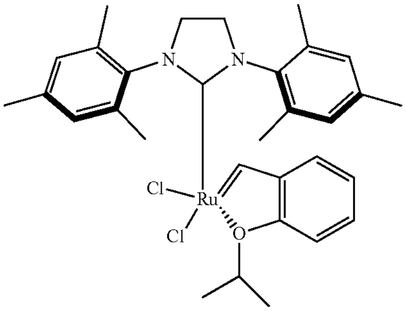
,
Formula (23)
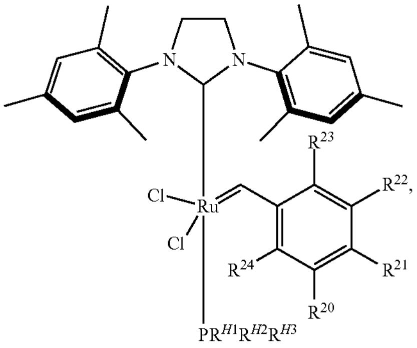
-continued
C835
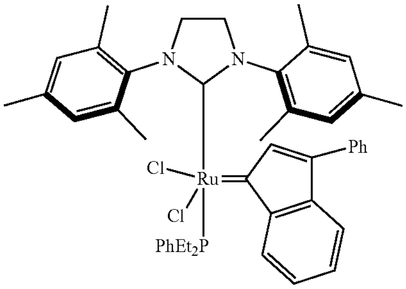
,
Formula (23)
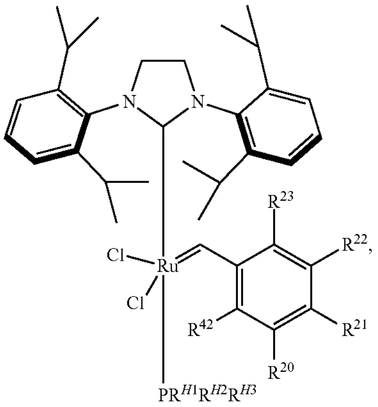
C848
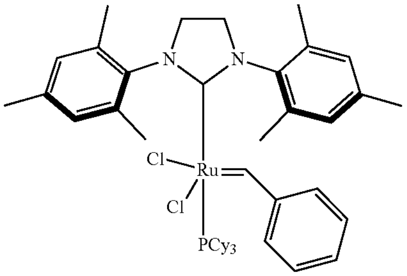
Formula (24)
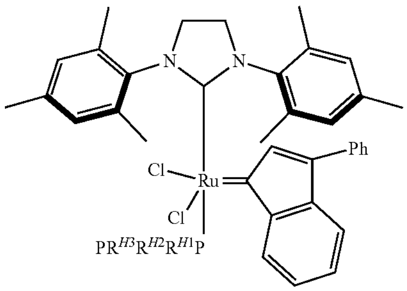
,
Formula (25)
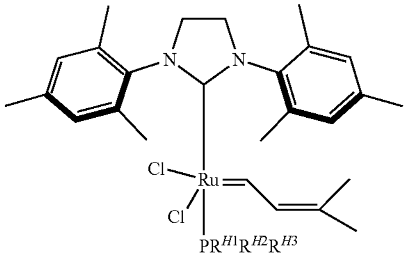
, -continued Formula (25)

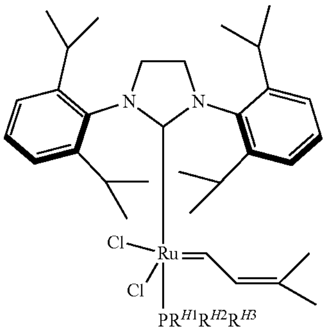

, or

C827

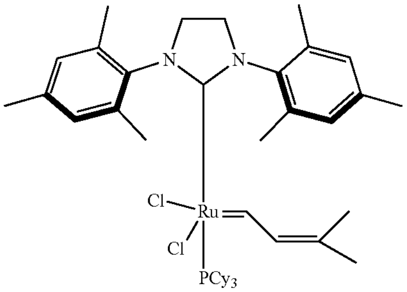

, wherein: $R^{19}$, $R^{20}$, $R^{21}$, $R^{22}$, $R^{23}$, $R^{24}$, Cy, $R^{H1}$, $R^{H2}$, $R^{H3}$ and $R^{42}$ are as defined herein.

It will be appreciated that the amount of catalyst that is used (i.e., the "catalyst loading") in the reaction is dependent upon a variety of factors such as the identity of the reactants and the reaction conditions that are employed. It is therefore understood that catalyst loading may be optimally and independently chosen for each reaction. In general, however, the catalyst will be present in an amount that ranges from a low of about 0.1 ppm, 1 ppm, or 5 ppm, to a high of about 10 ppm, 15 ppm, 25 ppm, 50 ppm, 100 ppm, 200 ppm, 500 ppm, or 1000 ppm relative to the amount of the cyclic olefin monomer.

The catalyst will generally be present in an amount that ranges from a low of about 0.00001 mol %, 0.0001 mol %, or 0.0005 mol %, to a high of about 0.001 mol %, 0.0015 mol %, 0.0025 mol %, 0.005 mol %, 0.01 mol %, 0.02 mol %, 0.05 mol %, or 0.1 mol % relative to the cyclic olefin monomer.

When expressed as the molar ratio of olefin to catalyst, the catalyst (the "olefin to catalyst ratio"), loading will generally be present in an amount that ranges from a low of about 10,000,000:1, 1,000,000:1, 500,000:1 or 200,00:1, to a high of about 100,000:1 60,000:1, 50,000:1, 45,000;1, 40,000:1, 30,000:1, 20,000:1, 10,000:1, 5,000:1, or 1,000:1.

Optional Components

The compositions of the invention may further contain a metal or non-metal substrate material, including, for example, a plastic or polymer substrate, a polymer-coated substrate (e.g., primer-coated steel), a glass fiber substrate, a carbon fiber substrate, a natural fiber substrate, and a metal oxide substrate.

The compositions of the invention may also contain at least one additive known in the art. Suitable additives include, but are not limited to, gel modifiers, hardness modulators, impact modifiers, fillers, binders, thixotropes, rheology modifiers, dispersants, wetting agents, plasticizers, pigments, flame retardants, dyes, fibers, reinforcement materials, coupling agents (e.g., silane coupling agents), adhesion promoters, film formers, lubricants, and stabilizers such as, for example, antioxidants, antiozonants, UV absorbers, and UV light stabilizers and other stabilizers known in the art. Furthermore, the amount of an additive added to the compositions may vary, depending on the particular type of additive. The additive and the additive loading should not interfere with polymerizing/curing the composition of the invention. Care should be taken when using chemistries that are known to inhibit ROMP. The concentration of the additives in the compositions typically ranges from, for example, about 0.001-95 wt. %, particularly, from about 0.1-75 wt. %, or even more particularly, from 1-60 wt. %, 5-70 wt. %, 10-60 wt. %, or from 20-60 wt. %.

Suitable impact modifiers or elastomers include without limitation natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, styrene-ethylene/butylene-styrene copolymer, styrene-ethylene/propylene-styrene copolymer, ethylene-propylene-diene terpolymers, ethylene-vinyl acetate and nitrile rubbers.

Suitable antioxidants or antiozonants include without limitation: primary antioxidants such as 2,6-di-tert-butyl-4-methylphenol (BHT); styrenated phenols, such as Wingstay® S (Goodyear); 2- and 3-tert-butyl-4-methoxyphenol; alkylated hindered phenols, such as Wingstay C (Goodyear); 4-hydroxymethyl-2,6-di-tert-butylphenol; 2,6-di-tert-butyl-4-sec-butylphenol; 2,2'-methylenebis(4-methyl-6-tert-butylphenol); 2,2'-methylenebis(4-ethyl-6-tert-butylphenol); 4,4'-methylenebis(2,6-di-tert-butylphenol); miscellaneous bisphenols, such as Cyanox® 53 and Permanax WSO; 2,2'-ethylidenebis(4,6-di-tert-butylphenol); 2,2'-methylenebis(4-methyl-6-(1-methylcyclohexyl)phenol); 4,4'-butylidenebis(6-tert-butyl-3-methylphenol); polybutylated Bisphenol A; 4,4'-thiobis(6-tert-butyl-3-methylphenol); 4,4'-methylenebis(2,6-dimethylphenol); 1,1'-thiobis(2-naphthol); methylene bridged polyaklylphenols, such as Ethyl antioxidant 738; 2,2'-thiobis(4-methyl-6-tert-butylphenol); 2,2'-isobutylidenebis(4,6-dimethylphenol); 2,2'-methylenebis(4-methyl-6-cyclohexylphenol); butylated reaction products of p-cresol and dicyclopentadiene, such as Wingstay L; tetrakis(methylene-3,5-di-tert-butyl-4-hydroxyhydrocinnamate)methane, i.e., Irganox 1010; 1,3,5-trimethyl-2,4,6-tris(3,5-di-tert-butyl-4-hydroxybenzyl)benzene, e.g., Ethanox 330; 4,4'-methylenebis(2,6-di-tertiary-butylphenol), e.g., Ethanox 4702 or Ethanox 4710; 1,3,5-tris(3,5-di-tert-butyl-4-hydroxybenzyl)isocyanurate, i.e., Good-rite 3114; 2,5-di-tert-amylhydroquinone; tert-butylhydroquinone; 1,6-hexamethylene bis(3-(3,5-di-tert-butyl-4-hydroxyphenylpropionate), such as Irganox 259; octadecyl-3,5-di-tert-butyl-4-hydroxyhydrocinnamate, i.e., Irganox 1076; diphenylamine; 4,4'-diemthoxydiphenylamine; secondary antioxidants such as tris(nonylphenylphosphite); bis(2,4-di-tert-butyl)pentaerythritol)diphosphate; distearyl pentaerythritol diphosphite; phosphited phenols and bisphenols, such as Naugard 492; phosphite/phenolic antioxidant blends, such as Irganox B215; di-n-octadecyl(3,5-di-tert-butyl-4-hydroxybenzyl)phosphonate, such as Irganox 1093; tetrakis(2,4-di-tert-butylphenyl)4,4'-biphenylylenediphosphonite; esters of thiodipropionic acid such as Irganox PS 802, Irganox PS 800, and Cyanox MTDP. Such materials are normally employed in the compositions of the invention at levels of about 0.1-10 wt. %, or more preferably at levels of about 0.1-5 wt. %.

As mentioned above, UV absorbers and UV light stabilizers are two examples of the type of stabilizers which may be used in the compositions of the invention. Suitable UV absorbers include nickel quenchers, benzophenones, benzotriazoles, benzyldene malonates, triazines, etc. Suitable UV light stabilizers include hindered amines, etc. The blend of various UV absorbers and UV light stabilizers are also suitable to provide protection against UV. Some suitable UV absorbers include 2-(2H-benzotriazol-2-yl)-p-cresol, 2-tert-Butyl-6-(5-chloro-2H-benzotriazol-2-yl)-4-methylphenol, and 2,2'-methylenebis[6-(2H-benzotriazol-2-yl)-4-(1,1,3,3-tetramethylbutyl)phenol], 2-hydroxy-4-methoxybenzophenone and 2-hydroxy-4-octyloxybenzophenone, as 2-(4,6-diphenyl-1,3,5-triazin-2-yl)-5-[(hexyl)oxy]-phenol; oxanilide UV absorbers such as N-(2-ethoxyphenyl)-N'-(2-ethylphenyl)oxamide, dimethyl 2-(4-methoxybenzylidene) malonate, bis(1,2,2,6,6-pentamethyl-4-piperidyl) sebacate, methyl 1,2,2,6,6-pentamethyl-4-piperidyl sebacate, bis(1,2,2,6,6-pentamethyl-4-pperidyl)sebacate, bis(1-octyloxy-2,2,6,6-tetramethyl-4-piperidyl) sebacate, LOWILITE® Q84 and POLYBATCH® LLUVS 110, Tinuvin 1130, Tinuvin 171, Tinuvin 328, Tinuvin 384-2, Tinuvin 900, Tinuvin 928, Tinuvin 99, Tinuvin 5050, Tinuvin 5060, Tinuvin 5151, Tinuvin 5248, Tinuvin 5251, Tinuvin 5350, Tinuvin 123, Tinuvin 144, Tinuvin 152, Tinuvin 249, Tinuvin 292, Tinuvin 400, Tinuvin 405, Tinuvin 460, Tinuvin 477, Tinuvin 479 (BASF), Chimassorb 81, Chimassorb 944, Chimassorb 2020 (BASF), KEMISORB 10, KEMISORB 11, KEMISORB 111 (Chemipro Kasei Ksisha), BP-2, BP-3, BP-6, BP-9 (Dalian Richfortune Chemicals), Ultra V 301 (Dover, ICI Industries), Grandsorb BP-1, Grandsorb BP-2, Grandsorb BP-4, Grandsorb BP-6 (Hongkun Group), Speed-Block UV-6 (Lamsson), Maxgard 1000, Maxgard 300, Maxgard 400, Maxgard 500, Maxgard 600, Maxgard 700 (Lycus), Cyasorb UV-3346, Hostavin N 30 and the like. Such stabilizers can be used as individual components or in combination with other stabilizers known in the art for compositions. Such materials are normally employed in the compositions of the invention at levels of about 0.1-10 wt. %, but more preferably at levels of about 0.1-5 wt. %.

Suitable fillers include, for example, microparticulate density modulators, such as, microspheres, or macroparticulate density modulators, for example: glass or ceramic beads. Other suitable fillers are inorganic fillers such as, for example, aluminum powder, aluminum flakes (e.g., aluminum flake paste), glass flakes, micaceous iron oxide, calcium carbonate, dolomite, silicas, silicates, talc, kaolin, mica, feldspar, barium sulfate and wollastonites, carbon nanotubes, graphene. Preferred inorganic fillers include aluminum powder, aluminum flakes, micaceous iron oxide, mica, glass fibers, wollastonite, calcium carbonate, silica and mixtures thereof, with flake-like fillers also being preferred. Preferably, the filler is aluminum powder or aluminum flakes (e.g., aluminum flake paste), or alloys thereof. The aluminum powder or aluminum flake may be used alone or in combination with other fillers, such as those mentioned previously. For example, aluminum flake paste may be used alone or in combination with micaceous iron oxide. The fillers, particularly the preferred fillers, may be present in the compositions of the invention in any suitable amount, such as about 0.01-95 wt. %, about 1-95 wt. %, about 5-95 wt. %, about 1-30 wt. %, preferably about 0.01-25 wt. %, preferably about 10-80 wt. %, preferably about 5-70 wt. %, preferably about 10-60 wt. %, preferably about 20-50 wt. %, and most preferably about 15-40 wt. %. The aluminum flakes may have a particle size ranging from about 2-50 microns, preferably about 5-30 microns, most preferably about 10-20 microns. Metallic flakes such as zinc, aluminum, magnesium, nickel, etc. can be added as inorganic fillers to compositions as sacrificial anodes to provide cathodic protection. They can also be used in combination with electrically conducting fillers as taught in U.S. Pat. No. 7,794,626 to provide galvanic anti-corrosion protection to the substrates.

One particular preferred inorganic filler is Mica C3000, which may be present in the compositions of the invention in an amount ranging from about 0.01-95 wt. % (e.g., about 10-90 wt. %, 20-60 wt. %, 30-50 wt. %), based on the total weight of the composition.

Suitable dyes or pigments include MO 02294 black, MO-80406BV-Yellow from Chromaflo, and white pigment powder TI-PURE from Dupont.

Suitable adhesion promoters include isocyantes and their derivatives; phosphorous containing compounds such as phosphoric acids and phosphate ester containing compounds; sulfonic acid, sulfonate and sulfate containing compounds; carboxylic acid and carboxylate containing compounds; maleic-modified esters; organofunctional silanes; organometallic compounds such as zirconates, zircono aluminates and titanates; chlorinated olefins, etc. Some suitable adhesion promoters are carbamic acid [3-(triethoxysilyl) propyl]-bicyclo[2.2.1]hept-5-en-2-ylmethyl ester (NBCbSi), 3-(trimethoxysilyl)propyl methacrylate, [(5-bicyclo[2.2.1]hept-2-enyl)ethyl]trirnethoxysilane, 5-bicyclo [2.2.1]hept-2-enyl)methyldichlorosilane, (5-bicyclo[2.2.1] hept-2-enyl)triethoxysilane, (5-bicyclo[2.2.1]hept-2-enyl) methyldiethoxysilane, (5-bicyclo[2.2.1]hept-2-enyl) dimethylethoxysilane, (3-acryloxypropyl)trirnethoxysilane, n-(2-aminoethyl)-3-aminopropyltrimethoxysilane, (3-triethoxysilyl)propylsuccinic anhydride, 2-(3,4-epoxycyclohexyl)ethyltriethoxysilane, ((chloromethyl)phenylethyl) trimethoxysilane, 3-(guanidinyl)propyltrimethoxysilane, n,n-bis(2-hydroxyethyl)-3-aminopropyltriethoxysilane, styrylethyltrimethoxysilane, methacryloxymethyltrimethoxysilane, vinyltriethoxysilane, ureidopropyltriethoxysilane, 3-isocyanatopropyltriethoxysilane, triethoxysilyl modified poly-1,2-butadiene, bis(methyldiethoxysilylpropyl)amine, [2-(3-cyclohexenyl)ethyl]triethoxysilane, hexadecafluorododec-11-en-1-yltrimethoxysilane or mixtures of 2-hydroxyethyl bicyclo[2.2.1]hept-2-ene-5-carboxylate (HENB). Other typical adhesion promoters include coupling agents such as organosilanes (3-isocyanatopropyl triethoxysilane, bicyclo[2.2.1]hept-5-en-2-yl)ethyltrimethoxysilane), organozirconates, organotitanates (Manchem® products (Manchem® Zircoaluminates) (FedChem, LLC) (e.g., Manchem® A, Manchem® APG-X, Manchem® APG-1, Manchem® APG-2, Manchem® APG-3, Manchem® C, Manchem® CPG, Manchem® CPM, Manchem® F, Manchem® FPM, Manchem® M, Manchem® S, Manchem® 376, Manchem® 441) and Kenrich Petrochemicals products such as KR 55 (Titanium IV tetrakis(bis 2-propenolato methyl)-1-butanolato adduct 2 moles (di-tridecyl)hydrogen phosphite), KZ® TPPJ (Zirconium IV (2-ethyl, 2-propenolatomethyl)1,3-propanediolato, cyclo bis 2-dimethylamino pyrophosphato-O, adduct with 2 moles of methanesulfonic acid), KZ® 55 (Zirconium IV tetrakis 2,2(bis-2 propenolatomethyl)butanolato, adduct with 2 moles of di-tridecyl, hydrogen phosphite); phosphate and phosphate esters-containing resins (Sipomer PAM products from Solvay) (e.g., Sipomer PAM-100 (Phosphate esters of polyethylene glycol monomethacrylate), Sipomer PAM-200). Also other Sipomer products from Solvay containing other polar functional groups such as Sipomer WAM products, Sipomer WAM II products, Sipomer COPS-1 products, Sipomer (3-CEA, Sipomer BEM, Sipomer IBOA, Sipomer IBOMA, Sipomer SEM-25); carboxylic acid and anhydride-containing resins (Nucrel from DuPont (ethylene acrylic acid copolymer), Escor EAA copolymers from ExxonMobil Chemicals, POLYBOND (acrylic acid grafted polypropylene) from Addivant. Anhydride-containing resins such as FG1901, FG1924 (SEBS grafted with maleic anhydride) from Kraton, ROYALTUF 485, ROYALTUF 498 (EPDM polymers modified with maleic anhydride) from Addivant); isocyanate-containing resins (hexamethylene diisocyanate (HDI); 5-isocyanato-1-(isocyanatomethyl)-1,3,3-trimethyl-cyclohexane (commonly known as isophorone diisocyanate or IPDI); tetramethylxylene diisocyanate (TMXDI), methylene diphenyl diisocyanate (MDI—which may comprise any mixture of its three isomers 2,2'-MDI, 2,4'-MDI, and 4,4'-MDI); 4,4'methylene bis(cyclohexyl isocyanate) (H12MDI); hexamethylene-diisocyanatetrimer (HDIt); toluene diisocyanate (TDI—which may comprise any mixture of 2,4-TDI and 2,6-TDI); 2-biphenylyl isocyanate; 4-benzylphenyl isocyanate; toluene diisocyanates; PM200 (poly MDI), Lupranate® (poly MDI from BASF), Krasol® isocyanate terminated polybutadiene prepolymers, Krasol® LBD2000 (TDI based), Krasol® LBD3000 (TDI based), Krasol® NN-22 (MDI based), Krasol® NN-23 (MDI based), Krasol® NN-25 (MDI based); MDI prepolymer (Lupranate® 5080); liquid carbodiimide modified 4,4'-MDI (Lupranate® MM103); liquid MDI (Lupranate® MI); liquid MDI (e.g., Mondur® ML or Mondur® MLQ, which is a 50/50 blend of 4,4'-MDI and 2,4-MDI), or 2-hydroxyethyl acrylate (HEA) and liquid MDI (Mondur® MLQ), or 9-decen-1-ol and liquid MDI (Mondur® MLQ), or oleyl alcohol and liquid MDI (Mondur® MLQ). The ratio between the alcohol and the liquid MDI varies from 1:1 to 1:10; bicyclo[2.2.1]hept-5-ene-2-carboxylic acid, and 2-[[[[4-[(4-isocyanatophenyl) methyl]phenyl]amino]carbonyl]oxy]ethyl ester); chlorinated polyolefins such as Eastman CP 343-1, CP343-3, CP515-2, CP-164-1 (Eastman Chemical); Hardlen 13LP (Advanced Polymer); KEPRADH 949, 951, 958, 980, 982 (Kito Chemical); Lanco Intercoat VPP 154, 555 (Lubrizol); HARDLEN 15-LP, BS-40, CY-1132, CY-9122P, CY-9124P; TRAPYLEN 112X, 130X, 135X, 137X, 138S (Tramaco); Special-Primer PP 7560 (Worlee).

Preferably, the adhesion promoter comprises, consists essentially of, or consists of at least one compound containing at least two isocyanate groups. The at least one compound containing at least two isocyanate groups may be selected from a diisocyanate, a triisocyanate, and a polyisocyanate, such as, for example, toluene diisocyanate; tetramethylxylene diisocyanate (TMXDI); methylene diphenyl diisocyanate (MDI); a mixture of the three MDI isomers 2,2'-MDI, 2,4'-MDI, and 4,4'-MDI; liquid MDI; solid MDI; hexamethylenediisocyanatetrimer (HDIt); hexamethylene-diisocyanate (HDI); isophorone diisocyanate (IPDI); 4,4'-methylene bis(cyclohexyl isocyanate) (H12MDI); polymeric MDI (PM200); MDI prepolymer; and liquid carbodiimide modified 4,4'-MDI. Preferably, the at least one compound containing at least two isocyanate groups is 4,4'-methylene diphenyl diisocyanate (MDI). The adhesion promoter may further comprise, consist essentially of, or consist of at least one compound containing at least one heteroatom-containing functional group and at least one metathesis-active olefin. The compound containing a heteroatom-containing functional group and a metathesis-active olefin may be selected from 5-norbornene-2-methanol (NB-MeOH); 2-hydroxyethyl bicyclo[2.2.1]hept-2-ene-5-carboxylate (HENB); and allyl alcohol. The adhesion promoter may also be the compound containing a heteroatom-containing functional group and a metathesis-active olefin reacted with the at least one compound containing at least two isocyanate groups. The adhesion promoter composition may be present in an amount ranging from 0.1-10 phr (e.g., 0.5-9.5 phr, 1-9 phr, 2-8 phr, 3-7 phr, 4-6 phr) or about 1 phr, 2, phr, 3 phr, 4 phr, 5 phr, 6 phr, 7 phr, 8 phr, 9 phr, or 10 phr.

Suitable rheology modifiers and anti-settling agents include inorganic and organic rheology modifiers. Inorganic rheology modifiers include clays and organoclays of hectorite, bentonite, attapulgite, kaoline, pyrophilite and talc; minerals such as fumed silica, precipitated silica, precipitated calcium carbonate, and montmorillonite, metal organic gellants such as zirconates, aluminates. Organic rheology modifiers include castor oil derivatives, modified polyurea, polyamides, calcium sulfonates, cellulose, shydrophobic ethoxylated urethane resins, Examples of suitable rheology modifiers include fumed silica such as Cab-O-Sil TS610, TS720 from Cabot Corp and AEROSIL 972, AEROSIL 974 from Evonik, organoclay such as BENTOLITE L-10, BENTOLITE-WH, CLAYTONE 40, CLAYTONE AF, MINERAL COLLOID BP, Garamite 7303 from BYK Chemie, USA; Bentonite 149, Bentonite 329, Bentonite 331, Bentonite 344 from Brentag Specialities, Attagel from BASF and the like, polyaminoamide phosphate, high molecular weight carboxylic acid salts of polyamine amides, and alkylene amine salts of an unsaturated fatty acid, all available from BYK Chemie USA as ANTI TERRA™, polyamide modified castor oil derivatives such as Luvotix ZH5, Luvitix ZH50 from Lehmann & Voss; micronized amide wax such as Crayvallac SUPER from Arkema.

Suitable coupling agents include, for example, silane coupling agents known in the art. Examples of silane coupling agents include (3-glycidoxypropyl)trimethoxysilane (Silquest A187), (3-glycidoxypropyl)triethoxysilane (Silquest A1871), vinyltrimethoxysilane (Silquest A171), vinyltriethoxysilane (Silquest A151), methacryloxpropyltrimethoxysilane (Silquest A174NT), N-(2-aminoethyl)-3-aminopropyltrimethoxysilane (Silquest A1120), 3-aminopropyltrimethoxysilane (Silquest A1110), hexadecylltrimethoxysilane, isooctyltriethoxysilane, n-octyltriethoxysilane, isobutyltriethoxysilane, methyltrimethoxysilane, and N-ethyl-amino isobutyl trimethoxysilane (Silquest A-Link 15 Silane).

Compositions of the invention may contain additives such as dispersants/dispersing agents (surfactants) known in the art. Examples of dispersing agents and surfactants include sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinate, disodium isodecyl sulfosuccinnate, disodium ethoxylated alcohol half ester of sulfosuccinnic acid, disodium alkyl arnido polyethoxy sulfosuccinnate, tetrasodium N-(1,2-dicarboxyethyl)-N-oxtadecyl sulfosuccinnamate, disodium N-octasulfosuccinnamate, sulfated ethoxylated nonylphenol, 2-amino-2-methyl-1-propanol, and the like.

Articles of Manufacture of the Invention

The invention also relates to articles of manufacture comprising, consisting essentially of, or consisting of at least one composition of the invention.

The invention further relates to methods for making molded articles, comprising, consisting essentially of, or consisting of forming a resin composition comprising, consisting essentially of, or consisting of at least one composition of the invention, contacting the resin composition with at least one substrate, and subjecting the resin composition to conditions effective to promote an olefin metathesis reaction of the at least one cyclic olefin monomer.

The molded articles of the invention may have a tensile modulus of >2400 MPa, >2600 MPa, >2800 MPa, >3000 MPa, or >3200 MPa. Alternatively (or in addition to), a molded article of the invention may have a higher tensile modulus (e.g., >2%, >3%, >4%, >5%, >6%, >7%, >8%, >9%, >10%, >12%, >14%, >16%, >18%, >20%) as compared to a comparable molded article, wherein the composition of the molded article of the invention and the comparable molded article are equivalent except the comparable molded article does not contain a thermoplastic hydrocarbon resin used in the compositions of the invention.

The invention also relates to the use of the compositions of the invention as formulations of composite articles.

Compositions of the invention suitable for the manufacture of composite articles may be prepared by starting with pre-catalyzed compositions of the invention comprising, consisting essentially of, or consisting of the at least one cyclic olefin monomer, the at least one thermoplastic hydrocarbon resin, at least one adhesion promoter, and the at least one olefin metathesis catalyst. The composite formulations of the invention can be applied to the reinforcement fabric through a vacuum infusion process; these may include large composite structures, such as wind blades, in which the manufacture of thick laminate structures is enabled by the low viscosity of the compositions described herein.

The manufacture of large composite structures is further enabled by the compositions of the invention due to their cure behavior. The catalyzed compositions undergo a rapid transition from liquid to solid phase at temperatures above 40° C., exhibiting "snap cure" characteristics, after which point the temperature may be increased to the target post-cure temperature. The low enthalpy of reaction results in low exotherm temperatures even in thick laminate sections, allowing for a fast, controlled curing process.

Compositions of the invention may have a maximum heat flow of <5.6 W/g, <4.6 W/g, or <3.9 W/g by dynamic scanning calorimetry (DSC). Alternatively (or in addition to), a composition of the invention may have a reduced maximum heat flow (e.g., <5%, <10%, <15%, <20%, <25%, <30%) as compared to a comparable composition, wherein the composition of the invention and the comparable composition are equivalent except the comparable composition does not contain a thermoplastic hydrocarbon resin used in the compositions of the invention. A reduction in the maximum heat flow may translate to an overall reduction in the maximum temperature rise observed in thick castings, which may or may not include reinforcements. This has benefit of enabling thick castings with controlled exotherm behavior.

The compositions of the inventions may have viscosities of <100 cP, <125 cP, or <150 cP at ambient temperatures. Addition of polymeric or oligomeric additives to resin are known to increase viscosity, so it is unexpected that the viscosity remains low at high loadings of thermoplastic hydrocarbon resins, such as loadings of 40 phr (approximately 30 wt %). The retention of low viscosity even at high loadings of thermoplastic hydrocarbon resin enables fast infusion of thick laminates for the compositions of the invention used to prepare composite laminates.

The compositions of the invention additionally have a low viscosity under a range of temperatures, even, unexpectedly, under high loadings of the thermoplastic hydrocarbon resin. For example, addition of thermoplastic hydrocarbon resins to the cyclic olefin compositions at loadings of 40 phr (approximately 30 wt %) result in a resin viscosity of <55 cP at a temperature of 40° C., a resin viscosity of <75 cP at 30° C., and a resin viscosity of <105 at 20° C. The relatively modest changes in viscosity over a broad range of temperatures enables fast infusion of thick laminates for the compositions of the invention used to prepare composite laminates, even at cooler resin temperatures.

To be sprayable as a coating, the viscosity at high shear rate (>$10^3$ $sec^{-1}$) is important. When a coating composition of the invention is forced through a spray nozzle and atomized, the coatings need to exhibit shear-thinning rheology. Proper coating additives such as dispersants and rheology modifier can modify the coatings of high filler loading to attain sprayable viscosity and the shear-thinning rheology.

Coating Compositions of the Invention

The invention also relates to coating compositions comprising, consisting essentially of, or consisting of the compositions of the invention.

The compositions of this invention may be optionally formulated with other reactive chemistries to form co-cured coatings. The co-curing process may form interpenetrating polymer networks; for example, a co-cured polyurethane can form from a polyol and a diisocyanate; a co-cured epoxy can form from a bisepoxide and a hardener such as an anhydride, amine, or thiol. Care should be taken when using chemistries that are known to inhibit ROMP. Copolymeric coatings may be formed if multifunctional monomers are incorporated; for example, isocyanate- or alcohol-containing olefinic comonomers can copolymerize urethanes with the compositions of the invention, and epoxide-containing comonomers can copolymerize epoxies with the compositions of the invention. Other polymers such as polysiloxanes, polyureas, and acrylics can be incorporated into the compositions of the invention.

The coating compositions may also contain at least one curing agent. Preferably, the at least one curing agent is selected from an organometallic complex, a free radical initiator, and a cationic initiator.

The invention also relates to a method for coating at least a portion of at least one surface of a substrate or object with a coating composition of the invention, comprising contacting at least a portion of the at least one surface of the substrate with the coating composition of the invention, and subjecting the coated substrate to conditions effective to promote an olefin metathesis reaction of the at least one cyclic olefin monomer in the presence of the at least one curing agent, e.g., an olefin metathesis catalyst. The substrate surface is preferably a clean surface, but coating compositions of the invention may also be applied to "dirtier" surfaces than conventional epoxy-based coating compositions. A method of the invention may also apply a UV resistance topcoat over the coatings to provide protection against UV degradation as known in the art. A method of the invention accordingly produces an article of manufacture coated with a cured coating composition of the invention.

The adhesion to the substrate can be achieved by priming the substrate with an adhesion promoter or by adding an adhesion promoter as a coating additive to the coating formulation.

The invention also relates to a method for coating a steel substrate material, comprising, consisting essentially of, or consisting of:

blasting the steel surface with blasting media according to SSPC SP10 standards;

optionally applying an adhesion promoter onto the steel surface;

applying a coating composition of the invention and at least one additive (preferably, aluminum powder or aluminum flakes);

curing the coating applied on the steel surface at a temperature between 5° C. to 150° C.

The substrates or objects to be coated may be of any configuration, any weight, any size, any thickness, and/or any geometric shape. Furthermore, the substrates or objects to be coated may be constructed of any material including but not limited to metal such as steel, stainless steel, aluminum, copper, metal alloys, iron, nickel, titanium, and silver as well as stone, plastics, rubbers, polymers, wood, cloth, ceramics, glass, carbon, brick, fabrics, cement, concrete, or composites, such as reinforced plastics and electronic assemblies.

The substrate or object surfaces to be coated may be partially or fully coated.

The coating compositions of the invention can be applied to the substrate material or object to be coated/protected by any method known in the art, including, without limitation, spraying, brushing, dipping, or rolling. The coating composition can be applied on the substrate material or object to be coated with a paint brush. The coating composition can also be sprayed on the substrate material or object to be coated with a film spray gun, a conventional spray gun, a plural component sprayer, a high-volume low pressure (HVLP) or an airless applicator.

The invention also relates to a cured article of manufacture, comprising, consisting essentially of, or consisting of the composition of the invention. The cured article of manufacture may, but does not need to, contain a reinforcement material, such as, for example, a substrate. Thus, the invention relates to cured articles of manufacture, comprising, consisting essentially of, or consisting of the composition of the invention, wherein the cured article does not contain a reinforcement material, such as, for example, a substrate.

Adhesive Compositions of the Invention

The invention also relates to the use of the compositions of the invention as adhesives.

Adhesive compositions of the invention may be prepared by starting with pre-catalyzed compositions of the invention comprising, consisting essentially of, or consisting of the at least one cyclic olefin monomer, the at least one thermoplastic hydrocarbon resin, and the at least one olefin metathesis catalyst. These pre-catalyst compositions may then be mixed with the aforementioned additives to form uncured adhesive compositions of the invention. The uncured adhesive compositions may then be applied to at least some or all of the surface of a substrate and then cured.

EXPERIMENTAL

In the following examples, efforts have been made to ensure accuracy with respect to numbers used (e.g., amounts, temperature, etc.) but some experimental error and deviation should be accounted for. Unless indicated otherwise, temperature is in degrees Celsius [° C.] and pressure is at or near atmospheric. Additives added to the cyclic olefin compositions to form resin compositions are reported as phr, which is defined as the weight in grams of the additive per hundred grams of cyclic olefin composition. Ambient temperature and room temperature are used interchangeably herein and mean a temperature of 20-25° C.

As is known in the art, weight percent (wt %) can be represented by gas chromatography (GC) percent area (area %). Hence, GC area % obtained from the GC was reported as wt %. Weight percent (wt %) and percent by weight are used interchangeably herein.

GC Method used: Column: DB-5, 30 m×250 μm×0.25 μm film thickness or equivalent 5% Phenyl methyl Siloxane; Manufacturer: Agilent; GC and column conditions: Injector temperature: 200° C., Detector temperature: 280° C.; Oven temperature: Starting temperature: 50° C., hold time: 0.5 minute; Ramp rate 15° C./min to 80° C.; Ramp rate 30° C./min to 220° C.; Ramp rate 5° C./min to 245° C.; Ramp rate 30° C./min to 280° C. hold time 5 minutes; Carrier gas: Helium 23.5 mL/min; Split ratio: 20.0:1.0.

Dynamic Scanning Calorimetry (DSC) Method used: Manufacturer: TA Instruments; Model: DSC Q200; Test conditions: Starting Temperature: 0° C.; Ramp rate: 10° C./min to 250° C. Atmosphere: Nitrogen.

Viscosity Method used: Manufacturer: Brookfield; Model: DV2TLVTJ; Spindle: 062; Speed: 200 rpm; Data collection type: multi point (5 second intervals).

The following examples are for illustrative purposes only and are not intended, nor should they be construed as limiting the invention in any manner. Those skilled in the art will appreciate that variations and modifications of the following examples can be made without exceeding the spirit or scope of the invention.

All reactions were performed under ambient conditions unless otherwise noted.

Materials

All solvents and reagents were purchased from commercial suppliers and used as received unless otherwise noted.

The following abbreviations are used in the examples:

DCPD dicyclopentadiene

TCPD tricyclopentadiene

GC gas chromatography

DSC dynamic scanning calorimetry

° C. degrees Celsius wt % weight percent

C827

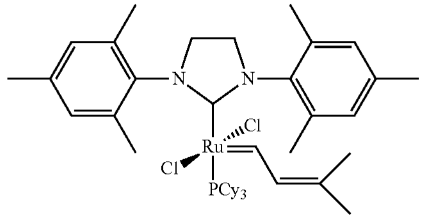

[1,3-bis-(2,4,6-trimethylphenyl)-2-imidazolidinylidene] dichloro(3-methyl-2-butenylidene) (tricyclohexylphosphine) Ruthenium(II) CAS [253688-91-4]

C931

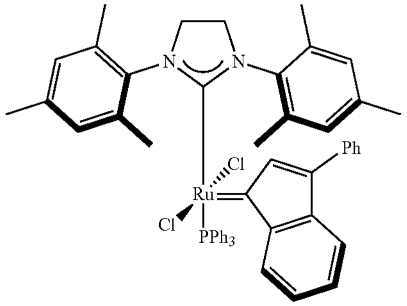

(1,3-Bis(2,4,6-trimethylphenyl)-2-imidazolidinylidene) dichloro (3-phenyl-1H-inden-1-ylidene)(triphenylphosphine)ruthenium [CAS 340810-50-6]

-continued

NBCbSi

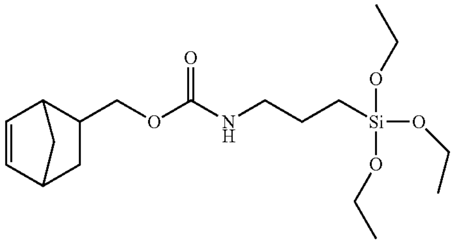 [SMILES: CCO[Si](CCCNC(=O)OCC1CC2C=CC1C2)(OCC)OCC]

carbamic acid, [3-(triethoxysilyl)propyl]-bicyclo[2.2.1] hept-5-en-2-ylmethyl ester [CAS 187161-66-6]

NB-Triethoxy Silane

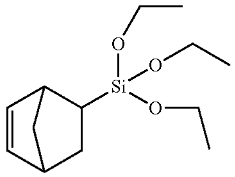 [SMILES: CCO[Si](OCC)(OCC)C1CC2C=CC1C2]

Norbornene Triethoxy Silane [CAS 18401-43-9]

Dicyclopentadiene (DCPD) (Ultrene® 99) was obtained from Cymetech Corporation. A representative lot of Ultrene® 99 comprised DCPD (99.83 wt %) and TCPD (0.17 wt %) as measured by GC. Purified tricyclopentadiene (TCPD-95) was prepared as generally described in European Pat. No. EP0271007B2 and purified to greater than 95% by vacuum distillation. A blend of DCPD/TCPD with a ratio of 43/57 (EXP-1500) was made per procedure published previously.

The following cyclic olefin compositions were used in the examples:

Cyclic Olefin Composition (1): A modified DCPD base resin containing 25-32 wt % TCPD (and small amounts of higher cyclopentadiene homologs) was prepared by heat treatment of Ultrene® 99 generally as described in U.S. Pat. No. 4,899,005.

Cyclic Olefin Composition (II): A modified DCPD base resin containing 55-60% TCPD (and small amounts of higher cyclopentadiene homologs) was prepared by heat treatment of Ultrene® 99 generally as described in U.S. Pat. No. 4,899,005.

The following additives were used within the examples:

Ethanox® 4702 antioxidant (4,4'-methylenebis(2,6-di-tertiary-butylphenol) from Albemarle Corporation was used as received. Irganox® 1076 antioxidant (BASF) was used where indicated. Crystal Plus 70FG mineral oil containing 2 phr Cab-o-Sil® TS610 fumed silica or Crystal Plus 500FG mineral oil containing 2 phr Cab-o-Sil® TS610, was used to prepare the catalyst suspensions. Cab-o-Sil® TS610 was obtained from Cabot Corporation and used as received. Triphenyl phosphine (TPP) was used as received from Hokko Chemical Industry CO., LTD, Butylated hydroxytoluene (BHT) was used as received from Akrochem Corporation or Millipore Sigma. Cumene hydroperoxide (CHP) (80% by weight solution from Millipore Sigma) was used as received. Vinyl Norbornene (VNB) was used as received from JX Nippon Chemical Texas Inc. (JX-NCTI), Hydrocarbon resin products Nevchem 100, Nevchem 140, PB 100, and LX 2181 were used as received from Neville Chemical. Hydrocarbon resin products Escorez 5600 and Escorez 2203LC were received from ExxonMobil Chemical Company. EXP-1251-10F was prepared by mixing liquid MDI, Mondur MLQ, with 5 to 10 wt % of MDI-HENB Mono Adduct and its isomers as described in U.S. Pat. No. 9,527,982. Mica C-3000 filler (IMERYS), Silquest® A-151 (Momentive), Norbornene triethoxysilane (Gelest), 2-Hydroxyethyl-Methacrylate-Phosphate (HEMA-P, Evonik), Ken-react LICA 38 (Kenrich), Ken-react KR-TTS (Kenrich), Ken-react KZ-TPP (Kenrich), and Ken-react KZ 55 (Kenrich) were used as received.

The following formulated resin bases were used in the examples:

Formulated Resin Base (I-A): The modified DCPD cyclic olefin composition (I) (containing 25-32% tricyclopentadiene) was formulated with 0.6 phr TPP, 2 phr Ethanox® 4702, 2 phr BHT, 4 phr EXP-1251-10F, and 1 phr of VNB.

Formulated Resin Base (II-A): The modified DCPD cyclic olefin composition (II) (containing 55-60% tricyclopentadiene) was formulated with 0.6 phr TPP, 2 phr Ethanox® 4702, 2 phr BHT, 4 phr EXP-1251-10F, 1 phr of VNB.

Metal carbene olefin metathesis catalysts were prepared by standard methods and include: [1,3-bis-(2,4,6-trimethylphenyl)-2-imidazolidinylidene]dichloro(3-methyl-2-butenylidene) (tricyclohexylphosphine) ruthenium(II) (C827) and (1,3-Bis(2,4,6-trimethylphenyl)-2-imidazolidinylidene) dichloro (3-phenyl-1H-inden-1-ylidene)(triphenylphosphine)ruthenium (C931).

The catalyst compositions used in the experimental section were prepared as follows:

Catalyst Composition (A): C827 was suspended in mineral oil (Crystal Plus 70 FG) containing 2 phr Cab-o-sil TS610. Catalyst composition (A) was prepared to have a monomer to catalyst ratio of 30,000:1 at 2 grams of catalyst suspension per 100 grams of DCPD monomer.

Catalyst Composition (B): C827 was suspended in mineral oil (Crystal Plus 70 FG) containing 2 phr Cab-o-sil TS610. Catalyst composition (B) was prepared to have a monomer to catalyst ratio of 45,000:1 at 2 grams of catalyst suspension per 100 grams of DCPD monomer.

For composite laminate examples, glass fabric was used as supplied by Vectorply (E-LT 3400-10) based on PPG Hybon® 2026 ("Vectorply Glass Fabric").

Composite laminates were fabricated for testing by a VARTM process. A sealed and release-treated aluminum plate, possessing inlet and outlet ports affixed to the bottom surface, was utilized as the bottom mold surface. Four (4) plies of glass fabric cut to dimensions of 15"×16" were arranged on top of the aluminum mold to achieve a ⅛" laminate thickness. A peel ply (Bron Aerotech; PTFE-coated) was placed over the fabric plies, and propylene ethylene copolymer resin distribution media (Airtech Greenflow 75) was positioned on top of the peel ply at opposite ends of the composite laminate corresponding to the position of the inlet port and outlet port, respectively. A 12"×12" caul plate (or pressure plate) made out of G-10 was placed on top of the peel ply to compress the fibers, and create a uniform surface generating test samples. A sheet of vacuum bagging film (Umeco Process Materials Stretch-Vac 2000) was placed over the completed layup and affixed to the mold surface using sealant tape (Airtech AT200-Y tape). Vacuum was applied to the outlet port to evacuate air from the layup to a vacuum level of between 28 inches-Hg to 29 inches-Hg. Resin prepared as per the examples presented below herein was degassed under vacuum with stirring for at least 20 minutes. Catalyst suspension was injected into the resin under vacuum and the catalyzed resin was stirred under vacuum for at least one minute. The resin and catalyst suspension were at ambient temperature (20-25° C.) immediately prior to mixing. After at least one minute, stirring of the catalyzed resin was stopped, the vacuum source was clamped off, and the catalyzed resin was backfilled with air. The catalyzed resin was then infused through the fabric plies, driven by the pressure gradient between the ambient pressure and the evacuated fabric layup.

The glass composite laminates of the examples in Tables 3 and 4 presented below herein were prepared using the VARTM process with four plies of glass fabric reinforcement. After the infusion was complete, the glass composite laminate was heated from ambient temperature (20-25° C.) to 40° C. for two hours. After two hours at 40° C., the glass composite laminate was heated to 120° C. at a heating rate of 1° C./min and held at 120° C. for 2-2.5 hours and then allowed to cool to ambient temperature (20-25° C.) and subsequently demolded.

Grit-blasted low carbon steel panels (4"×4"×¼") of grade ASTM 4130 were purchased from Southwestern Paint Panels. The panels were grit blasted using standard steel grits such that surface profile of the panels was between 2-3 mils (NACE SSPC SP10 standard). The blasted panels were stored in sealed plastic pales with desiccants before use.

Examples 1-10

Resin compositions 1-8 were prepared by combining formulated resin base I-A with the specified loading of hydrocarbon resin. Sample 1 (356 g) of resin was catalyzed with the addition of 6.5 grams of catalyst composition B. Samples 2-5 (598 g) of resin were catalyzed with the addition of 8 g of catalyst composition B. Samples 6-7 (374 g) of resin were catalyzed with 5 grams of catalyst composition B. Sample 8 (350 g) of resin was catalyzed with 7 grams of catalyst composition B. The resin and catalyst combination forms a ROMP composition at ambient temperature. The ROMP composition at ambient temperature was poured into an aluminum mold with a ¼" cavity (10 inches×10 inches×¼ inches). Panels were cured at 40° C. until a gel formed (60-120 minutes). Once a gel occurred the temperature ramped up to 120° C. at a rate of 1° C./min, and held at 120° C. for 2 hours.

Resin compositions 9-10 were prepared by combining formulated resin base II-A with the specified loading of hydrocarbon resin. Sample 9 (356.2 g) of the resin was catalyzed by the addition of 6.5 grams of catalyst composition B. Sample 10 (350 g) of resin was catalyzed with 7 grams of catalyst composition B. The resin and catalyst combination forms a ROMP composition at ambient temperature. The ROMP composition at ambient temperature was poured into an aluminum mold with a ¼" cavity (10 inches×10 inches×¼ inches). Panels were cured at 40° C. and held for about 100 minutes before a ramp up to 120° C. at a rate of 1° C./min., and held at 120° C. for 1 hour.

Table 1 summarizes resin compositions (1-10) used for neat resin castings tested in the experimental section.

TABLE 1

| Resin Composition | Formulated Resin Base | Hydrocarbon Resin Type | Hydrocarbon Resin Loading (phr) | Catalyst Composition |
|---|---|---|---|---|
| 1 | I-A | N/A | 0 | B |
| 2 | I-A | PB-100 | 40 | B |
| 3 | I-A | Nevchem100 | 40 | B |
| 4 | I-A | LX-2181 | 40 | B |
| 5 | I-A | Nevchem 140 | 40 | B |
| 6 | I-A | Escorez 2203LC | 40 | B |
| 7 | I-A | Escorez 5600 | 40 | B |
| 8 | I-A | PB-100 | 43 | B |

TABLE 1-continued

| Resin Composition | Formulated Resin Base | Hydrocarbon Resin Type | Hydrocarbon Resin Loading (phr) | Catalyst Composition |
|---|---|---|---|---|
| 9 | II-A | N/A | 0 | B |
| 10 | II-A | PB-100 | 43 | B |

The mechanical properties of the neat resin castings were measured using standard techniques. Tensile modulus values were determined by ISO 527-2 method at ambient temperature.

Table 2 reflects the tensile modulus values for compositions 1-10.

TABLE 2

| Resin Composition | Hydrocarbon Resin Type | Hydrocarbon Resin Loading (phr) | Tensile Modulus (MPa) |
|---|---|---|---|
| 1 | N/A | 0 | 2667 |
| 2 | PB-100 | 40 | 3059 |
| 3 | Nevchem100 | 40 | 3062 |
| 4 | LX-2181 | 40 | 3051 |
| 5 | Nevchem 140 | 40 | 2980 |
| 6 | Escorez 2203LC | 40 | 2455 |
| 7 | Escorez 5600 | 40 | 2890 |
| 8 | PB-100 | 43 | 3055 |
| 9 | N/A | 0 | 2747 |
| 10 | PB-100 | 43 | 3280 |

Examples 11-17

Resin compositions 11-13 were prepared by combining formulated resin base I-A with the specified loading of hydrocarbon resin. Samples (600 g) of the resin were catalyzed by the addition of 8 grams of catalyst composition A to form a ROMP composition at ambient temperature. VARTM samples were prepared using Vectorply glass fabric as described above herein. The composite laminates were cured as described above herein.

Resin composition 14 was prepared by combining formulated resin base I-A with the specified loading of hydrocarbon resin. A sample (576.6 g) of the resin composition 14 was catalyzed by the addition of 12 grams of catalyst composition B to form a ROMP composition at ambient temperature. VARTM samples were prepared using Vectorply glass fabric as described above herein. The composite laminates were cured as described above herein.

Resin compositions 15-17 were prepared by combining formulated resin base II-A with the specified loading of hydrocarbon resin. Samples (657.6 g) of the resin compositions 15-17 were catalyzed by the addition of 12 grams of catalyst composition B to form a ROMP composition at ambient temperature. VARTM samples were prepared using Vectorply glass fabric as described above herein. The composite laminates were cured as described above herein.

Table 3 summarizes resin compositions (11-17) used for composite laminate panels tested in the experimental section.

TABLE 3

| Resin Composition | Formulated Resin Base | Hydrocarbon Resin Type | Hydrocarbon Resin Loading (phr) | Catalyst Composition |
|---|---|---|---|---|
| 11 | I-A | N/A | 0 | A |
| 12 | I-A | Nevchem 140 | 40 | A |

TABLE 3-continued

| Resin Composition | Formulated Resin Base | Hydrocarbon Resin Type | Hydrocarbon Resin Loading (phr) | Catalyst Composition |
|---|---|---|---|---|
| 13 | I-A | PB-100 | 40 | A |
| 14 | I-A | PB-100 | 43 | B |
| 15 | II-A | N/A | 0 | B |
| 16 | II-A | PB-100 | 43 | B |
| 17 | II-A | Escorez 5600 | 43 | B |

The mechanical properties of the composite laminates were determined by standard methods. 90° tensile properties were determined by ISO 527-5 method at ambient temperature.

Table 4 reflects the tensile modulus values for compositions 11-17.

TABLE 4

| Resin Composition | Hydrocarbon Resin Type | Hydrocarbon Resin Loading (phr) | 90° Tensile Strength |
|---|---|---|---|
| 11 | N/A | 0 | 71.6 |
| 12 | Nevchem 140 | 40 | 52.6 |
| 13 | PB-100 | 40 | 71.5 |
| 14 | PB-100 | 43 | 68.5 |
| 15 | N/A | 0 | 67.9 |
| 16 | PB-100 | 43 | 63.3 |
| 17 | Escorez 5600 | 43 | 68.0 |

Examples 18-27

Resin compositions 18-24 were prepared by combining cyclic olefin composition I or formulated resin base I-A with the specified loading of hydrocarbon resin. Samples 18-24 (120 g) of resin were tested using a Brookfield viscometer. Samples of resin compositions 18-22 were tested at a fixed temperature between 20-26° C. to determine viscosity at ambient temperatures. Samples of resin compositions 23-24 were tested at temperatures between 20-40° C. to determine viscosity at a range of temperatures, including ambient temperatures.

Table 5 summarizes resin compositions (18-24) used for viscosity measurements in the experimental section.

TABLE 5

| Resin Composition | Cyclic Olefin Composition/ Resin Base | Hydrocarbon Resin Type | Hydrocarbon Resin Loading (phr) |
|---|---|---|---|
| 18 | I | N/A | 0 |
| 19 | I | PB-100 | 40 |
| 20 | I | Nevchem100 | 40 |
| 21 | I-A | LX-2181 | 40 |
| 22 | I | Nevchem 140 | 40 |
| 23 | I | Escorez 2203LC | 40 |
| 24 | I | Escorez 5600 | 40 |

Table 6 reflects the resin viscosity values at ambient temperatures for compositions 18-24.

TABLE 6

| Resin Composition | Hydrocarbon Resin Type | Hydrocarbon Resin Loading (phr) | Viscosity Measurement (cP) | Resin Temperature (° C.) |
|---|---|---|---|---|
| 18 | N/A | 0 | 24 | 22 |
| 19 | PB-100 | 40 | 125 | 21 |

TABLE 6-continued

| Resin Composition | Hydrocarbon Resin Type | Hydrocarbon Resin Loading (phr) | Viscosity Measurement (cP) | Resin Temperature (° C.) |
|---|---|---|---|---|
| 20 | Nevchem100 | 40 | 120 | 21 |
| 21 | LX-2181 | 40 | 160 | 22 |
| 22 | Nevchem 140 | 40 | 150 | 25 |
| 23 | Escorez 2203LC | 40 | 100 | 22 |
| 24 | Escorez 5600 | 40 | 95 | 22 |

FIG. 1 shows the resin viscosity values at variable temperatures for resin compositions 23 and 24.

Resin compositions 25-27 were prepared by combining cyclic olefin composition I with the specified loading of hydrocarbon resin. A sample (10 g) of the resin composition 25 was catalyzed by the addition of 0.2 grams of catalyst composition B to form a ROMP composition at ambient temperature. A sample (11 g) of the resin composition 26 was catalyzed by the addition of 0.2 grams of catalyst composition B to form a ROMP composition at ambient temperature. A sample (14 g) of resin composition 27 was catalyzed by the addition of 0.2 grams of catalyst composition B to form a ROMP composition at ambient temperature. A small amount of the ROMP composition (9-20 mg) at ambient temperature was transferred to an aluminum DSC pan with a hermetically sealed lid, and the sample was cured as described herein.

Table 7 summarizes resin compositions (18-27) used for DSC experiments in the experimental section.

TABLE 7

| Resin Composition | Cyclic Olefin Composition | Hydrocarbon Resin Type | Hydrocarbon Resin Loading (phr) | Catalyst Composition |
|---|---|---|---|---|
| 25 | II | N/A | 0 | B |
| 26 | II | Escorez 5600 | 10 | B |
| 27 | II | Escorez 5600 | 40 | B |

The heat of reaction and heat flow (W/g) for each sample was determined by DSC. The maximum heat flow was determined by taking the highest point of the exothermal peak of each catalyzed resin composition.

Table 8 reflects the maximum heat flow in the DSC experiments of compositions 25-27.

TABLE 8

| Resin Composition | Hydrocarbon Resin Type | Hydrocarbon Resin Loading (phr) | Maximum Heat Flow (W/g) |
|---|---|---|---|
| 25 | N/A | 0 | 5.503 |
| 26 | Escorez 5600 | 10 | 4.595 |
| 27 | Escorez 5600 | 40 | 3.809 |

Examples 28-56

Coating Formulations Preparation

Three resin packages (RP) were prepared by varying the ratio of EXP-1500:TCPD:Escorez 5600 as 90:0:10 (RP1), 75:0:25 (RP2), and 37.21:26.79:36 (RP3) (Table 9).

To prepare resin mixtures RP1 and RP2, Escorez 5600 was added directly to EXP-1500. For RP3, solid TCPD was firstly melted at 65° C. (water bath), and then added to EXP-1500, followed by Escorez 5600. Irganox® 1076 at a level of 1 wt % (w.r.t. total resins including Escorez 5600) was also added to the three resin mixtures. The resin mixtures were then mixed using a Silverson mixer with a speed ranging from 3000 rpm to 5000 rpm, to disperse Escorez 5600 and Irganox® in the liquid resins. The mixing durations for RP1, RP2, and RP3 were approximately 10 min, 20 min, and 30 min. Temperatures of the mixtures during mixing were regularly checked to ensure that it does not go above 50° C.

Mica C-3000 was added to the three resin mixtures (RP1-3, containing Irganox®) at a level of 40 wt % w.r.t. total resins including EXP-1500, Escorez 5600, and TCPD (Table 9), which were mixed in a FlackTek SpeedMixer® operating at a speed of 1950 rpm without vacuum for 2 min. Then, the required amounts of mixes were weighed in smaller FlackTek mixing containers, to which adhesion promoters at various levels were added (i.e., post-add). The adhesion promoters include EXP-1251-10F, Silquest® A-151, NbCbSi, Norbornene triethoxysilane (Gelest), 2-Hydroxyethyl-Methacrylate-Phosphate (HEMA-P, Evonik), Ken-react LICA 38, Ken-react KR-TTS, Ken-react KZ-TPP, and Ken-react KZ 55. The final formulations were mixed in a FlackTek mixer at 1000 rpm under vacuum for 1 min. The mixing containers were sealed with tape and stored at ambient laboratory conditions.

Besides post-adding the adhesion promoters to the mixes (i.e., as the last step), Ken-react LICA 38 and Ken-react KZ-TPP were also pre-added to the resin packages (RP, including Irganox®), i.e., before adding fillers, to test the effects of adding sequence. An IKA® overhead stirrer operating at a speed of 200-500 rpm was used to disperse the Ken-react adhesion promoters into the resin mixtures. The adhesion promoters were added to the resins dropwise. For these formulations, Mica C-3000 (40 wt % w.r.t. total resins) was the last component, which was slowly added to the container while mixing at a speed of 200-500 rpm. The final formulations were mixed in a FlackTek mixer at 1000 rpm for 1 m5 with vacuum.

TABLE 9

Compositions of coating formulations [C].

| [C#] | EXP-1500 (wt % in total resins) | TCPD (wt % in total resins) | Escorez 5600 (wt % in total resins) | Irganox/ amount (wt % w.r.t. total resins) | Mica/ amount (wt % w.r.t. total resins) | Adhesion Prompters/ amount (wt % w.r.t. total formulation) |
|---|---|---|---|---|---|---|
| C28 | 90 | — | 10 | 1 | 40 | EXP-1251-10F/2 |
| C29 | 90 | — | 10 | 1 | 40 | A-151/2 |
| C30 | 75 | — | 25 | 1 | 40 | EXP-1251-10F/2 |
| C31 | 75 | — | 25 | 1 | 40 | A-151/2 |
| C32 | 37.21 | 26.79 | 36 | 1 | 40 | EXP-1251-10F/2 |
| C33 | 37.21 | 26.79 | 36 | 1 | 40 | EXP-1251-10F/3 |
| C34 | 37.21 | 26.79 | 36 | 1 | 40 | EXP-1251-10F/6 |
| C35 | 37.21 | 26.79 | 36 | 1 | 40 | A-151/2 |
| C36 | 37.21 | 26.79 | 36 | 1 | 40 | A-151/3 |
| C37 | 37.21 | 26.79 | 36 | 1 | 40 | A-151/6 |
| C38 | 37.21 | 26.79 | 36 | 1 | 40 | NbCbSi/3 |
| C39 | 37.21 | 26.79 | 36 | 1 | 40 | NbCbSi/6 |
| C40 | 37.21 | 26.79 | 36 | 1 | 40 | NB-triethoxysilane/3 |
| C41 | 37.21 | 26.79 | 36 | 1 | 40 | NB-triethoxysilane/6 |
| C42 | 37.21 | 26.79 | 36 | 1 | 40 | Phosphate/0.5 |
| C43 | 37.21 | 26.79 | 36 | 1 | 40 | Phosphate/1.5 |
| C44 | 37.21 | 26.79 | 36 | 1 | 40 | Phosphate/3 |
| C45 | 37.21 | 26.79 | 36 | 1 | 40 | LICA 38/0.5 |
| C46 | 37.21 | 26.79 | 36 | 1 | 40 | LICA 38/1.5 |
| C47 | 37.21 | 26.79 | 36 | 1 | 40 | KR TTS/0.5 |
| C48 | 37.21 | 26.79 | 36 | 1 | 40 | KR TTS/1.5 |
| C49 | 37.21 | 26.79 | 36 | 1 | 40 | KZ TPP/0.5 |
| C50 | 37.21 | 26.79 | 36 | 1 | 40 | KZ TPP/1.5 |
| C51 | 37.21 | 26.79 | 36 | 1 | 40 | KZ 55/0.5 |
| C52 | 37.21 | 26.79 | 36 | 1 | 40 | KZ 55/1.5 |
| C53 | 37.21 | 26.79 | 36 | 1 | 40 | LICA 38/0.2 (pre-add) |
| C54 | 37.21 | 26.79 | 36 | 1 | 40 | LICA 38/0.5 (pre-add) |
| C55 | 37.21 | 26.79 | 36 | 1 | 40 | KZ TPP/0.2 (pre-add) |
| C56 | 37.21 | 26.79 | 36 | 1 | 40 | KZ TPP/0.5 (pre-add) |

General Procedure for Coating Metal Substrate Panels

Catalyst suspensions of C931 (0.8 wt % in mineral oil) was added to the formulations shown in Table 9 as a curing agent. A catalyst level of 2 wt % w.r.t. the total formulation was used for all formulations. The catalyzed formulations were mixed using wooden spatulas for 15-20 seconds. Then, the catalyzed formulations were applied onto the grit blasted steel substrates immediately using a film applicator at 20 mil wet film thickness.

All coatings were cured at RT (~25° C.) for 7 days before testing. The thickness of the dry film coatings was measured using an ultrasonic thickness gauge from Elcometer. A total of three measurements were taken on each coating.

Testing of the Sheet Steel Coated Panels

Pull-Off Adhesion Test According to ASTM D4541

This test method covers a procedure for evaluating the pull-off strength (commonly referred to as adhesion) of a coating from metal substrate. The major components of a pull-off adhesion tester are a pressure source, a pressure gauge, and an actuator. During operation, the flat face of a pull stub (dolly) is adhered to the coating to be evaluated.

Prior to the adhesion test, a 2K epoxy adhesive (Defelsko) was prepared by mixing the 2 components in 1:1 ratio in a FlackTek SpeedMixer. Test areas were prepared on the cured coatings by scoring using a 14 mm diameter circular hole saw, such that 14 mm diameter isolated coating circles were formed with exposed steel surface around the circumference of the circles. Aluminum (14 mm) dollies were grit-blasted similar to the carbon steel substrates, while the coating circles were roughened using a sandpaper (100 grit).

The epoxy adhesive was then applied onto the roughened dollies to cover the entire grit blasted base of the dolly. The dollies were then carefully placed onto the coating test circles, such that the dollies were exactly perpendicular to the substrate. Any excess adhesive was carefully removed to prevent adhesion onto the bare substrate surrounding the dolly. The epoxy glue on the coatings with the dollies were cured at RT for 24 hours. Three test areas were prepared per coating. Using an automated PosiTest adhesion tester (DeFelsko), the dollies were pulled from the coating. Adhesion strength was reported as average of three adhesion values required to completely detach the dollies from the coating. Qualitative failure modes were also recorded to identify mechanism of failure: A=adhesive failure of coating to steel substrate; C=cohesive failure of coating, G=adhesive or cohesive failure of epoxy glue between coating and dolly. The pull-off data is expressed with a ranking system, as described in Table 10.

Hot Water Immersion Test According to ASTM D870

This test covers the basic principles and operating procedures for testing water resistance of coatings by the complete immersion of coated specimens in distilled or demineralized water elevated temperatures.

Prior to the test, exposed metal on the coated panels was painted with a layer of standard protective coating to protect the exposed substrate from corrosion. The cured coatings were placed in an enclosed water bath. The water bath was then filled with deionized water to completely submerge the cured coatings. Temperature of the water bath was increased to 95° C. After 7 days, the panels were removed from the water bath. Visual observations were made to identify changes in the coatings after the test. Also, pull-off adhesion test (ASTM D4541) was conducted on the panels according to procedure explained above. The adhesion performance data for the coated panels before and after hot water immersion are displayed in Table 11.

Hot/Dry Heat Aging Test

Carbon steel panels coated with the cured coatings were placed in a forced air oven subjected to heating continuously at 205° C. The panels were taken out of the oven and cooled down to room temperatures periodically for inspection. The time when first crack observed in the coatings was recorded as shown in Table 11.

TABLE 10

Ranking system used in pull-off strength.

| Ranking Value | Pull-off strength [psi] |
|---|---|
| AA | 2501-3000 |
| BB | 2001-2500 |
| CC | 1501-2000 |
| DD | 1001-1500 |
| EE | 0-1000 |

TABLE 11

Coating performance data: ambient-cured coatings (7 d, ~25° C.).

| | Initial | | Hot water immersion | | Hot dry |
|---|---|---|---|---|---|
| FORMULATIONS | Pull-off strength ranking | Failure Mode | Pull-off strength ranking | Failure Mode | aging Days until first crack |
| C28 | EE | A | BB | Mixed C/G | 33 |
| C29 | EE | A | CC | C | 28 |
| C30 | EE | Mixed A/G | CC | Mixed C/G | 33 |
| C31 | EE | A | CC | C | 28 |
| C32 | EE | Mixed A/G | CC | C | 23 |
| C33 | DD | G | DD | Mixed C/G | 10 |
| C34 | DD | G | CC | C | 10 |
| C35 | EE | A | DD | C | 15 |
| C36 | EE | A | EE | G | 15 |
| C37 | EE | A | DD | C | 15 |
| C38 | DD | Mixed A/G | DD | C | 10 |
| C39 | DD | Mixed A/G | CC | C | 10 |
| C40 | EE | G | DD | G | 20 |
| C41 | DD | G | DD | Mixed C/G | 15 |
| C42 | EE | A | DD | C | 24 |
| C43 | EE | A | EE | A | 24 |
| C44 | EE | A | EE | A | 10 |
| C45 | EE | A | EE | A | 17 |
| C46 | EE | A | EE | A | 14 |
| C47 | EE | A | EE | A | 10 |
| C48 | EE | A | EE | A | 10 |
| C49 | EE | Mixed A/G | DD | Mixed C/G | 17 |
| C50 | EE | Mixed C/G | — | — | 3 |
| C51 | EE | A | DD | C | 20 |
| C52 | EE | A | EE | Mixed C/G | 11 |
| C53 | EE | A | EE | A | 19 |
| C54 | EE | A | EE | A | 17 |
| C55 | EE | G | DD | C | 24 |
| C56 | EE | Mixed A/G | DD | Mixed C/G | 17 |

Examples 57-70: Resin compositions with only antioxidant and hydrocarbon resin without any other additives can be prepared as disclosed herein.

Table 12 summarizes resin compositions (57-70) that can be cured as disclosed and then can be used for the measurement of resin properties.

TABLE 12

| Resin Composition | Cyclic Olefin Composition | Hydrocarbon Resin Type | Hydrocarbon Resin Loading (phr) | Catalyst Composition |
|---|---|---|---|---|
| 57 | I | N/A | 0 | B |
| 58 | II | N/A | 0 | B |
| 59 | I | PB-100 | 10 | B |
| 60 | I | Escorez 5600 | 10 | B |
| 61 | I | Escorez 2203LC | 10 | B |
| 62 | I | PB-100 | 40 | B |
| 63 | I | Escorez 5600 | 40 | B |
| 64 | I | Escorez 2203LC | 40 | B |
| 65 | II | PB-100 | 10 | B |
| 66 | II | Escorez 5600 | 10 | B |
| 67 | II | Escorez 2203LC | 10 | B |
| 68 | II | PB-100 | 40 | B |
| 69 | II | Escorez 5600 | 40 | B |
| 70 | II | Escorez 2203LC | 40 | B |

The neat resin castings of the examples in Tables 12 and 13 presented herein can be prepared by pouring the ROMP composition at ambient temperature into an aluminum mold with a ¼" cavity (10 inches×10 inches×¼ inches). The filled molds are then placed in an oven pre-heated to 40° C. and held at that temperature for two hours. After two hours at 40° C., the molds are heated to 120° C. at a heating rate of 1° C./min and held at 120° C. for 2 hours. The panels are then allowed to cool to ambient temperature (20-25° C.) and subsequently demolded.

Resin composition 57: A sample of cyclic olefin composition 1 (350 g) can be catalyzed by the addition of 7 grams of catalyst composition B to form a ROMP composition at ambient temperature. The ROMP composition at ambient temperature is poured into an aluminum mold and cured as described above herein.

Resin composition 58: A sample of cyclic olefin composition 11 (350 g) can be catalyzed by the addition of 7 grams of catalyst composition B to form a ROMP composition at ambient temperature. The ROMP composition at ambient temperature is poured into an aluminum mold and cured as described above herein.

Resin compositions 59-61: Samples of cyclic olefin composition 1 (350 g) can be mixed with the specified hydrocarbon resin (35 g) until the solids dissolved and a homogeneous solution is achieved. Each mixture is catalyzed by the addition of 7 grams of catalyst composition B to form a ROMP composition at ambient temperature. The ROMP compositions at ambient temperature is poured into aluminum molds and cured as described above herein.

Resin compositions 62-64: Samples of cyclic olefin composition 1 (350 g) can be mixed with the specified hydrocarbon resin (140 g) until the solids dissolved and a homogeneous solution is achieved. Each mixture is catalyzed by the addition of 7 grams of catalyst composition B to form a ROMP composition at ambient temperature. The ROMP compositions at ambient temperature are poured into aluminum molds and cured as described above herein.

Resin compositions 65-67: Samples of cyclic olefin composition 11 (350 g) can be mixed with the specified hydrocarbon resin (35 g) until the solids dissolved and a homogeneous solution is achieved. Each mixture is catalyzed by the addition of 7 grams of catalyst composition B to form a ROMP composition at ambient temperature. The ROMP compositions at ambient temperature are poured into aluminum molds and cured as described above herein.

Resin compositions 68-70: Samples of cyclic olefin composition 11 (350 g) can be mixed with the specified hydrocarbon resin (140 g) until the solids dissolved and a homogeneous solution is achieved. Each mixture is catalyzed by the addition of 7 grams of catalyst composition B to form a ROMP composition at ambient temperature. The ROMP compositions at ambient temperature are poured into aluminum molds and cured as described above herein.

Tables 13 and 14 summarize resin compositions (57-70). Anticipated changes in tensile modulus are categorized in the following ranges: I (increase of about 3-9%), II (increase of about 9-20%), 111 (decrease of about 2-5%), IV (decrease of about 5-10%). These anticipated changes in tensile modulus are relative to the control resin compositions presented in Table 13 (composition 57) and Table 14 (composition 58).

TABLE 13

Tensile Properties of Cyclic Olefin Composition I.

| Resin Composition | Hydrocarbon Resin Type | Hydrocarbon Resin Loading (phr) | Tensile Modulus (MPa) |
|---|---|---|---|
| 57 | N/A | 0 | 2400-2700 |
| 59 | PB-100 | 10 | I |
| 60 | Escorez 5600 | 10 | I |
| 61 | Escorez 2203LC | 10 | III |
| 62 | PB-100 | 40 | II |
| 63 | Escorez 5600 | 40 | II |
| 64 | Escorez 2203LC | 40 | IV |

TABLE 14

Tensile Properties of Cyclic Olefin Composition II.

| Resin Composition | Hydrocarbon Resin Type | Hydrocarbon Resin Loading (phr) | Tensile Modulus (MPa) |
|---|---|---|---|
| 58 | N/A | 0 | 2600-2900 |
| 65 | PB-100 | 10 | I |
| 66 | Escorez 5600 | 10 | I |
| 67 | Escorez 2203LC | 10 | III |
| 68 | PB-100 | 40 | II |
| 69 | Escorez 5600 | 40 | II |
| 70 | Escorez 2203LC | 40 | IV |

It is to be understood that while the invention has been described in conjunction with specific embodiments thereof, that the description above as well as the examples that follow are intended to illustrate and not limit the scope of the invention. Other aspects, advantages, and modifications within the scope of the invention will be apparent to those skilled in the art to which the invention pertains.

The claimed invention is:

1. A composition comprising:

a) at least one cyclic olefin monomer;

b) optionally at least one linear olefin monomer;

c) at least one thermoplastic hydrocarbon resin; and d) at least one olefin metathesis catalyst, wherein the at least one cyclic olefin monomer is present in the composition in an amount ranging from 0.1-95 wt. %, based on the total weight of the composition, and the at least one thermoplastic hydrocarbon resin is present in the composition in an amount ranging from 5-95 wt. %, based on the total weight of the composition; and wherein the cyclic olefin monomer is selected from the group consisting of Formulae (I), (II), (Ill), (V), (VI), and mixtures thereof:

Formula (I)

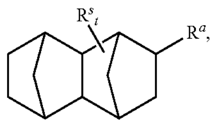

Formula (II)

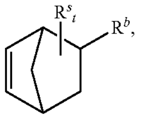

Formula (III)

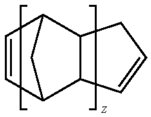

,

Formula (V)

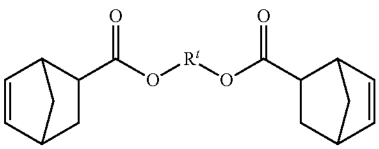

, and

-continued

Formula (VI)

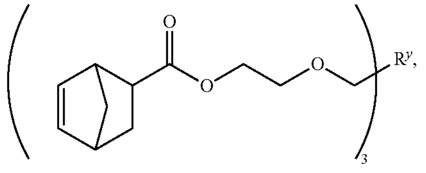

and the linear olefin monomer, if present, has the structure of Formula (IV):

Formula (IV)

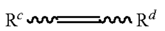

wherein:

$R^a$ is H, optionally substituted linear or branched $C_{1-24}$ alkyl, optionally substituted linear or branched $C_{2-24}$ alkenyl, halogen, —C(O)$R^f$, —$CH_2$—C(O)$R^f$, —O$R^g$, —$CH_2$—O$R^g$, —CN, —$NO_2$, —$CF_3$, —P(O)(O$R^h$)$_2$, —OP(O)(O$R^h$)$_2$, —S(O)$_2$O$R^h$, —OS(O)$_2$$R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), C($R^h$)($R^i$)COO$R^j$, —C($R^h$)($R^i$)C(O)H, —C($R^h$)($R^i$)C(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$O$R^n$, or

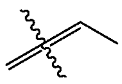

;

$R^b$ is H, optionally substituted linear or branched $C_{1-24}$ alkyl, optionally substituted linear or branched $C_{2-24}$ alkenyl, halogen, —C(O)$R^f$, —$CH_2$—C(O)$R^f$, —O$R^g$, —$CH_2$—O$R^g$, —CN, —$NO_2$, —$CF_3$, —P(O)(O$R^h$)$_2$, —OP(O)(O$R^h$)$_2$, —Si(O$R^k$)$_3$—S(O)$_2$O$R^h$, —OS(O)$_2$$R^h$, optionally substituted heterocycle, spiro optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), C($R^h$)($R^i$)COO$R^j$, —C($R^h$)($R^i$)C(O)H, —C($R^h$)($R^i$)(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$O$R^n$, or

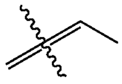

;

$R^c$ is H, optionally substituted linear or branched $C_{1-24}$ alkyl, optionally substituted linear or branched $C_{2-24}$ alkenyl, halogen, —C(O)$R^f$, —$CH_2$—C(O)$R^f$, —O$R^g$, —$CH_2$—O$R^g$, CN, $NO_2$, —$CF_3$, —P(O)(O$R^h$)$_2$, —OP(O)(O$R^h$)$_2$, —S(O)$_2$O$R^h$, —OS(O)$_2$$R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), C($R^h$)($R^i$)COO$R^j$, —C($R^h$)($R^i$)C(O)H, —C($R^h$)($R^i$)(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$O$R^n$;

$R^d$ is H, optionally substituted linear or branched $C_{1-24}$ alkyl, optionally substituted linear or branched $C_{2-24}$ alkenyl, halogen, —C(O)$R^f$, —$CH_2$—C(O)$R^f$, —O$R^g$, —$CH_2$—O$R^g$, CN, $NO_2$, —$CF_3$—P(O)(O$R^h$)$_2$, —OP(O)(O$R^h$)$_2$, —S(O)$_2$O$R^h$, —OS(O)$_2$$R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), C($R^h$)($R^i$)COO$R^j$, C($R^h$)($R^i$)C(O)H, —C($R^h$)($R^i$)C(O)$R^k$, C($R^h$)($R^i$)CR(O$R^m$)(O$R^n$), —C($R^h$)($R^i$)C(O)N$R^o$$R^p$, —C($R^h$)($R^i$)C(O)N$R^o$O$R^n$;

each $R^s$ is independently optionally substituted linear or branched $C_{1-24}$ alkyl, optionally substituted linear or branched $C_{2-24}$ alkenyl, halogen, —C(O)$R^f$, —$CH_2$—C(O)$R^f$, —O$R^g$, —$CH_2$—O$R^g$, —CN, —$NO_2$, —$CF_3$, —P(O)(O$R^h$)$_2$, —OP(O)(O$R^h$)$_2$, —S(O)$_2$O$R^h$, —OS(O)$_2$$R^h$, optionally substituted heterocycle, —$CH_2$-(optionally substituted heterocycle), optionally substituted $C_{3-10}$ cycloalkyl, —$CH_2$-(optionally substituted $C_{3-10}$ cycloalkyl), optionally substituted $C_{5-24}$ aryl, —$CH_2$-(optionally substituted $C_{5-24}$ aryl), optionally substituted $C_{3-12}$ cycloalkenyl, —$CH_2$-(optionally substituted $C_{3-12}$ cycloalkenyl), C($R^h$)($R^i$)COO$R^j$, —C($R^h$)($R^i$)C(O)H, —C($R^h$)($R^i$)C(O)$R^k$, —C($R^h$)($R^i$)C$R^l$(O$R^m$)(O$R^n$), —C($R^h$)($R^i$)C(O)N$R^o$$R^p$, —C($R^h$)($R^i$)C(O)N$R^o$O$R^n$;

t is 0, 1, 2, 3, 4, 5, or 6;

$R^f$ is OH, O$R^k$, N$R^g$$R^h$, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^g$ is H, optionally substituted linear or branched $C_{1-24}$ alkyl, optionally substituted $C_{3-10}$ cycloalkyl, optionally substituted heterocycle, optionally substituted $C_{5-24}$ aryl, optionally substituted linear or branched $C_{2-24}$ alkenyl, —C(O)-(optionally substituted $C_{5-24}$ aryl), —C(O)-(optionally substituted linear or branched $C_{2-24}$ alkenyl), or optionally substituted $C_{3-12}$ cycloalkenyl;

$R^h$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^i$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^j$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^k$ is optionally substituted linear or branched $C_{1-24}$ alkyl, optionally substituted linear or branched $C_{2-24}$ alkenyl, optionally substituted $C_{3-10}$ cycloalkyl, optionally substituted heterocycle, optionally substituted $C_{5-24}$ aryl, optionally substituted $C_{3-12}$ cycloalkenyl, —$CH_2$-(optionally substituted $C_{3-10}$ cycloalkyl), —$CH_2$-(optionally substituted $C_{5-24}$ aryl), or —$CH_2$-(optionally substituted $C_{3-12}$ cycloalkenyl);

$R^l$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^m$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^n$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^o$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^p$ is H, optionally substituted linear or branched $C_{1-24}$ alkyl, optionally substituted $C_{3-10}$ cycloalkyl, optionally substituted heterocycle, optionally substituted $C_{5-24}$ aryl, or optionally substituted $C_{3-12}$ cycloalkenyl;

$R^t$ is an optionally substituted linear or branched $C_1$-$C_{12}$ alkyl, -(optionally substituted linear or branched $C_1$-$C_6$ alkyl)-$R^u$-(optionally substituted linear or branched $C_1$-$C_6$ alkyl)-, or —($R^v$)—($R^w$)—($R^x$)—;

$R^u$ is O, an optionally substituted $C_3$-$C_{10}$-cycloalkyl, optionally substituted $C_3$-$C_{12}$ cycloalkenyl, optionally substituted heterocycle, or optionally substituted $C_5$-$C_{24}$ aryl;

$R^v$ and $R^x$ are independently selected from -(optionally substituted linear or branched $C_1$-$C_{12}$ alkyl)-aryl-, wherein one or more of the carbon atoms in the $C_1$-$C_{12}$ alkyl may be replaced by O;

$R^w$ is optionally substituted linear or branched $C_1$-$C_6$ alkyl;

$R^y$ is optionally substituted linear or branched $C_1$-$C_6$ alkyl; and z is 0, 1, 2, or 3.

2. The composition of claim 1, wherein:

$R^a$ is H, optionally substituted linear or branched $C_{1-12}$ alkyl, optionally substituted linear or branched $C_{2-6}$ alkenyl, halogen, —C(O)$R^f$, —$OR^g$, —CN, —$NO_2$, —$CF_3$, —P(O)($OR^h$)$_2$, —OP(O)($OR^h$)$_2$, —S(O)$_2OR^h$, —OS(O)$_2R^h$, optionally substituted heterocycle, optionally substituted $C_{3-10}$ cycloalkyl, optionally substituted $C_{6-10}$ aryl,

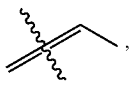 [SMILES: *=CC]

or optionally substituted $C_{3-12}$ cycloalkenyl;

$R^b$ is H, optionally substituted linear or branched $C_{1-12}$ alkyl, optionally substituted linear or branched $C_{2-6}$ alkenyl, halogen, —C(O)$R^f$, —$OR^g$, —CN, —$NO_2$, —$CF_3$, —P(O)($OR^h$)$_2$, —OP(O)($OR^h$)$_2$, —S(O)$_2OR^h$, —OS(O)$_2R^h$, optionally substituted heterocycle, optionally substituted $C_{3-10}$ cycloalkyl, optionally substituted $C_{6-10}$ aryl,

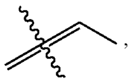

or optionally substituted $C_{3-12}$ cycloalkenyl;

$R^c$ is H, optionally substituted linear or branched $C_{1-12}$ alkyl, optionally substituted linear or branched $C_{2-6}$ alkenyl, halogen, —C(O)$R^f$, —$OR^g$, —CN, —$NO_2$, —$CF_3$, —P(O)($OR^h$)$_2$, —OP(O)($OR^h$)$_2$, —S(O)$_2OR^h$, —OS(O)$_2R^h$, optionally substituted heterocycle, optionally substituted $C_{3-10}$ cycloalkyl, optionally substituted $C_{6-10}$ aryl, or optionally substituted $C_{3-12}$ cycloalkenyl;

$R^d$ is H, optionally substituted linear or branched $C_{1-12}$ alkyl, optionally substituted linear or branched $C_{2-6}$ alkenyl, halogen, —C(O)$R^f$, —$OR^g$, —CN, —$NO_2$, —$CF_3$, —P(O)($OR^h$)$_2$, —OP(O)($OR^h$)$_2$, —S(O)$_2OR^h$, —OS(O)$_2R^h$, optionally substituted heterocycle, optionally substituted $C_{3-10}$ cycloalkyl, optionally substituted $C_{6-10}$ aryl, or optionally substituted $C_{3-12}$ cycloalkenyl;

t is 0;

$R^f$ is OH, $OR^k$, $NR^gR^h$, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^g$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^h$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

z is 2;

$R^i$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^j$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^k$ is optionally substituted $C_{1-12}$ alkyl, optionally substituted linear or branched $C_{2-12}$ alkenyl, optionally substituted $C_{3-8}$ cycloalkyl, optionally substituted heterocycle, optionally substituted $C_{6-10}$ aryl, optionally substituted $C_{3-12}$ cycloalkenyl, —$CH_2$-(optionally substituted $C_{3-10}$ cycloalkyl), —$CH_2$-(optionally substituted $C_{5-24}$ aryl), or —$CH_2$-(optionally substituted $C_{3-12}$ cycloalkenyl);

$R^l$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^m$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^n$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl;

$R^o$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl; and $R^p$ is H, optionally substituted $C_{1-12}$ alkyl, optionally substituted $C_{3-8}$ cycloalkyl, optionally substituted heterocycle, optionally substituted $C_{6-10}$ aryl, or optionally substituted $C_{3-12}$ cycloalkenyl.

3. The composition of claim 1, wherein the cyclic olefin monomer of Formula (I) is tetracyclododecene (TCD), 2-ethylidene-1,2,3,4,4a,5,8,8a-octahydro-1,4:5,8-dimethanonaphthalene (ENB-DDA), 2-hexyl-1,2, 3,4,4a,5,8,8a-octahydro-1,4:5,8-dimethanonaphthalene (HNB-DDA), or a mixture thereof;

the cyclic olefin monomer of Formula (II) is 5-ethylidene-2-norbornene (ENB), 5-octyl-2-norbornene (ONB), 2-hydroxyethyl bicyclo[2.2.1]hept-5-ene-2-carboxylate (HENB), 5-carboxylic acid-2-norbornene ethyl ester, carbamic acid, [3-(triethoxysilyl)propyl]-bicyclo [2.2.1]hept-5-en-2-ylmethyl ester (NBCbSi), 5-norbornene-2-methanol (NB-methanol), 5-norbornene-2-exo,3-exo-dimethanol (NB-dimethanol), 2-hydroxyethyl bicyclo[2.2.1]hept-5-ene-2-carboxylate (NB-epoxide), norbornene triethoxy silane (NB-triethoxysilane), 5-(perfluorobutyl)bicyclo[2.2.1]hept-2-ene (NB-Fluorocarbon (1)), bicyclo[2.2.1]hept-5-ene-2-carboxylic acid, 1,1,2,2,3,3,4,4,5,5,6,6-dodecafluorohexyl ester (NB-fluorocarbon (2)), bicyclo [2.2.1]hept-5--ene-2-carboxylic acid, 2,2,2-trifluoro-1-(trifluoromethyl)ethyl ester (NB-fluorocarbon (3)), or a mixture thereof; and the cyclic olefin monomer of Formula (III) is dicyclopentadiene (DCPD), tricyclopentadiene (TCPD), tetracyclopentadene (TeCPD), or a mixture thereof.

4. The composition of claim 1, wherein the thermoplastic hydrocarbon resin is selected from the group consisting of pure monomer thermoplastic resin (PMR), C5 thermoplastic resin, C5/C9 thermoplastic resin, C9 thermoplastic resin, terpene thermoplastic resin, indene-coumarone (IC) thermoplastic resin, dicyclopentadiene (DCPD) thermoplastic resin, hydrogenated or partially hydrogenated pure monomer (PMR) thermoplastic resin, hydrogenated or partially hydrogenated C5 thermoplastic resin, hydrogenated or partially hydrogenated C5/C9 thermoplastic resin, hydrogenated or partially hydrogenated C9 thermoplastic resin, hydrogenated or partially hydrogenated dicyclopentadiene (DCPD) thermoplastic resin, modified indene-coumarone (IC) thermoplastic resin, and mixtures thereof.

5. The composition of claim 1, wherein the at least one olefin metathesis catalyst has the structure of Formula (1):

Formula (1)

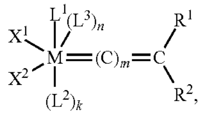

wherein:

M is ruthenium;

$L^1$, $L^2$, and $L^3$ are independently neutral electron donor ligands;

n is 0 or 1;

m is 0, 1, or 2;

k is 0 or 1;

$X^1$ and $X^2$ are independently anionic ligands; and $R^1$ and $R^2$ are independently hydrogen, optionally substituted hydrocarbyl, optionally substituted heteroatom-containing hydrocarbyl; or $R^1$ and $R^2$ are linked together to form one or more cyclic groups.

6. The composition of claim 5, wherein:

$L^1$ is

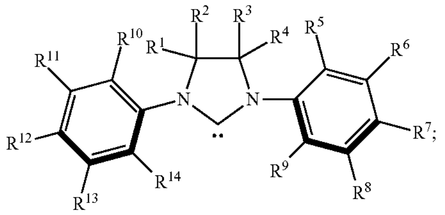

$R^1$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ can form a spiro compound, or together with $R^3$ or together with $R^4$ can form a polycyclic ring;

$R^2$ is H, optionally substituted $C_{1-24}$ alkyl, halogen, —C(O)$R^{25}$, —O$R^{26}$, CN, —N$R^{27}R^{28}$, —$NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl or together with $R^1$ can form a spiro compound, or together with $R^3$ or together with $R^4$ can form a polycyclic ring;

$R^3$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^2$ or together with $R^1$ can form a polycyclic ring, or together with $R^4$ can form a spiro compound;

$R^4$ is H, optionally substituted $C_{1-24}$ alkyl, halogen, —C(O)$R^{25}$, —O$R^{26}$, —CN, —N$R^{27}R^{28}$, —$NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^3$ can form a spiro compound, or together with $R^2$ or together with $R^1$ can form a polycyclic ring;

$R^5$ is H, optionally substituted $C_{1-24}$ alkyl, halogen, —C(O)$R^{25}$, —O$R^{26}$, CN, —N$R^{27}R^{28}$, —$NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^6$ can form an optionally substituted polycyclic ring;

$R^6$ is H, optionally substituted $C_{1-24}$ alkyl, halogen, —C(O)$R^{25}$, —O$R^{26}$, —CN, —N$R^{27}R^{28}$, —$NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^5$ or together with $R^7$ can form an optionally substituted polycyclic ring;

$R^7$ is H, optionally substituted $C_{1-24}$ alkyl, halogen, —C(O)$R^{25}$, —O$R^{26}$, —CN, —N$R^{27}R^{28}$, —$NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl optionally substituted $C_{3-8}$ cycloalkenyl, or together with $R^6$ or together with $R^8$ can form an optionally substituted polycyclic ring;

$R^8$ is H, optionally substituted $C_{1-24}$ alkyl, halogen, —$C(O)R^{25}$, —$OR^{26}$, —CN, —$NR^{27}R^{28}$, —$NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^7$ or together with $R^9$ can form an optionally substituted polycyclic ring;

$R^9$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^8$ can form an optionally substituted polycyclic ring;

$R^{10}$ is H, optionally substituted $C_{1-24}$ alkyl, halogen, —$C(O)R^{25}$, —$OR^{26}$, —CN, —$NR^{27}R^{28}$, —$NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ can form an optionally substituted polycyclic ring;

$R^{11}$ is H, optionally substituted $C_{1-24}$ alkyl, halogen, —$C(O)R^{25}$, —$OR^{26}$, —CN, —$NR^{27}R^{28}$, —$NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{10}$ or together with $R^{12}$ can form an optionally substituted polycyclic ring;

$R^{12}$ is H, optionally substituted $C_{1-24}$ alkyl, halogen, —$C(O)R^{21}$, —$OR^{26}$, —CN, —$NR^{27}R^{28}$, —$NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{11}$ or together with $R^{13}$ can form an optionally substituted polycyclic ring;

$R^{13}$ is H, optionally substituted $C_{1-24}$ alkyl, halogen, —$C(O)R^{25}$, —$OR^{26}$, —CN, —$NR^{27}R^{28}$, —$NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{14}$ or together with $R^{12}$ can form an optionally substituted polycyclic ring;

$R^{14}$ is H, optionally substituted $C_{1-24}$ alkyl, halogen, —$C(O)R^{25}$, —$OR^{26}$, —CN, —$NR^{27}R^{28}$, —$NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{13}$ can form a polycyclic ring;

$R^{25}$ is —OH, —$OR^{30}$, —$NR^{27}R^{23}$, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{29}$ is H, optionally substituted $C_{1-24}$ alkyl, —$OR^{26}$, —$NR^{27}R^{28}$, optionally substituted heterocycle, optionally substituted $C_{3-10}$ cycloalkyl, optionally substituted $C_{5-24}$ aryl, or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl; and x is 1 or 2.

7. The composition of claim 5, wherein $L^1$ and/or $L^2$ is $PR^{H1}R^{H2}R^{H3}$ wherein: $R^{H1}$, $R^{H2}$, and $R^{H3}$ are each independently optionally substituted $C_6$-$C_{10}$ aryl, optionally substituted $C_1$-$C_{10}$ alkyl, or optionally substituted $C_3$-$C_{10}$ cycloalkyl.

8. The composition of claim 1, wherein the at least one olefin metathesis catalyst has the structure of Formula (2):

Formula (2)

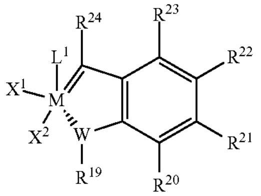

wherein:

M is ruthenium;

$L^1$ is a neutral electron donor ligand;

$X^1$ and $X^2$ are independently anionic ligands;

W is O, halogen, $NR^{33}$ or S;

$R^{19}$ is H, optionally substituted $C_{1-24}$ alkyl, —$C(R^{34})(R^{35})COOR^{36}$, —$C(R^{34})(R^{35})C(O)H$, —$C(R^{34})(R^{35})C(O)R^{37}$, —$C(R^{34})(R^{35})CR^{38}(OR^{39})(OR^{40})$, —$C(R^{34})(R^{35})C(O)NR^{41}R^{42}$, —$C(R^{34})(R^{35})C(O)NR^{41}OR^{40}$, —$C(O)R^{25}$, optionally substituted heterocycle, optionally substituted $C_{3-10}$ cycloalkyl, optionally substituted $C_{5-24}$ aryl, optionally substituted $C_{3-8}$ cycloalkenyl, or when W is $NR^{33}$, then $R^{19}$ together with $R^{33}$ can form an optionally substituted heterocyclic ring or when W is halogen then $R^{19}$ is nil;

$R^{20}$ is H, optionally substituted $C_{1-24}$ alkyl, halogen, —$C(O)R^{25}$, —$OR^{26}$, CN, —$NR^{27}R^{28}$, $NO_2$, —$CF_3$, —$S(O)_xR^{29}$, —$P(O)(OH)_2$, —$OP(O)(OH)_2$, —$SR^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{21}$ can form a polycyclic ring;

$R^{21}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{20}$ or together with $R^{22}$ can form a polycyclic ring;

$R^{22}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{21}$ or together with $R^{23}$ can form a polycyclic ring;

$R^{23}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{22}$ can form a polycyclic ring;

$R^{24}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, or optionally substituted $C_{3-8}$ cycloalkenyl;

$R^{25}$ is OH, O$R^{30}$, N$R^{27}R^{23}$, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{26}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{27}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{28}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{29}$ is H, optionally substituted $C_{1-24}$ alkyl, O$R^{26}$, —N$R^{27}R^{28}$, optionally substituted heterocycle, optionally substituted $C_{3-10}$ cycloalkyl, optionally substituted $C_{5-24}$ aryl, or optionally substituted $C_{3-8}$ cycloalkenyl;

$R^{30}$ is optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{31}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{33}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{34}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{35}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{36}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{37}$ is optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{38}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{39}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{40}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{41}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl;

$R^{42}$ is H, optionally substituted $C_{1-24}$ alkyl, optionally substituted $C_{3-10}$ cycloalkyl, optionally substituted heterocycle, optionally substituted $C_{5-24}$ aryl, or optionally substituted $C_{3-8}$ cycloalkenyl; and x is 1 or 2.

9. The composition of claim 8, wherein:

$L^1$ is

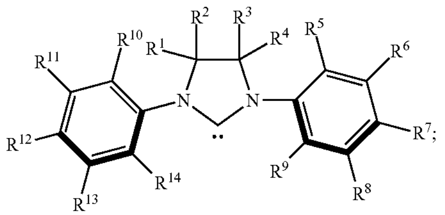

$R^1$ is H, phenyl, methyl, ethyl, iso-propyl, n-propyl, n-butyl, tert-butyl, or sec-butyl;

$R^2$ is H, phenyl, methyl, ethyl, iso-propyl, n-propyl, n-butyl, tert-butyl, or sec-butyl;

$R^3$ is H, phenyl, methyl, ethyl, iso-propyl, n-propyl, n-butyl, tert-butyl, or sec-butyl;

$R^4$ is H, phenyl, methyl, ethyl, iso-propyl, n-propyl, n-butyl, tert-butyl, or sec-butyl;

$R^5$ is H, methyl, ethyl, iso-propyl, n-propyl, n-butyl, tert-butyl, sec-butyl, F, optionally substituted phenyl, or together with $R^6$ can form an optionally substituted polycyclic ring;

$R^6$ is H, methyl, ethyl, iso-propyl, n-propyl, n-butyl, tert-butyl, sec-butyl, F, optionally substituted phenyl, or together with $R^5$ or together with $R^7$ can form an optionally substituted polycyclic ring;

$R^7$ is H, methyl, ethyl, iso-propyl, n-propyl, n-butyl, tert-butyl, sec-butyl, optionally substituted phenyl, or together with $R^6$ or together with $R^8$ can form an optionally substituted polycyclic ring;

$R^8$ is H, methyl, ethyl, iso-propyl, n-propyl, n-butyl, tert-butyl, sec-butyl, optionally substituted phenyl, or together with $R^7$ or together with $R^9$ can form an optionally substituted polycyclic ring;

$R^9$ is H, methyl, ethyl, iso-propyl, n-propyl, n-butyl, tert-butyl, sec-butyl, F, optionally substituted phenyl, or together with $R^8$ can form a polycyclic ring;

$R^{10}$ is H, methyl, ethyl, iso-propyl, n-propyl, n-butyl, tert-butyl, sec-butyl, optionally substituted phenyl, or together with $R^{11}$ can form an optionally substituted polycyclic ring;

$R^{11}$ is H, methyl, ethyl, iso-propyl, n-propyl, n-butyl, tert-butyl, sec-butyl, optionally substituted phenyl, or together with $R^{10}$ or together with $R^2$ can form an optionally substituted polycyclic ring;

$R^{12}$ is H, methyl, ethyl, iso-propyl, n-propyl, n-butyl, tert-butyl, sec-butyl, F, optionally substituted phenyl, or together with $R^{11}$ or together with $R^{13}$ can form a polycyclic ring;

$R^{13}$ is H, methyl, ethyl, iso-propyl, n-propyl, n-butyl, tert-butyl, sec-butyl, F, optionally substituted phenyl, or together with $R^{12}$ or together with $R^{14}$ can form an optionally substituted polycyclic ring;

$R^{14}$ is H, methyl, ethyl, iso-propyl, n-propyl, n-butyl, tert-butyl, sec-butyl, optionally substituted phenyl, or together with $R^{13}$ can form an optionally substituted polycyclic ring;

$R^{19}$ is H, methyl, ethyl, n-propyl, iso-propyl, n-butyl, tert-butyl, cyclohexyl, cyclopentyl, or phenyl;

$R^{20}$ is H, methyl, ethyl, n-propyl, iso-propyl, n-butyl, tert-butyl, cyclohexyl, cyclopentyl, or phenyl;

$R^{21}$ is H, optionally substituted $C_{1-24}$ alkyl, halogen, —C(O)$R^{25}$, —O$R^{26}$, CN, —N$R^{27}R^{28}$, $NO_2$, —$CF_3$, —$S(O)_xR^{29}$, —$P(O)(OH)_2$, —$OP(O)(OH)_2$, —S$R^{31}$, optionally substituted heterocycle, optionally substituted $C_{3-10}$ cycloalkyl, optionally substituted $C_{5-24}$ aryl, optionally substituted $C_{3-8}$ cycloalkenyl, or together with $R^{20}$ or together with $R^{22}$ can form a polycyclic ring;

$R^{22}$ is H, methyl, ethyl, n-propyl, iso-propyl, n-butyl, tert-butyl, cyclohexyl, cyclopentyl, or phenyl;

$R^{23}$ is H, methyl, ethyl, n-propyl, iso-propyl, n-butyl, tert-butyl, cyclohexyl, cyclopentyl or phenyl;

$R^{24}$ is H, methyl, ethyl, n-propyl, iso-propyl, n-butyl, tert-butyl, cyclohexyl, cyclopentyl, or phenyl;

$R^{25}$ is OH, O$R^{30}$, N$R^{27}R^{28}$, methyl, ethyl, n-propyl, iso-propyl, n-butyl, tert-butyl, cyclohexyl, cyclopentyl, or phenyl;

$R^{26}$ is H, methyl, ethyl, n-propyl, iso-propyl, n-butyl, tert-butyl, cyclohexyl, cyclopentyl, or phenyl;

$R^{27}$ is H, methyl, ethyl, n-propyl, iso-propyl, n-butyl, tert-butyl, cyclohexyl, cyclopentyl, or phenyl;

$R^{28}$ is H, methyl, ethyl, n-propyl, iso-propyl, n-butyl, tert-butyl, cyclohexyl, cyclopentyl, or phenyl;

$R^{29}$ is H, methyl, ethyl, n-propyl, iso-propyl, n-butyl, tert-butyl, O$R^{26}$, —N$R^{27}R^{28}$, cyclohexyl, cyclopentyl, or phenyl;

$R^{30}$ is methyl, ethyl, n-propyl, iso-propyl, n-butyl, tert-butyl, cyclohexyl, cyclopentyl, or phenyl;

$R^{31}$ is H, methyl, ethyl, n-propyl, iso-propyl, n-butyl, tert-butyl, cyclohexyl, cyclopentyl, or phenyl; and x is 1 or 2.

10. The composition of claim 1, further comprising at least one adhesion promoter composition.

11. The composition of claim 10, where the at least one adhesion promoter composition comprises at least one compound containing at least two isocyanate groups.

12. The composition of claim 11, wherein the at least one compound containing at least two isocyanate groups is selected from the group consisting of a toluene diisocyanate; tetramethylxylene diisocyanate (TMXDI); methylene diphenyl diisocyanate (MDI); a mixture of the three MDI isomers 2.2'-MDI, 2,4'-MDI, and 4,4'-MDI; liquid MDI; solid MDI; hexamethylenediisocyanatetrimer (HDIt); hexamethylenediisocyanate (HDI); isophorone diisocyanate (IPDI); 4,4'-methylene bis(cyclohexyl isocyanate) (H12MDI); polymeric MDI (PM200); MDI prepolymer; and liquid carbodiimide modified 4,4'-MDI.

13. The composition of claim 10, wherein the at least one adhesion promoter composition further comprises at least one compound containing at least one heteroatom-containing functional group and at least one metathesis-active olefin.

14. The composition of claim 10, where the at least one adhesion promoter composition comprises at least one organofunctional silane compound.

15. The composition of claim 10, wherein the at least one adhesion promoter composition is present in an amount ranging from 0.1-10 phr.

16. The composition of claim 1, further comprising at least one substrate.

17. The composition of claim 1, further comprising at least one additive.

18. An article of manufacture, comprising the composition of claim 1.

19. A method of making a molded article, comprising:

forming a resin composition comprising the composition of claim 1, contacting the resin composition with at least one substrate, and subjecting the resin composition to conditions effective to promote an olefin metathesis reaction of the at least one cyclic olefin monomer.

20. The method of claim 19, wherein the molded article is characterized by at least one of the following:

a tensile modulus >2400 MPa; and a higher tensile modulus as compared to a comparable molded article, wherein the composition of the molded article and the comparable molded article are equivalent except the comparable molded article does not contain the thermoplastic hydrocarbon resin.

21. A coating composition, comprising the composition of claim 1.

22. A method for coating at least one substrate, comprising:

optionally applying an adhesion promoter onto at least a portion of a surface of the at least one substrate; and applying onto the at least portion of the surface of the at least one substrate a composition comprising the composition of claim 1.

23. An adhesive composition, comprising the composition of claim 1.

24. A cured article of manufacture, comprising the composition of claim 1.

25. The composition of claim 1, wherein:

the at least one cyclic olefin monomer is present in the composition in an amount ranging from 10-90 wt. %, based on the total weight of the composition, and the at least one thermoplastic hydrocarbon resin is present in the composition in an amount ranging from 10-90 wt. %, based on the total weight of the composition.

26. The composition of claim 1, wherein:

the at least one cyclic olefin monomer is present in the composition in an amount ranging from 20-80 wt. %, based on the total weight of the composition, and the at least one thermoplastic hydrocarbon resin is present in the composition in an amount ranging from 20-80 wt. %, based on the total weight of the composition.

27. The composition of claim 1, wherein:

the at least one cyclic olefin monomer is present in the composition in an amount ranging from 45-55 wt. %, based on the total weight of the composition, and the at least one thermoplastic hydrocarbon resin is present in the composition in an amount ranging from 45-55 wt. %, based on the total weight of the composition.

* * * * *